United States Patent [19]

I-Yuan

[11] Patent Number: 4,630,198
[45] Date of Patent: Dec. 16, 1986

[54] INTELLIGENT STAND-ALONE PRINTFILE BUFFER WITH PAGING CONTROL

[76] Inventor: Houng I-Yuan, Computer Age, Ltd., Box 227, Nobleton, Ontario, Canada, LOG 1NO

[21] Appl. No.: 582,170

[22] Filed: Feb. 21, 1984

[51] Int. Cl.⁴ .............................. G06F 3/00
[52] U.S. Cl. .............................. 364/200
[58] Field of Search ... 364/200 MS File, 900 MS File

[56] References Cited

U.S. PATENT DOCUMENTS 4,390,945  6/1983  Olsen et al. .................. 364/200

Primary Examiner—Raulfe B. Zache
Attorney, Agent, or Firm—Allegretti, Newitt, Witcoff & McAndrews, Ltd.

[57] ABSTRACT

An intelligent, stand alone print buffer having switch-selectable series and parallel input and output ports. Data transfers between the input and output ports occur under microprocessor control. Control panel switches initiate control functions such as clearing the buffer memory, starting a print cycle, holding further input from the input port, and pausing further output to the output port. Page skipping and page reprinting are controlled by the microprocessor which scans the data stored in the buffer's internal memory to locate page boundries in accordance with operator entered page definition data.

5 Claims, 8 Drawing Figures

INTELLIGENT STAND-ALONE PRINTFILE BUFFER WITH PAGING CONTROL

BACKGROUND OF THE INVENTION

This invention relates to electronic computing systems and, more particularly, to stand-alone print file buffer memory systems.

Stand-alone print buffers have found widespread acceptance, particularly in personal and small-business computer systems which use serial printers that operate at relatively low speeds. Connected between the computer and the printer, the buffer accepts data at high speed from the computer, stores the data temporarily in its memory, and then relays the data to the printer at a lower rate. Once the data has been trasmitted to the buffer, the computer is free for other operations. When used in connection with an 80 character-per-second printer, for example, a stand-alone buffer can typically save one minute of computer time for every page of material to be printed.

A stand-alone print buffer has its own internal memory and a control processor. Unlike software print spooling programs (which also permit concurrent printing and processing), the stand-alone buffer does not "borrow" memory space or processing time from the computer. Moreover, the more "intelligent" stand-alone buffers include operator controls for clearing the buffer's internal memory, resetting the print cycle to beginning of the document stored, halting the print operation temporarily, and making multiple copies of the stored document (all without further processing by the computer). Such intelligent buffers are typically connected between an industry-standard printer output port (a RS-232 serial or a Centronics parallel port) and the similarly conventional input port to the printer by means of standard cables and jacks, permitting installation by the user without technical assistance.

SUMMARY OF THE PRESENT INVENTION

The present invention is an improved stand-alone intelligent buffer which is capable of operating in a page control mode, allowing the operator to selectively print and reprint selected pages in a multiple page document. Operator accessible PAGE SKIP and PAGE RE-PRINT keys on the buffer's control panel allow the operator to select the page or pages to be reprinted or skipped without interrupting the normal operation of the computer. Switch settings on the buffer further allow the operator to vary the number of lines-per-page recognized by the buffer (including one-line-per-page for line-at-a-time control), and to specify whether or not form-feed characters in the data stream are to be treated as end-of-page marks for page control purposes.

In accordance with the invention, the control processor within the processor scans the printfile stored in the buffer to detect page boundries by counting print lines and comparing the count with a predetermined line-per-page count and/or by detecting form-feed characters in the printfile.

According to a further feature of the invention, the printfile may be scanned backwards (toward the beginning of the printfile) to locate prior page boundries to permit selected pages to be reprinted, or the printfile may be scanned in a forward direction from the current print position to permit pages to be skipped without being printed.

According to still another feature of the invention, means responsive to the detection of page boundries may be employed to cause the printer to stop printing (pause) at each page boundry, or to reprint an operator-selected number of pages before pausing.

In accordance with still another feature of the invention, the buffer is capable of counting lines based upon the occurrence of line feed characters or, at the option of the operator, based on the occurrence of carriage return characters.

Advantageously, the buffer is capable of responding to or ignoring form feed characters in its process for detecting page boundries. By ignoring form feed characters and determining page boundries solely on the basis of line count, the buffer is capable of producing pages of a different length from those created by the original application program, the new line-per-page value being switch selected on the buffer control panel.

These and other features and advantages of the present invention will become more apparent through a consideration of the following description of a preferred embodiment of the invention.

DESCRIPTION OF THE PREFERRED EMBODIMENT

The buffer to be described is connected between the computer and the printer by means of standard cables. Personal and small business computers typically transmit data to serial printers in one of two ways: serially (one bit at a time) via a standard RS-232 interface, or in parallel (8 bits at a time) over a "Centronics" interface (so named after the printer manufacturer which popularized its use). The buffer which will be described permits data to be received from the computer and relayed to the printer over either interface. Both of these interfaces may operate at different data rates. Generally, the computer is capable of transmitting data to the printer at a much higher rate than the printer can print.

Switch settings on the buffer's control panel allow the operator to select the appropriate interconnection method and transmission rates for the particular computer and printer to be used. These switches take the form of three 8-position DIP switches forming a total of 24 single-pole single-throw switches. These switches also allow the user to select serial or parallel ports; the input and output data rates from the computer and to the printer; whether the parity bit is present (and whether odd or even parity is used); and whether 8-bit or 7-bit (e.g., graphics or text) data is being handled. Finally, four of the switches permit the operator to specify the number of lines which are to comprise a "page" for the buffer's page control system. These 24 switches are conveniently located behind a hinged lid on the control panel seen in FIG. 1 of the drawings.

Figure 1:
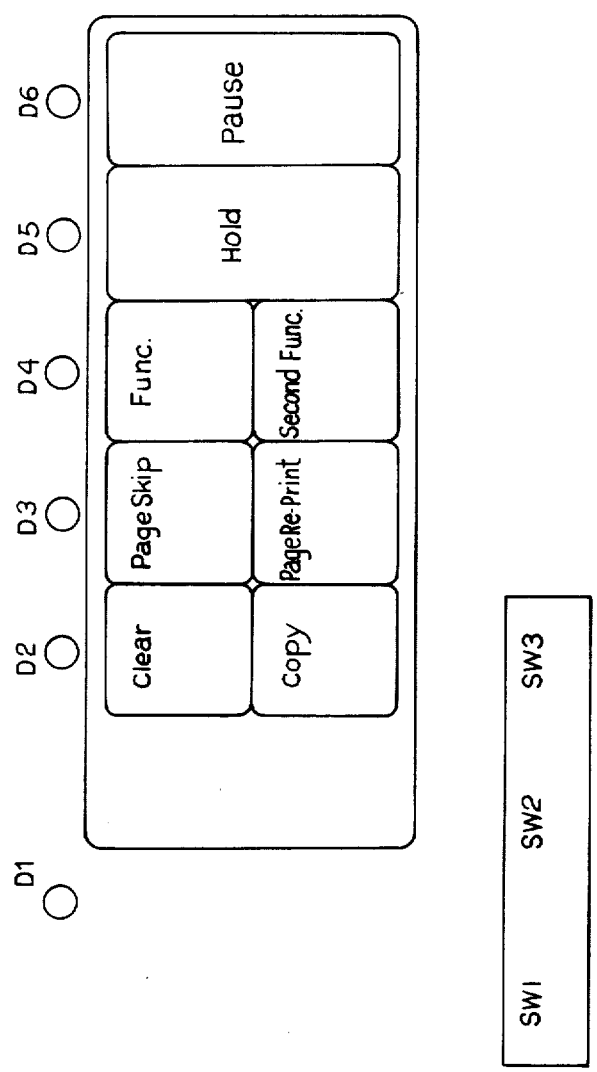
FIG. 1 illustrates the layout of the operator control panel of the buffer, including the function keys and the status display lamps used by the operator to select desired functions.

This control panel also includes 8 membrane key switches labeled as follows: CLEAR; COPY; PAGE SKIP; PAGE RE-PRINT; FUNC.; SECOND FUNC.;

HOLD and PAUSE. The layout of these keys on the control panel is shown in FIG. 1 which also shows the positions of six light-emitting diodes (LEDs) D1 through D6 which act as status indicators. The basic functions which can be initiated by the operator during and after printing by pressing these control keys will first be explained from the operator's standpoint, followed by the description of the hardware and software which executes those functions.

PAUSE KEY

Pressing Pause suspends transmission of data to the printer.

HOLD KEY

Pressing HOLD suspends reception of data from the computer.

CLEAR KEY

The CLEAR key clears all data in the buffer.

COPY KEY

The COPY key produces a copy of all data in the buffer.

keying in the desired number, the operator presses PAUSE to release the PAUSE condition.

PAGE MODE

In PAGE MODE, the buffer detects and controls the page formation of data, and provides the operator with access to page-based print controls.

In order for the buffer to function in PAGE MODE, the operator must first establish the Page Definition. Page Definition may be switch-selected from the upper 4 bits (positions 5 to 8) of the Device Type Switch, Switch SW1 (to be described) on the control panel. Before power-on, one of 16 possible predefined page definitions is selected. The selection determines the number of lines per page and/or the form-feed character, as well as the default status of PAGE MODE, PAGE-PAUSE MODE and SPACE COMPRESSION MODE.

The settings of the upper 4 bits(positions 5 to 8) of Switch SW1 are selected from one of the 16 combinations shown in TABLE 1 below. This selection determines the Page Definition as well as the default status of the SPACE COMPRESSION, PAGE and PAGE-PAUSE MODES. Alterations to the selection take effect only during a power-up or Soft-Reset.

TABLE 1

Page Definitions And Default Status of Modes

| | SW1 | | | | Space | Page | Page Pause | Lines per | Form | |
|---|---|---|---|---|---|---|---|---|---|---|
| | 5 | 6 | 7 | 8 | Comp | Mode | Mode | Page | Feed | Notes |
| 0 | 1 | 1 | 1 | 1 | OFF | OFF | OFF | 66 | NO | Default |
| 1 | 0 | 1 | 1 | 1 | OFF | OFF | OFF | 44 | NO | |
| 2 | 1 | 0 | 1 | 1 | OFF | OFF | OFF | 72 | NO | |
| 3 | 0 | 0 | 1 | 1 | OFF | OFF | OFF | NO | (OC)* | |
| 4 | 1 | 1 | 0 | 1 | OFF | OFF | OFF | 66 | (OC)* | |
| 5 | 0 | 1 | 0 | 1 | ON | OFF | OFF | 66 | (OC)* | |
| 6 | 1 | 0 | 0 | 1 | OFF | OFF | OFF | 66 | NO | Auto-LF |
| 7 | 0 | 0 | 0 | 1 | — | — | — | — | — | (Reserved) |
| 8 | 1 | 1 | 1 | 0 | OFF | ON | OFF | 66 | (OC)* | Page Mode |
| 9 | 0 | 1 | 1 | 0 | OFF | ON | OFF | 44 | (OC)* | |
| 10 | 1 | 0 | 1 | 0 | OFF | ON | OFF | 88 | (OC)* | |
| 11 | 0 | 0 | 1 | 0 | OFF | ON | ON | 66 | (OC)* | |
| 12 | 1 | 1 | 0 | 0 | OFF | ON | OFF | 1 | NO | Line Mode |
| 13 | 0 | 1 | 0 | 0 | ON | ON | OFF | 66 | (OC)* | |
| 14 | 1 | 0 | 0 | 0 | OFF | ON | OFF | NO | (OC)* | |
| 15 | 0 | 0 | 0 | 0 | OFF | ON | OFF | 66 | (OC)* | Auto-LF |

1 SW1 switch position ON
0 SW1 switch position OFF
*The Form-Feed character is (OC) HEX or ASCII Code 12.

PAGE SKIP KEY

The Page Skip key causes the remainder of the current page to be skipped and printing begins from the beginning of the next page. PAGE SKIP is only available when the buffer is in Page Mode (to be described). In order to skip more than one page, the operator presses PAGE SKIP repeatedly, once for each page to be skipped. LEDs, D2, D3, D4 display the relative number of pages which may be used to verify the number of skips.

PAGE REPRINT KEY

The Page Reprint key causes printing to be restarted from the beginning of the current page; or, if already at the beginning of a page, to reprint the preceding page. PAGE RE-PRINT is only available when the buffer is in Page Mode. The operator may reprint from more than one page back by pressing PAGE RE-PRINT repeatedly, once for each page to be reprinted. After The modes, including PAGE MODE, will be enabled or disabled at power-up according to the switch-selected page definition.

The status of the PAGE MODE may be confirmed at any time by pressing the FUNC and 2ND FUNC keys simultaneously. If the 2nd LED (D3) lights up, the PAGE MODE is currently enabled.

When the PAGE MODE is enabled, the data LED's D2, D3, D4 display the relative page number. This provides a convenient means of verifying the page number in real time.

Once the page definition has been established, PAGE MODE may be disabled, if enabled, or enabled, if disabled, by placing the buffer in the PAUSE condition, and then pressing the FUNC and CLEAR keys. The following commands are available to the operator when the buffer is in PAGE MODE: PAGE SKIP (skip to next page); PAGE RE-PRINT (reprint the previous page); and PAGE-PAUSE (pause at each page-end).

After Power-up, the pre-set PAGE MODE, PAGE-PAUSE MODE and SPACE COMPRESSION MODE selections may be altered by activating the key-controlled mode change commands. The number of lines per page may also be altered by activating the page definition command. These additional commands will be described in more detail below.

PAGE-PAUSE MODE

In the PAGE-PAUSE MODE, the buffer suspends transmission of data at each page-end. The printer stops printing to allow for the insertion of single sheets of paper. Once the paper has been inserted, the operator presses PAUSE to resume printing.

The PAGE-PAUSE MODE is available only when the PAGE MODE is enabled. Depending on the switch-set Page Definition selection, the PAGE-PAUSE MODE may, be default, be unabled at power-up.

SPACE COMPRESSION

The SPACE COMPRESSION MODE may be activated so the buffer will accept and retain data which would otherwise exceed the 64 Kbyte buffer capacity. The data in the buffer is condensed, and the effective buffer capacity extended.

The printed characters in an average computer printout occupy only part of the area of the paper. Most of the non-printed area is occupied by "space" characters, each of which consumes the same amount of memory as a print character.

When the buffer's SPACE COMPRESSION is applied, up to 127 continuous "space" characters may be compressed into one memory location, reserving a substantial number of locations for more print characters. A 128 Kbyte report may possibly be compressed into 64K, effectively extending the buffer's capacity.

Depending on the switch-selected Page Definition setting, the SPACE COMPRESSION MODE may, by default, be enabled at power-up. To determine at any time the status of this mode, press FUNC and 2ND FUNC simultaneously. If the 1st data LED (D2) lights up, the SPACE COMPRESSION mode is currently enabled.

COMMAND SUMMARY

There are 8 key-controls on the buffer keyboard:
HOLD controls the reception of data;
PAUSE controls the transmission of data to the printer, and permits multi-key commands;
CLEAR, COPY, PAGE SKIP and PAGE RE-PRINT are action keys and;
FUNC and 2nd FUNC are keys used in conjunction with the action keys to extend the number of available commands. The function keys when pressed alone will not affect the flow of data.

Before multi-key commands are activated, the buffer must first be put in the PAUSE condition. To activate multi-key commands, the operator should:
Press PAUSE;
Press and hold FUNC and/or 2ND FUNC;
Press the appropriate action key (CLEAR, COPY PAGE SKIP, or PAGE REPRINT);
Release the action key; and, finally,
Release FUNC and/or 2ND FUNC.
The multi-key commands are individually described below.

MULTI-KEY FUNCTIONS

FUNC; CLEAR

This command will enable Page Mode if disabled, or disable if enabled. The status of the mode is displayed (D3) when FUNC and 2ND Enable/FUNC are pressed. It is recommended that Page Mode Disable changed Disable only after power-up or CLEAR, and only Page Mode when the appropriate page definition has been selected.

FUNC; COPY

Multi-Copy. After activating (FUNC and COPY keys simultaneously), release both keys and (a) Press the FUNC key repeatedly, once for each desired copy; or, (b) Press 2ND FUNC to increase the number of desired copies by 10's or;

(c) Press FUNC and 2ND FUNC simultaneously to increase the number of copies by 100's. Press COPY again to execute. To cancel this function press 2ND FUNC near the end of the printing of a copy.

FUNC; PAGE SKIP

Enable/Disable Mode. This command will enable the Page-Pause Mode if disabled, or diable if enabled. The status of mode is displayed (D4) when FUNC and 2ND FUNC are pressed. Page-Pause is only available when the buffer is in the Page Mode.

FUNC; PAGE RE-PRINT

Multi-Page Re-Print. After activating (FUNC, PAGE RE-PRINT simultaneously), release both keys and (a) Press FUNC repeatedly, once for each page to be re-printed.

(b) Press 2ND FUNC repeatedly to increase the number of pages of 10's. Press PAGE RE-PRINT again to execute.

2ND FUNC; CLEAR

Enable/Disable Space-Comp. This command will enable the Space Compression Mode if disabled, or diable if enabled. The current status of the mode is displayed (D2) when FUNC and 2ND FUNC are pressed. It is recommended that the mode be enabled only after power-up or CLEAR, and when valid data is in 7 bit ASCII Code.

2ND FUNC; COPY

Continuous Copy. The buffer goes into an infinite copy loop. To cancel the function, hold 2ND FUNC near the end of a copy until the printing is cancelled.

2ND FUNC; PAGE SKIP

Skip Data. This command differs from CLEAR in that the remaining data in the buffer is skipped and the data is left intact (buffer pointer skips all data). To retrieve and print data, press COPY or see Function 12 next.

2ND FUNC; PAGE RE-PRINT

Restore Buffer. Restores buffer to the beginning of all recoverable data in the buffer. When PAUSE is pressed, data is then transmitted to the printer. This function has the same effect as COPY yet allows the use of PAGE and PAGE PAUSE. This command is also used before Hex-Dump to dump the entire buffer.

FUNC; 2ND FUNC; CLEAR

Soft-Reset. This command activates a software reset that simulates a power-up, while leaving data in the buffer intact. It may be used to change device selection or to gain access to commands available during the Power-up.

FUNC; 2ND FUNC; COPY

Hex-Dump. Prints the remaining buffer in hexadecimal and ASCII Code. To cancel this function, press 2ND FUNC. Execute Restore Buffer (Function 12) first to Hex-Dump from the beginning of the buffer.

FUNC; 2ND FUNC; PAGE SKIP

Page Definition. Press HOLD key to put the buffer in a HOLD state and key-in the number of lines per page using the FUNC and 2ND FUNC keys as in the Multi-Copy function. After keying the desired number, press PAGE SKIP again to execute.

LED ACTIVITY

Buffer activities and command status are displayed by means of the 6 LED's (D1-D6 shown in FIG. 1).

LED D1 indicates power-on. After power-up and the brief internal self-test, D1 should come ON and remain on as long as power is supplied.

LEDS D2, D3 and D4 are Data LEDs which together display the position of the buffer pointer, the status of all modes, and the number of pages or copies keyed-in-during multi-key commands.

LED D5 displays the buffer receive status. The LED is ON only if the buffer is busy; i.e., the receiver is on HOLD, or the buffer is full or almost full.

LED D6 displays the buffer transmit status. During operations other than self-test, D6 displays the BUSY signal from the printer, and is ON only if the printer is BUSY (off-line, in ERROR, or not READY), of if the buffer has been put in the PAUSE state.

BUFFER HARDWARE

Figure 2:
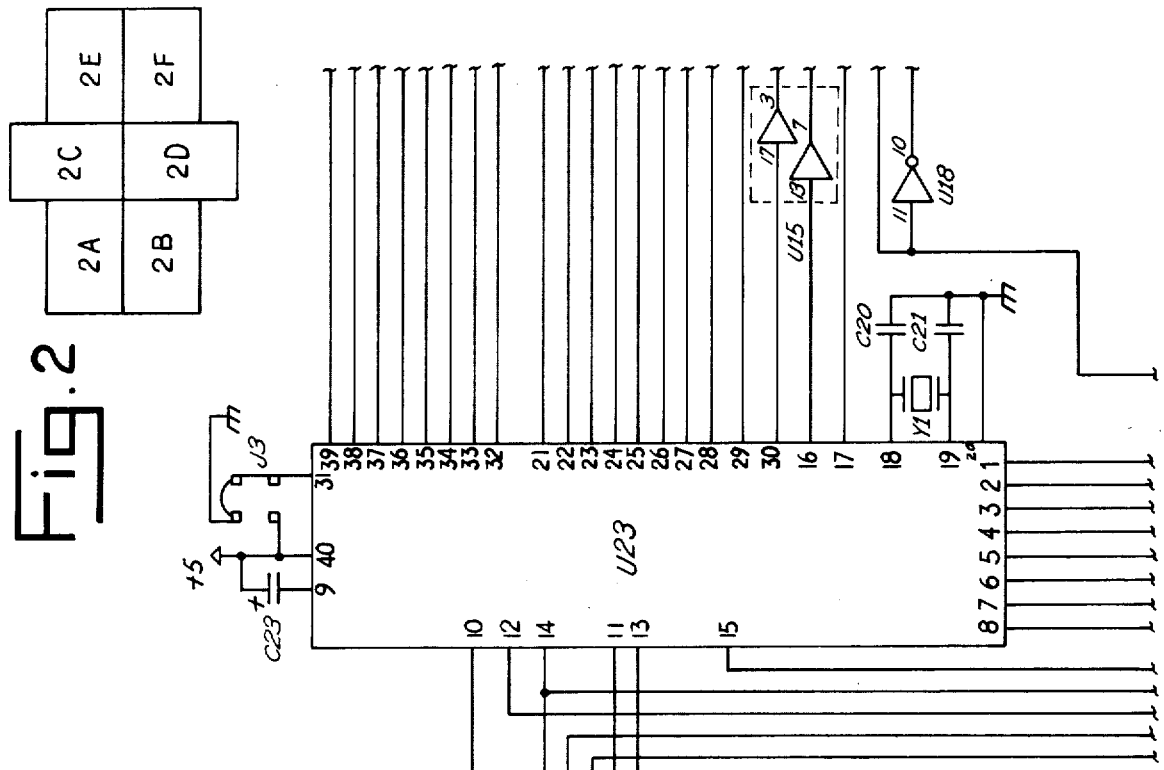
FIGS. 2, 2a, 2b, 2c, 2d, 2e and 2f are a schematic drawing of a stand-alone print buffer showing how the various integrated circuits which make up the buffer are interconnected.
Figure 2A:
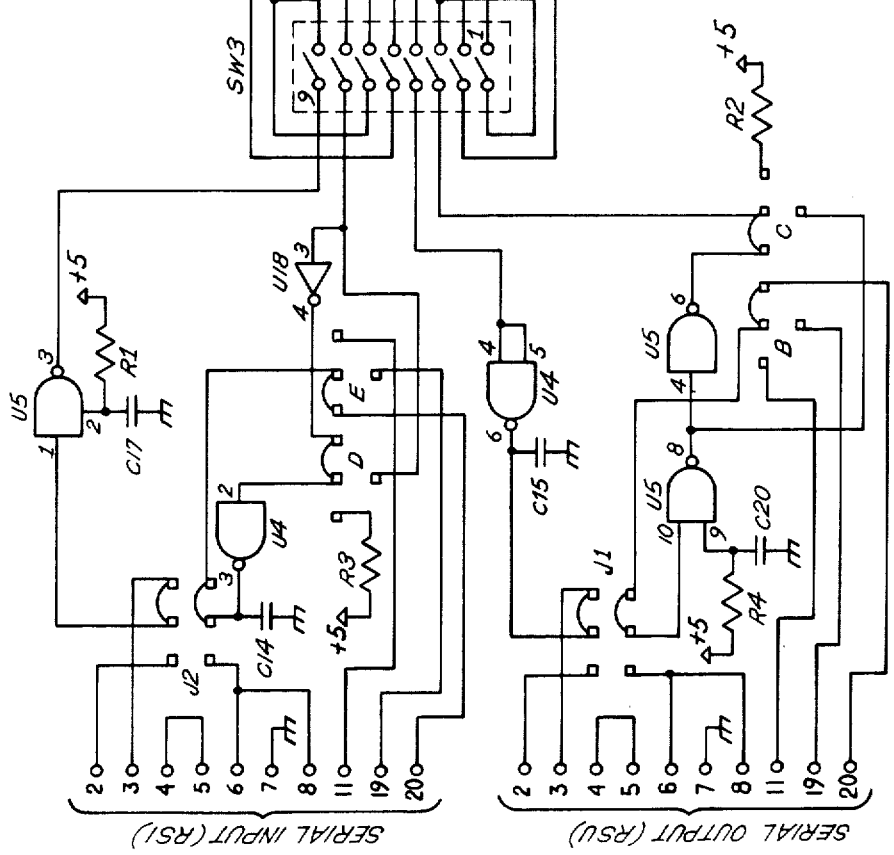
Figure 2B:
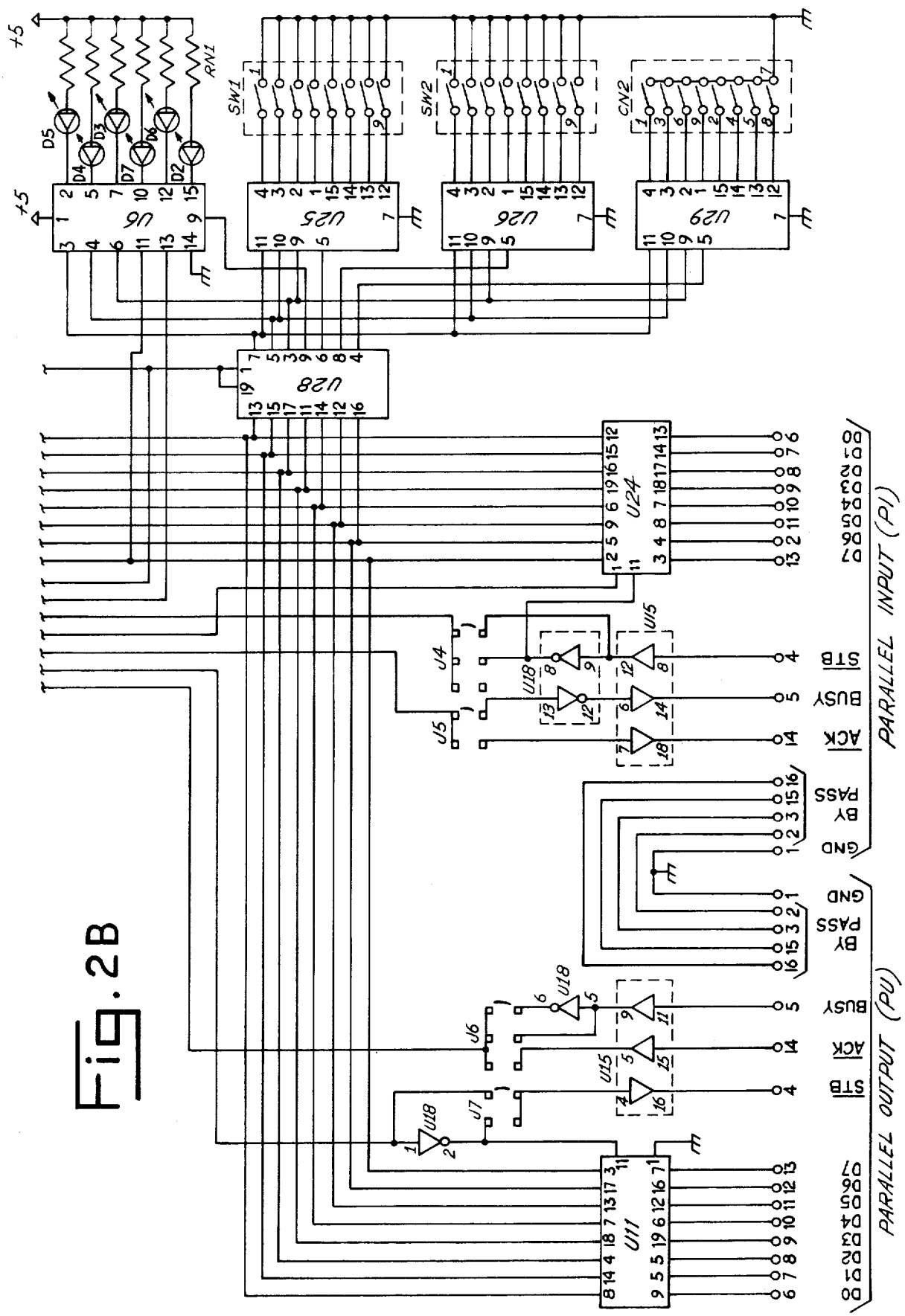
Figure 2C:
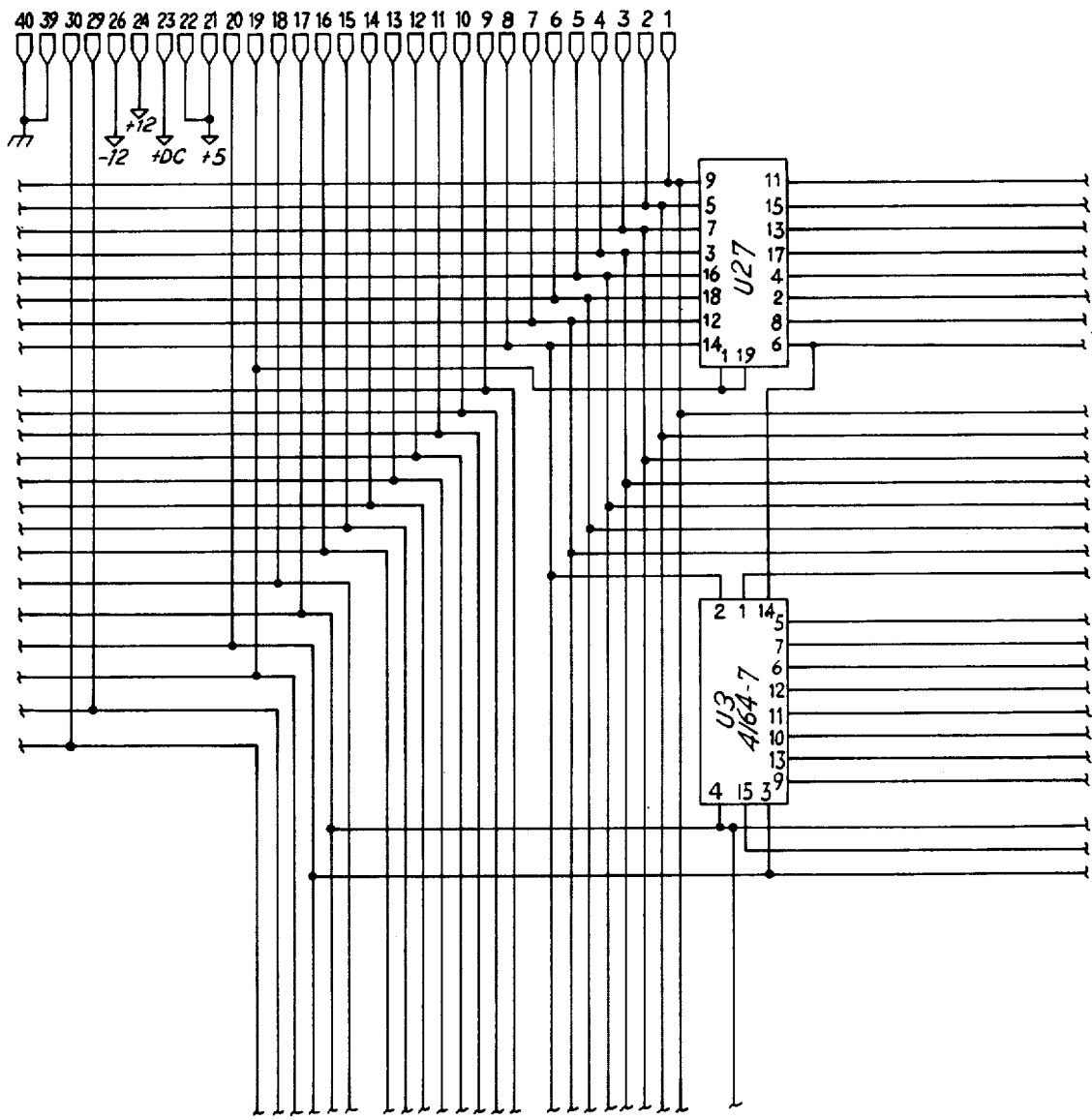
Figure 2D:
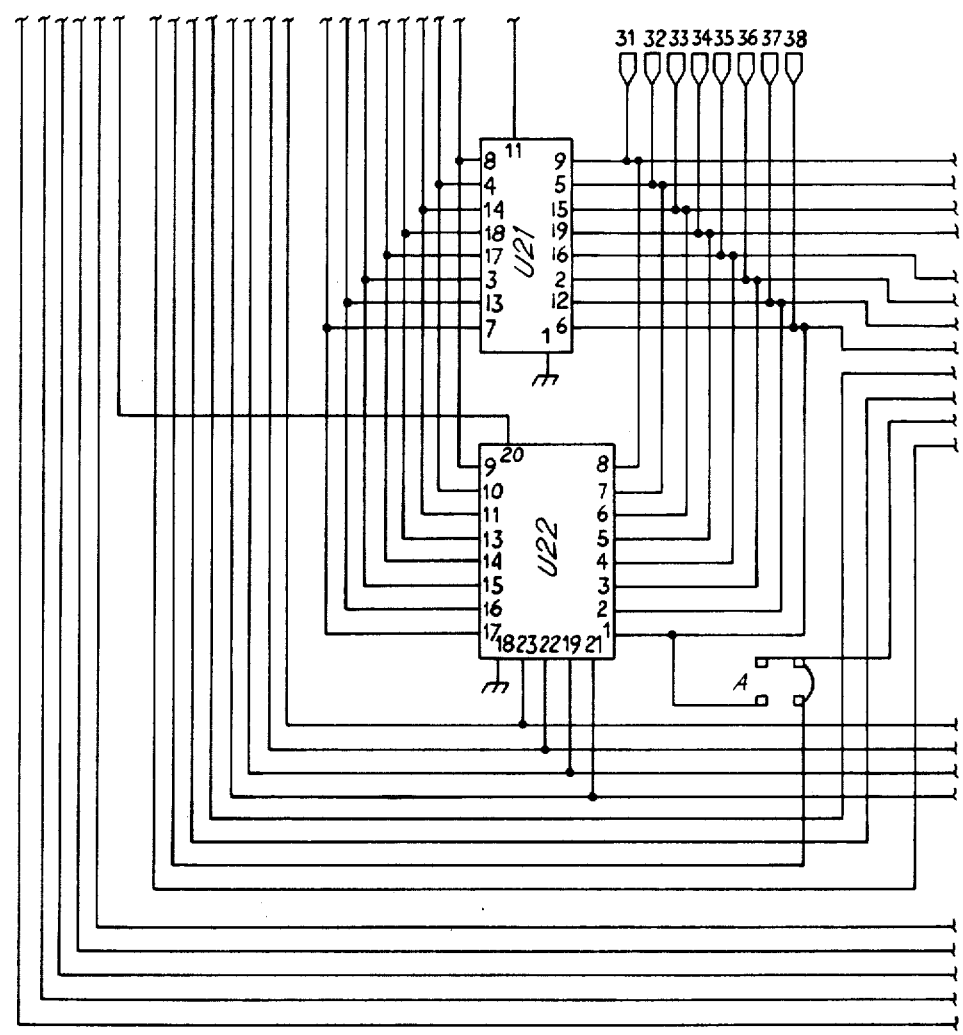
Figure 2E:
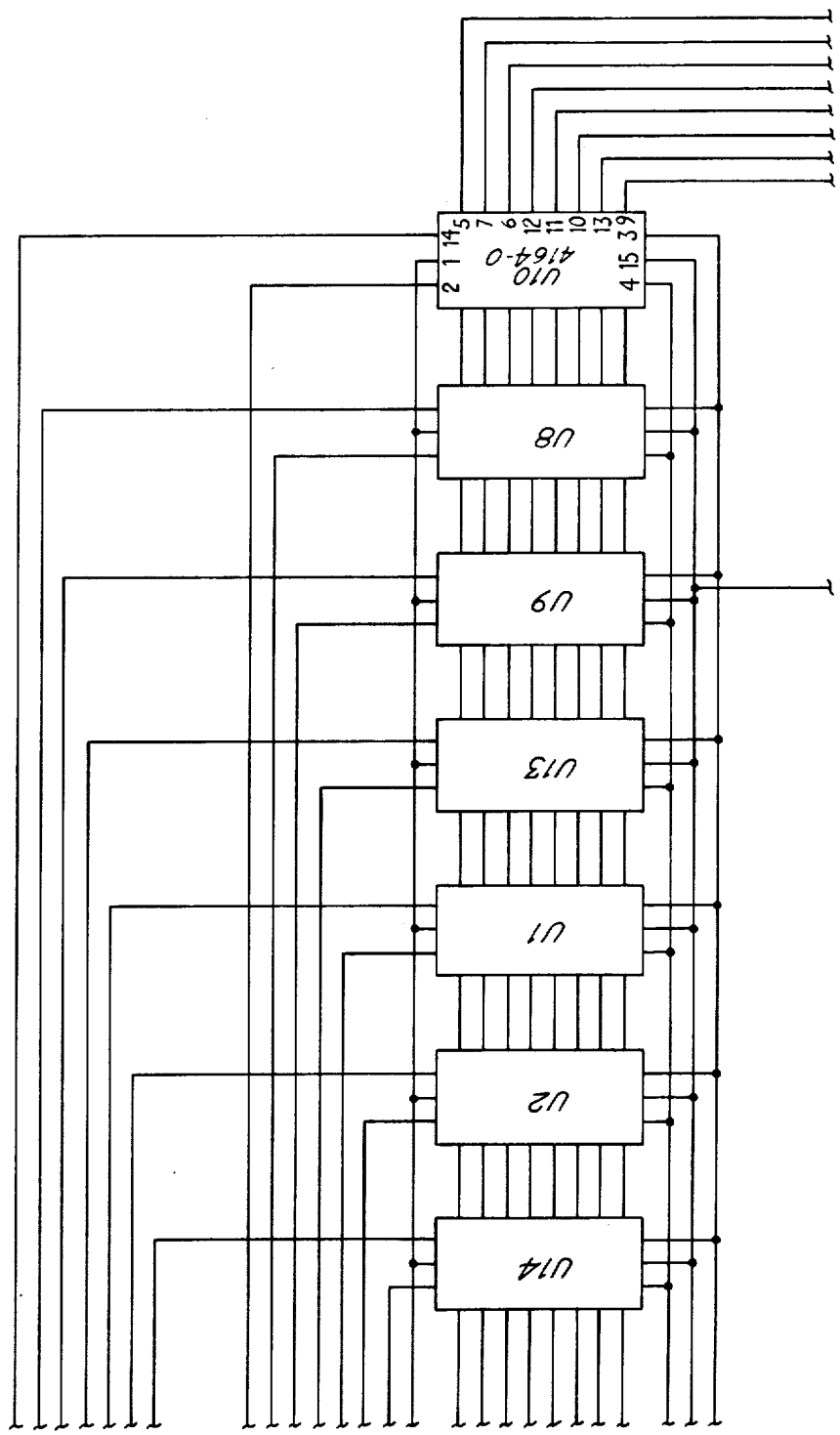
Figure 2F:
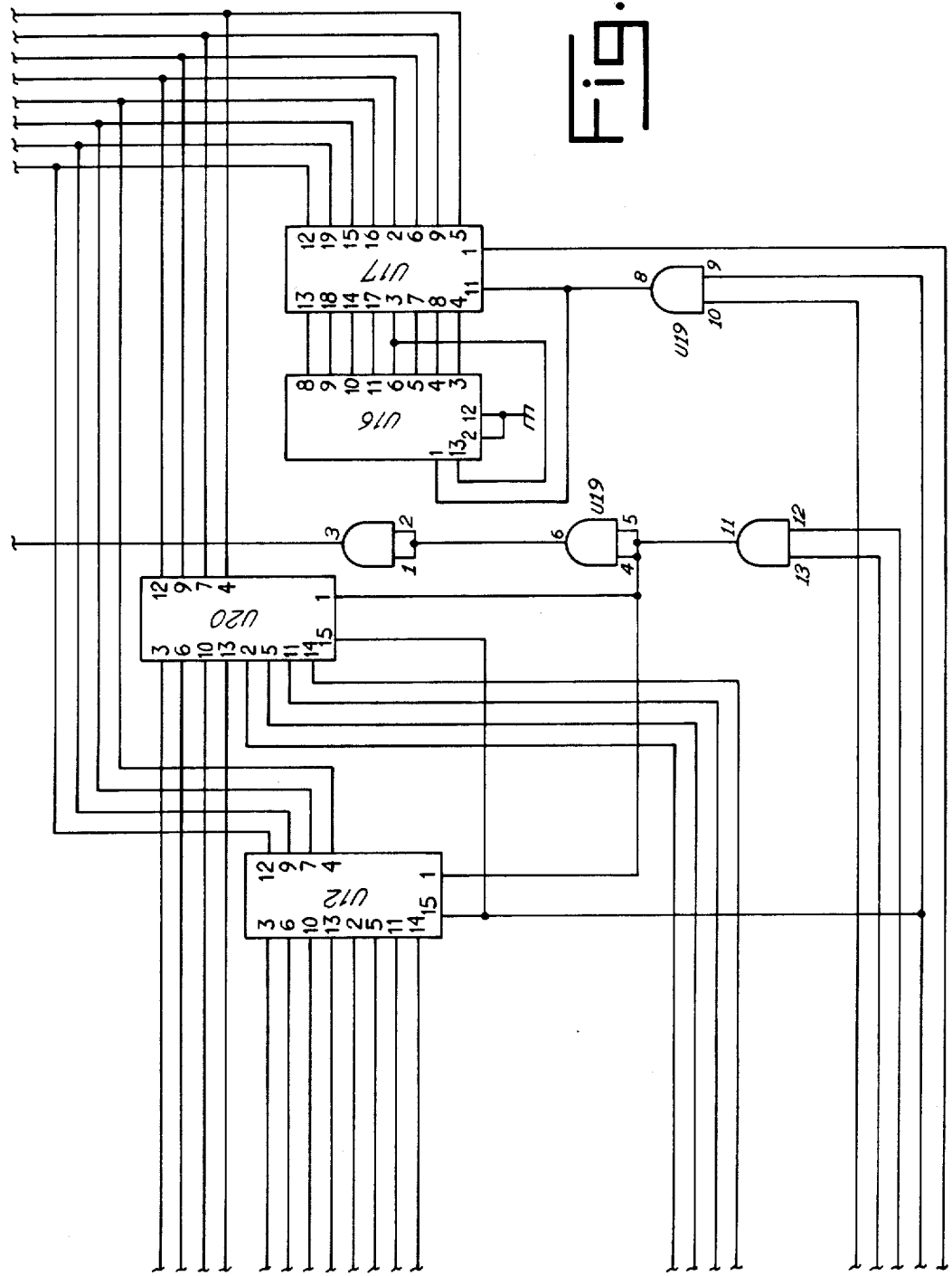

FIG. 2 of the drawings is a schematic diagram of a stand-alone intelligent buffer which performs the functions described above.

The buffer hardware is composed of standard "off the shelf" integrated circuit components whose pins are interconnected as shown. The numerals at each pin location on FIG. 2 correspond to the pin numbers used by the manufacturer of each component. For example, at the upper edge of IC U23 as shown in FIG. 2, it can be seen the pin 9 of U23 is connected though a capacitor C23 to a source of +5 volt power.

In the description which follows, no attempt will be made to describe the details of the buffer hardware. It is assumed that the reader is acquainted with integrated circuit digital logic design practices in general and can refer to the manufacturer's product literature for more detailed information on the operation of the individual components. See, for example, TTL DATA BOOK, FAIRCHILD CAMERA AND INSTRUMENT CORPORATION, MOUNTAIN VIEW, CA 94042 (1978). Such a detailed understanding is unnecessary, however, in order to make and use the specific embodiment of the buffer disclosed here. If the specified integrated circuit components are interconnected as shown, and if the buffer's read-only memory contains the program defined by the assembly language listing which appears at the conclusion of this specification, the buffer will perform the functions which have been described.

The integrated circuit components employed to implement the specific embodiment shown in FIG. 2 are listed below.

| REFERENCE | DESCRIPTION |
|---|---|
| RSI, RSU | 25 Pin RS232 Connector |
| PI, PU | Molex PC Connector 6770-10 |
| R1, R4 | 39K ¼ W Resistor |
| R2, R3, R5 | 3.3K ¼ W Resistor |
| C16, C17 | .001UF 16 V Capacitor |
| C14, C15 | 390PF Capacitor |

-continued

| REFERENCE | DESCRIPTION |
|---|---|
| C23 | 1UF 16 V Tant. Capacitor |
| C20, C21 | 20PF Capacitor |
| SW1, 2, 3 | 16 Pin DIP Switch (8 position) |
| Y1 | 7.3728 MHz crystal |
| U23 | INTEL 8031 CPU or equivalent Microprocessor |
| U18 | 74LS04 Standard TTL HEX Inverter |
| U15, 27, 28 | 74LS244 Standard TTL Octal Buffer/Line-driver |
| U17, U21 | 74LS373 Standard TTL Octal Transparent Latch |
| U11, U24 | 74LS374 Standard TTL Octal D-TYPE Flip-flop |
| U25, 26, 29 | 74LS151 Standard TTL 8 Input Multiplexor |
| U6 | 74LS174 Standard TTL HEX D Flip-flop |
| U12, U20 | 74LS258 Standard TTL Standard TTL Quad 2-input Multiplexor |
| U16 | 74LS393 Standard TTL Dual Modulo-16 Counter |
| U19 | 74LS08 Standard TTL Quad 2-input AND Gate |
| U4 | 1488 RS232 Driver |
| U5 | 1489 RS232 Receiver |
| U1, 2, 3, 8, 9, 10, 13, 14 | 4164 64K bit Dynamic Memory Chip |
| U22 | 2732 EPROM |
| D2-D7 | TIL 220 red diffused LED |
| CN2 | Membrane Switch (8 position) |

The hardware architecture of the buffer is uncomplicated and may be summarized as follows:

Input data from the computer is supplied to the microcomputer U23 from either the serial RS-232 input port shown at the upper left corner of FIG. 1, or from the parallel input port at the lower left. The ICs U4 and U5 connected between the input port and the DIP switch SW3 convert signals from RS-232 levels to the TTL levels needed by the 8031 microprocessor IC U23, and the reverse. U11 and U24 are data latches for the data flowing over the parallel output and input ports respectively. Switch SW3 allows the user to select either a parallel or serial input. A UART (on the microcomputer chip U23) provides the necessary parallel to serial conversion if the user wishes to employ parallel input and serial output modes.

The eight switch positions of SW3 (numbered from bottom to top as seen in FIG. 2) are set as follows. Position 1-4 select the serial or the parallel output port (to the printer) and positions 5 to 8 select the serial or the parallel input port (from the computer). The appropriate settings are:

| | Switch positions | | | | Switch SW3 | | | |
|---|---|---|---|---|---|---|---|---|
| | 1 | 2 | 3 | 4 | 5 | 6 | 7 | 8 |
| parallel output | ON | ON | OFF | OFF | — | — | — | — |
| serial output | OFF | OFF | ON | ON | — | — | — | — |
| parallel input | — | — | — | — | ON | ON | OFF | OFF |
| serial input | — | — | — | — | OFF | OFF | ON | ON |

Switch SW2 seen in FIG. 2 selects the input and output data rates. Switch positions 1 to 4 (the top four as seen in FIG. 2) set the output band rate and the lower four switches set the input data rate.

Switch SW1 sets the page definition by means of the lower four positions 5-8 as discussed earlier in connection with TABLE I. The upper four positions control parity ON or OFF, parity ODD or EVEN, 7 or 8 bits received and transmitted, and 7 or 8 bits stored in the buffer. (To employ space compression as discussed earlier, the eighth bit is forced zero and only the lower seven bits are stored, permitting the eighth bit to be available as a space compression flag.

The seven IC's U1-U3, U8-10, and U13-U14 make up the buffer's 64 Kbyte internal "user" memory. U22 is a read-only memory which stores the program executed by the microcomputer U23, as well as constants needed by the program as defined in the assembly language listing that follows. The Intel 8031 microprocessor U23 includes its own internal scratchpad memory used for temporary read/write storage, allowing the full 64K capacity of the user memory to be available for print file storage.

The DIP switches SW1 and SW2, as well as the function control keys (indicated at CN2 in FIG. 2) are memory mapped (that is, the microcomputer evaluates their settings by addressing predetermined locations in its scratchpad memory for the byte values which the switch settings determine). These addressable byte values are initialized at power-up time (or upon system reset) by reading the switch settings themselves. (See the routine READSW at LOC 0478 in the program listing). During operation, the default values set by the switches may be altered by the control keys (shown at CN in FIG. 2) under operator control as discussed earlier. The LEDs D1-D6 are turned ON or OFF selectively under program control to provide status information to the operator. The settings of switches SW1, SW2 and CN are read, and the LED's D1-D6 are controlled, by means of IC's U6 (a data latch for the LEDs); U25, U26 and U29 (multiplexors which read the switches).

The IC U28 (a data buffer) is connected to pins 1-7 of the microprocessor U23, these pins being the lower-seven bit positions of the microprocessors output port P1 (pins 1-8) which also serves as the data port to the parallel input and output data latches U24 and U11 respectivley. Pins 32-29 and 21-28 of the microprocessor U23 serve as a 16-bit address bus and an 8-bit data bus for accessing the 64K user memory. IC's U12, U20, U16, U17 and U19 constitute a refresh circuit for the user RAM memory. U21 latches the lower 8 address bits for use by the 64K memory chips and the 4K read-only memory chip U22 which stores the program (to be described). U27 is a data buffer for data flowing from the eight memory chips in the user RAM. The 40-pin edge-connector at the top and center of FIG. 2 provides an expansion bus for adding additional user memory.

BUFFER SOFTWARE

The program which is executed by the Intel 8031 microprocessor U23 is set forth in the assembly language listing which appears at the end of the specification and before the claims. The listing is expressed in standard Intel 8051 Assembly language and familiarity with this language is assumed. The instruction set for the 8051 family of microprocessors is described in the publication "8031/8051/8751 SINGLE COMPONENT 8-BIT MICROCOMPUTER"; Intel Corporation publication No. AFN-01462B-01 (1980). Similarly, the 8051 assembler language is described in Intel software support publications relating to the ASM51 absolute macro assembler for the 8051. The program listing set forth here was prepared using the AVOCET Systems XASM51 cross-assembler (which may be run under the Digital Research CP/M operating system) and is described in the AVOCET XASM51 MANUAL, AVOCET SYSTEMS, INC., DOVER, DEL.

Although the complete program for implementing an intelligent buffer is reproduced below, only those portions which relate to the page mode operations which are the subject of the present invention will be summarized here. In the course of this summary, references to particular assembly language statements and routines will include their location numbers in the form (LOC mmmm) where mmmm corresponds to the hexadecimal location value in the left-hand column of the assembly language listing.

The program begins execution (at power up) by a hardware forced branch to the instruction at absolute memory location 0 which contains a jump to the location START (LOC 0BAF). The program then performs certain diagnostics and initialization procedures. It may be noted that, during initialization, the routine GPARAM (LOC 0BCA) calls the subroutines READSW (LOC 0478) and S$DEV (LOC 05B2) which save images of the DIP switch settings of SW1 and SW2 in the microprocessor's internal data memory. The 64K buffer memory (external to the microprocessor U23) is then zeroed (filled with predetermined values) by the subroutine FILRAM (LOC 0573) and any diagnostic errors which are encountered are handled.

After initialization, the MAINLOOP (LOC 0C1D) is entered. The MAINLOOP Routine is responsible for sensing the depression of control keys in order to provide the operator-requested functions which have been discussed above. Actual data transfers between the computer and the buffer and between the buffer and the printer are initiated in part by the microprocessor's vectored interrupt system in conventional fashion. The serial and parallel input/output interrupt handling routines are listed at LOC 0361-0404. The interrupt vector values are listed in the equate statements at the beginning of the program listing.

In the main loop, a check is made (at LOC 0C86) to determine if the buffer is in the page mode by checking the bit status flag F8PAGE (the fourth bit of the V$FLAG Byte) which is set to a default value by the DIP switch SW1, or which is enabled (or disabled if enabled) by simultaneously pressing FUNC and PAGE SKIP (as noted earlier), during the pause state. In the main loop, during the pause condition, J$EXC is called to get multikey commands from the console which allow the operator to place the terminal in page mode. Thereafter, when the page mode flag is checked at LOC 0C86, the existence of the page mode calls the routine F$XMT (LOC 0B4C), which in turn calls the procedure F$SCAN (LOC 09A6).

The FORWARD SCAN routine (LOC 09A6) sequentially evaluates each buffer character location in a forward sequence until either (1) the end of the data in the buffer (pointed to by F$STOP) is reached, (2) a form-feed character is detected, or (3) the number of lines, which are counted during the forward scan by detecting end-of-line character(s), becomes equal to the lines-per-page count LPP.

The BACKWARD PAGE SCAN routine B$SCAN (Line 0A26) operates in a similar fashion to locate the next prior page start position in the buffer, except that it scans the buffer data in a reverse direction (toward the beginning of the print file).

The buffer contemplated by the present invention accordingly detects page breaks in several ways.

First, it detects the presence of form feed characters in the data stream. Normally, by convention, the ASCII form feed character (HEX OC) is inserted in the print-file at the end of each page to instruct the printer to move the paper to the next top of form position without requiring the transmission of further data or line feed characters. The buffer can, however, be instructed by the operator to ignore form feed characters by setting the switch SW1 (See Table I, supra). In the forward scanning procedure, when the form feed character is to indicate the start of a new page, the test at LOC 09E2 jumps to F8PAGE (LOD 0A1F), the page count in register R6 is incremented, and the line counter R7 is set to zero.

The forward and backward scanning routines are also able to detect page breaks by counting print lines. The LPP (line-per-page) value is originally created by the default settings of switch SW1 (See Table I), set to a particular value by the operator by means of a new page definition multi-key command as previously described. This LPP value is compared with the line count in register R7 until coincidence is reached. As seen at LOC 0A14, if LPP is set to zero, no line counting is performed and only form feed characters are interpreted as page breaks. When the current line count maintained in R7 reaches LPP, a page boundry condition is detected and a jump is made to F8PAGE (LOC 0A1F) from the F$LINE routine (LOC 0A11).

Line counting can occur in two ways. Some printing devices can be set to automatically advance the paper one line when each ASCII carriage return character (HEX 0D) is received, and do not require a separate line feed character (HEX 0A) to be in the data stream. The routines F$SC5 and F$SC6 in the Forward SCAN Routine (at LOC 09E8-09F8) handle this distinction based on the option select by the operator (Table 1, supra).

The forward scanning and backward scanning routines make it possible for the buffer, when in the page mode, to scan the data in the buffer in either direction and to locate the next page boundry to make page skipping and page reprinting possible.

When a page boundry is detected and the buffer is operating in the PAGE PAUSE mode, the buffer sets the X$STOP flag (in the main loop at LOC 0C91). X$STOP is a system status flag which forces a stop in transmission to the printer (See LOC 015D in the Transmit Interrupt Handler). This allows the operator to insert a new sheet of paper into printer at the end of each page as detected by the buffer.

ASSEMBLY LANGUAGE LISTING

```
              ;
              ;              INTERRUPT VECTORS
0000   BASE0    EQU    $0000    ;RESET CPU ORIGIN HERE
0003   EX0$VEC  EQU    $0003    ;EXTERNAL TRIGGER INTERRUPT
000B   ET0$VEC  EQU    $000B    ;TIMER 0 INTERRUPT
0013   EX1$VEC  EQU    $0013    ;EXTERNAL TRIGGER 1 INTERRUPT (PIO XMT)
001B   ET1$VEC  EQU    $001B    ;TIMER 1 INTERRUPT (NOT USED)
0023   SIO$VEC  EQU    $0023    ;SIO RCV OR XMT INTERRUPT
0030   BASE     EQU    $0030    ;BASE FOR PROGRAM CODING
              ;
              ;              RCV BUFFER POINTER GROUP
0008   IHEAD    EQU    $08      ;NO$RAM BUFFER HEAD POINTER
000A   QHEADH   EQU    $0A      ;RCV BUFFER POINTER, LOC FOR
000B   QHEADL   EQU    $0B      ;NEXT CHAR RCVED
000C   PHEADH   EQU    $0C      ;RCV PAGE POINTER, LOC FOR NEXT
000D   PHEADL   EQU    $0D      ;CHAR TO BE PAGE PROCESSED
000E   RPAGE    EQU    $0E      ;CURRENT NO. OF PAGES
000F   RLINE    EQU    $0F      ;CURRENT NO. OF LINES AFTER NEW PAGE
              ;
              ;              XMT BUFFER POINTER GROUP
0010   ITAIL    EQU    $10      ;NO$RAM BUFFER TAIL (XMT) POINTER
0012   QTAILH   EQU    $12      ;XMT BUFFER POINTER, LOC FOR
0013   QTAILL   EQU    $13      ;NEXT CHAR TO BE XMTED
0014   PTAILH   EQU    $14      ;XMT PAGE POINTER, LOC FOR NEXT
0015   PTAILL   EQU    $15      ;CHAR TO BE PAGE PROCESSED
0016   XPAGE    EQU    $16      ;CURRENT XMT NO. OF PAGES
0017   XLINE    EQU    $17      ;CURRENT NO. OF XMT LINES
              ;
              ;              BUFFER BACKUP AND UTILITY GROUP
0019   SAVEM    EQU    $19      ;save memory test last DPH
001A   SAVEH    EQU    $1A      ;SAVE H REG
001B   SAVEL    EQU    $1B      ;SAVE L REG
001C   SCAN     EQU    $1C      ;SAVE SCAN CHAR
001D   PSAVE    EQU    $1D      ;SAVE PAGE NUMBER
001E   YSAVE    EQU    $1E      ;save copy decompr char
001F   FILCH    EQU    $1F      ;default filch to FF
       ;QAVAILH  EQU    $1E      ;AVAILABLE BUFFER SPACES
       ;QAVAILL  EQU    $1F      ;
              ;
```

BIT ADDRESSABLE FLAGS AND VARIABLES

```
0020        B$FLAG   EQU    $20        ;BUFFER STATUS FLAG
0000        BF$FULL  EQU    B$FLAG.0   ;BUFFER FULL, AVAIL ¼ QMAR
0001        BF$WAIT  EQU    B$FLAG.1   ;WAIT FOR BUFFER BE XMTED
0002        BF$EMTY  EQU    B$FLAG.2   ;BUFFER EMPTY, RCV POINTER=XMT POINTER
0003        XM$REQ   EQU    B$FLAG.3   ;XMT REQUEST, ACTIVIATE XMT IN MAIN
0004        RC$OVER  EQU    B$FLAG.4   ;RCV OVERRUN, DATA NOT SAVED
0005        RC$REQ   EQU    B$FLAG.5   ;RCV request, set RCV$RDY
0006        RC$FULL  EQU    B$FLAG.6   ;receiver almost full (two pages)

0021        S$FLAG   EQU    $21        ;SIO SETUP AND STATUS FLAG
0008        SIO$IN   EQU    S$FLAG.0   ;SIO input
0009        SIO$OUT  EQU    S$FLAG.1   ;SIO output
000A        SIO2OUT  EQU    S$FLAG.2   ;SIO2 output 000C        SIO2PAR  EQU    S$FLAG.4   ;SIO2 XMT/RCV PARITY BIT
000E        RCV2ERR  EQU    S$FLAG.6   ;SIO2 RCV START/STOP BIT ERROR
000F        XMT2STP  EQU    S$FLAG.7   ;SIO2 TEMP STOP BIT STORAGE 0022        P$FLAG   EQU    $22        ;PIO SETUP AND STATUS
0010        PR$BU_Y  EQU    P$FLAG.0   ;PIO receiver uses BUSY signal
0011        PX$BUSY  EQU    P$FLAG.1   ;PIO transmitter uses BUSY, not ACK
0012        XMT$ACK  EQU    P$FLAG.2   ;PIO XMT ACK RECEIVED
0013        PR$OVER  EQU    P$FLAG.3   ;PIO RCV OVERRUN ERROR
0014        PR$DATA  EQU    P$FLAG.4   ;receiver data in interruptted
0015        PIO$IN   EQU    P$FLAG.5   ;pio input assumed
0016        PIO$OUT  EQU    P$FLAG.6   ;PIO output assumed 0023        V$FLAG   EQU    $23        ;DEVICE STATUS FLAG
0018        V$ALF    EQU    V$FLAG.0   ;ON FOR AUTO-LF
0019        V$ESC    EQU    V$FLAG.1   ;ON IF ESC USED IN FORM-FEED TABLE
001A        V$FF     EQU    V$FLAG.2   ;ON IF FORM FEED CHAR USED
001B        F$PAGE   EQU    V$FLAG.3   ;on if page mode enable
001C        F$PAUSE  EQU    V$FLAG.4   ;on page pause mode enable
001D        F$COMP   EQU    V$FLAG.5   ;on compression enable
001E        F$REMO   EQU    V$FLAG.6   ;on if remote commands enable
001F        V$CRT    EQU    V$FLAG.7   ;on if CRT device, off if PRINTER 0024        F$FLAG   EQU    $24        ;FUNCTION STATUS FLAG
0020        F$STOP   EQU    F$FLAG.0   ;ON IF PAGE SCAN STOP
0021        F$STEP   EQU    F$FLAG.1   ;ON IF PAGE SCAN STEP THRU
0022        F$FACC   EQU    F$FLAG.2   ;ON IF FAST SCAN PREFERRED
0023        F$ESC    EQU    F$FLAG.3   ;ON IF PREVIOUS CHAR WAS ESC
0024        F$PNEW   EQU    F$FLAG.4   ;on if new page boundary
0026        F$BACK   EQU    F$FLAG.6   ;ON IF BACKWARD LIMIT PROCESSED
0027        F$RESET  EQU    F$FLAG.7   ;ON IF FUNCTION RESET 0025        Y$FLAG   EQU    $25        ;SYSTEM STATUS FLAG
0028        NO$RAM   EQU    Y$FLAG.0   ;SET IF NO EXTERNAL RAM
0029        XN$RAM   EQU    Y$FLAG.1   ;TEMP USE NO$RAM BUFFER TO XMT
002A        X$STOP   EQU    Y$FLAG.2   ;FORCE NORMAL XMT STOP
002B        R$STOP   EQU    Y$FLAG.3   ;TRY TO STOP RECEIVER
002C        OUT$NAC  EQU    Y$FLAG.4   ;OUT CHAR NOT ACCEPTED FLAG
002D        F$CONT   EQU    Y$FLAG.5   ;CONTINUE COPY INDICATOR
002E        Y$LOOP   EQU    Y$FLAG.6   ;GENERAL LOOP FLAG
002F        Y$ERR    EQU    Y$FLAG.7   ;key input error flag

;           KEY      SAVE THE IMAGE OF KEY SWITCHES AFTER READKEY

0026        KEY      EQU    $26        ;THRU READKEY, STORE SWITCHES SETTING
0030        K$PAUSE  EQU    KEY.0      ;Pause key
0031        K$HOLD   EQU    KEY.1      ;Hold key
0032        K$FUNC   EQU    KEY.2      ;Function key
0033        K$SFUN   EQU    KEY.3      ;Second function
0034        K$SKIP   EQU    KEY.4      ;Skip key
0035        K$REPR   EQU    KEY.5      ;REPRINT key
0036        K$CLEAR  EQU    KEY.6      ;Clear key
0037        K$COPY   EQU    KEY.7      ;COPY key
```

```
0001        H$PAUSE  EQU    1         ;Pause key value
0002        H$HOLD   EQU    2         ;Hold key value
0004        E$FUNC   EQU    4         ;Function key value
0008        H$SFUN   EQU    8         ;Second function key value
0010        H$SKIP   EQU    16        ;Skip key value
0020        H$REPR   EQU    32        ;Reprint key value
0040        H$CLEAR  EQU    64        ;Clear key value
0080        H$COPY   EQU    128       ;Copy key value
            ;
0027        LED      EQU    $27       ;THRU DLED, LOWE 3 BITS SET LEDS
0028        SW1      EQU    $28       ;JUMPER OR DIP SWITCHES, BAUDRATE
0029        SW2      EQU    $29       ;JUMPER OR DIP SWITCHES, SIO SELECTION
0048        SIO$PAR  EQU    SW2.0     ;SIO XMT parity ON/OFF
0049        SIO$ODD  EQU    SW2.1     ;SIO XMT parity ODD/even
004A        SIO$B8   EQU    SW2.2     ;SIO XMT 8/7 bits data
004B        SIO$Z8   EQU    SW2.3     ;force 8th bit zero if 0
            ;SIO2STP  EQU    SW2.3    ;SIO2 XMT # of stop bit
            ;
002A        PARAM    EQU    $2A       ;general parameter, to be reused by all subr.
002B        XSAVE    EQU    $2B       ;XMT compression char
002C        RSAVE    EQU    $2C       ;RCV Compression char
002D        MASKZ8   EQU    $2D       ;use for masking 8th bit (see sio$z8)
            ;
            ;              OTHER VARIABLES
            ;
0030        BOTH     EQU    $30       ;EXTERNAL RAM BUFFER LOW ADDRESS
0031        BOTL     EQU    $31       ;
0032        TOPH     EQU    $32       ;EXTERNAL RAM BUFFER HIGH ADDRESS
0033        TOPL     EQU    $33       ;
0034        SIO2DAT  EQU    $34       ;SIO2 TEMP DATA STORAGE
0035        SIO2JMP  EQU    $35       ;SIO2 JMP TABLE OFFSET
0036        SIO2CNT  EQU    $36       ;SIO2 RCV/XMT BIT COUNTER
0037        BAUD1    EQU    $37       ;SIO BAUDRATE VALUE
            ;
0038        BAUD2H   EQU    $38       ;SIO2 BAUDRATE RELOAD VALUE
0039        BAUD2L   EQU    $39       ;
003A        BAUD3H   EQU    $3A       ;SIO2 ADJUSTED BAUDRATE VALUE FOR TIMER INT
003B        BAUD3L   EQU    $3B       ;
            ;
003E        IOCHAR   EQU    $3E       ;INCHAR, OUTCHAR IO TRANSFER BYTE
003F        LPP      EQU    $3F       ;# LINES PER PAGE SETUP
0040        QLENH    EQU    $40       ;MAXIMUN SIZE OF EXTERNAL RAM BUFFER
0041        QLENL    EQU    $41       ;
0002        QMARR    EQU    2         ;2 pages reserved for rcv buffer margin
0004        QMARX    EQU    4         ;4 pages reserved for xmt buffer margin
            ;
            ;FILCH    EQU    $00      ;FILL CHAR FOR EXTERNAL RAM
0042        FFTBL    EQU    $42       ;FORM FEED STRING TABLE TOP ADDRESS
0046        FFESC    EQU    $46       ;FORM FEED ESC CHAR DEFINATION
0047        B$SAVE   EQU    $47       ;BACKWARD SCAN SAVE CHAR
0048        STACK    EQU    $48       ;STACK POINTER STARTING ADDRESS
            ;
0074        RAM      EQU    $74       ;RAM temp storage loc
0074        COUNT1   EQU    $74       ;LOOP COUNTER 1
0075        REPH     EQU    $75       ;repeat counter H
0076        REPL     EQU    $76       ;repeat counter L
0077        COUNT    EQU    $77       ;COUNT BYTE VALUE
0078        IRAML    EQU    $78       ;INTERNAL RAM BUFFER BOTTOM
007F        IRAMH    EQU    $7F       ;INTERNAL RAM BUFFER TOP
            ;
            ;              HARDWARE IO PIN ASSIGNMENTS
            ;
0096        SIO2RCV  EQU    P1.6      ;SIO2 RCV DATA PIN, INPUT
0000                                  ;ALSO CONNECT TO P3.2, ELDGE TRIGGER START BIT
00B1        SIO2XMT  EQU    P3.1      ;SIO2 XMT DATA PIN, OUTPUT
            ;
00B1        XM$NSTB  EQU    P3.1      ;TRANSMIT STOBE, PIO XMT -STB, OUTPUT
00B2        RC$NSTB  EQU    P3.2      ;RECEIVE STROBE, PIO RCV -STB, INPUT
00B4        RC$NBUS  EQU    P3.4      ;RECEIVE READY, INVERT TO BUSY OR -ACK, OUTPUT
```

```
00B3            XMT$RDY EQU     P3.3        ;OK TO TRANSMIT, INPUT
00B4            RCV$RDY EQU     P3.4        ;READY TO RECEIVE, OUTPUT
00B5            REFRSH  EQU     P3.5        ;HIGH TO REFRESH, CONTROL
00B5            ENSW    EQU     P3.5        ;LOW ENABLE I/O AND RAM, CONTROL
                ;
000D            CR      EQU     $0D         ;CARRIAGE RETURN
000A            LF      EQU     $0A         ;LINE-FEED
001B            ESC     EQU     $1B         ;ESC CHAR
0020            SPACE   EQU     $20         ;space char for compression
                ;
                        END
                        INCLUD  A:SIO.ASM
                ;       INTEL 8051 SIO INTERRUPT ROUTINES
                ;
0023                    ORG     SIO$VEC
0023 020153             JMP     SIO$INT ;
0030                    ORG     BASE
                ;
                ;       NO-RAM BUFFER HANDLERS
                ;
0030            CKXMT:                      ;CHECK XMT BUFFER
0030 D2D4               SETB    RS1         ;XMT USE BANK 2
0032 C2D3               CLR     RS0
0034 20280C             JB      NO$RAM,CP2HED ;IF NO$RAM THEN CHECK R0
0037            CPHEAD:
0037 EA                 MOV     A,R2
0038 B50A06             CJNE    A,QHEADH,CP$EXT
003B EB                 MOV     A,R3
003C B50B02             CJNE    A,QHEADL,CP$EXT
003F C3                 CLR     C           ;IF R2,R3=QHEAD THEN CLR C
0040 22                 RET
0041            CP$EXT:
0041 D3                 SETB    C           ;IF ½ THEN SET C
0042 22                 RET
0043            CP2HED:
0043 E8                 MOV     A,R0
0044 B508FA             CJNE    A,IHEAD,CP$EXT
0047 C3                 CLR     C
0048 22                 RET
                ;
0049            LDXMT:                      ;LOAD DATA TO BUFFER
0049 202811             JB      NO$RAM,LDXMT2
004C 8A83               MOV     DPH,R2
004E 8B82               MOV     DPL,R3
0050 201D0C             JB      F$COMP,LD$XC ;if space comp
0053            MEMR    EQU     $           ;memory read, address DPTR, data to A
0053 C2AF               CLR     EA          ;disable interrupt
0055 C2B5               CLR     REFRSH      ;DISABLE REFRESH
0057 E0                 MOVX    A,@DPTR     ;USE EXTERNAL RAM
0058 D2B5               SETB    REFRSH      ;ENABLE REFRESH AGAIN
005A D2AF               SETB    EA          ;enable interrupt
005C 22                 RET
005D            LDXMT2:
005D E6                 MOV     A,@R0       ;USE INTERNAL RAM IF NO$RAM
005E 22                 RET
005F            LD$XC:
005F E52B               MOV     A,XSAVE     ;get comp char
0061 7007               JNZ     LD$XC2      ;some outstanding
0063 1153               CALL    MEMR        ;read it
0065 30E704             JNB     ACC.7,LD$XCT ;if comp char ?
0068 F52B               MOV     XSAVE,A     ;yes, save at XSAVE
006A            LD$XC2:
006A 7420               MOV     A,#SPACE    ;pump in a space
006C            LD$XCT:
006C 22                 RET ;
006D            MEMW    EQU     $           ;memory write, address DPTR, data from A
006D C2AF               CLR     EA          ;disable interrupt
```

```
006F C2B5              CLR     REFRSH          ;disable refresh
0071 F0                MOVX    @DPTR,A         ;write data
0072 D2B5              SETB    REFRSH          ;restore refresh
0074 D2AF              SETB    EA              ;enable interrupt
0076 22                RET
                ;
0077           ADXMT:                          ;advance XMT pointer
0077 202821            JB      NO$RAM,AD2TOP
007A 301D0C            JNB     F$COMP,ADVTOP   ;if comp mode
007D 305F09            JNB     XSAVE.7,ADVTOP  ;yes, if comp char available
0080 052B              INC     XSAVE           ;yes, reduce one
0082 305F04            JNB     XSAVE.7,ADVTOP  ;if no more, advance to next loc.
0085 22                RET
0086           AD$TOP:
0086 202812            JB      NO$RAM,AD2TOP
0089           ADVTOP:
0089 0B                INC     R3              ;advance R2,R3
008A BB0001            CJNE    R3,#$0,ADV$NXT
008D 0A                INC     R2              ;IF R3=0 THEN INC R2
008E           ADV$NXT:
008E EA                MOV     A,R2
008F B53208            CJNE    A,TOPH,ADV$EXT
0092 EB                MOV     A,R3
0093 B53304            CJNE    A,TOPL,ADV$EXT
0096 AB31              MOV     R3,BOTL
0098 AA30              MOV     R2,BOTH
009A           ADV$EXT:
009A 22                RET
                ;
009B           AD2TOP:
009B 08                INC     R0
009C B87FFB            CJNE    R0,#IRAMH,ADV$EXT
009F 7878              MOV     R0,#IRAML
00A1 22                RET
00A2           POXMT:                          ;post xmt clean-up
00A2 C201              CLR     BF$WAIT         ;clear xmt wait flag
00A4           POXMT2:
00A4 202B17            JB      R$STOP,PO$EX3   ;if r$stop, don't enable receiver
00A7 202812            JB      NO$RAM,PO$EX2   ;if no$ram, enable rcv
00AA C3                CLR     C               ;check if enough buffer
00AB E512              MOV     A,QTAILH        ;QTAIL - QHEAD
00AD 950A              SUBB    A,QHEADH
00AF 6002              JZ      POXMT3          ;if qtailh = qheadh
00B1 5003              JNC     PO$NXT          ;if Qtail ½ qhead
00B3           POXMT3:
00B3 2540              ADD     A,QLENH         ;else add len
00B5 C3                CLR     C
00B6           PO$NXT:
00B6 9404              SUBB    A,#QMARX        ;check avail space ½ xmt margin
00B8 4004              JC      PO$EX3          ;yes, don't enable reveiver
00BA C206              CLR     RC$FULL         ;receiver buffer not full now
00BC           PO$EX2:
00BC D205              SETB    RC$REQ          ;enought buffer, request receiver
00BE           PO$EX3:
00BE 22                RET
                ;
                ;      RECEIVER BUFFER HANDLERS
                ;
00BF           CKRCV:                          ;CHECK RCV BUFFER
00BF 302B02            JNB     R$STOP,CKRCV2   ;IF R$STOP TRY STOP RECEIVER
00C2 C2B4              CLR     RCV$RDY         ;BY CLEARING RCV$RDY LINE
00C4           CKRCV2:
00C4 D2D3              SETB    RS0
00C6 C2D4              CLR     RS1             ;RECEIVER USES BANK 1
00C8 22                RET
                ;
00C9           LDRCV:
00C9 552D              ANL     A,MASKZ8        ;mask 8th bit if required
00CB 20284A            JB      NO$RAM,LDRCV2
```

```
00CE 301D2F              JNB     F$COMP,LDRCV1   ;check if comp mode
00D1 547F                ANL     A,#$7F          ;yes, allow 7 bits data only
00D3 C52C                XCH     A,RSAVE         ;get RSAVE, comp save char
00D5 30E70F              JNB     ACC.7,LDRCV7    ;if non outstanding
00D8 C52C                XCH     A,RSAVE         ;yes, last one was space, restore
00DA B42018              CJNE    A,#SPACE,LDRCV6 ;check current one is space
00DD 152C                DEC     RSAVE           ;yes, increment one
00DF E52C                MOV     A,RSAVE         ;check if max # of spaces
00E1 B4800B              CJNE    A,#$80,LDRCV5   ;no, save current comp char at RAM
00E4 0200FD              JMP     LDRCV0          ;dump to memory and advance
00E7            LDRCV7:
00E7 C52C                XCH     A,RSAVE         ;restore A and RSAVE
00E9 B42014              CJNE    A,#SPACE,LDRCV1 ;if current ½ space, write and advance
00EC 752CFF              MOV     RSAVE,#$FF      ;=space, RSAVE = 1 space char
00EF           LDRCV5:
00EF 8A83                MOV     DPH,R2          ;get current pointer
00F1 8B82                MOV     DPL,R3
00F3 016D                JMP     MEMW            ;write to RAM
00F5           LDRCV6:                           ;Previous SPACE, current NOT
00F5 C52C                XCH     A,RSAVE         ;** redundant, save comp char
00F7 11EF                CALL    LDRCV5          ;**
00F9 1189                CALL    ADVTOP          ;advance to next pos.
00FB E52C                MOV     A,RSAVE         ;restore ACC and save new char
00FD           LDRCV0:
00FD 752C00              MOV     RSAVE,#$0       ;indicate no comp. char outstanding
               ;
0100           LDRCV1:
0100 8A83                MOV     DPH,R2
0102 8B82                MOV     DPL,R3
0104 116D                CALL    MEMW            ;write A to (DPTR)
0106 1189                CALL    ADVTOP
0108 12012B              CALL    CPTAIL          ;CHECK IF RCV BUFFER EMPTY
010B 400A                JC      LD$EXT          ;BUFFER OK
010D AB82                MOV     R3,DPL          ;BUFFER FULL, RETREAT POINTER
010F AA83                MOV     R2,DPH
0111 D200                SETB    BF$FULL         ;INDICATES BUFFER FULL
0113 D201                SETB    BF$WAIT         ;WAIT FOR XMT
0115 D206                SETB    RC$FULL         ;receive buffer full now
0117           LD$EXT:
0117 22                  RET
0118           LDRCV2:
0118 F6                  MOV     @R0,A           ;MOVE DATA TO NO-RAM BUFFER
0119 119B                CALL    AD2TOP          ;ADVANCE POINTER
011B 120146              CALL    CP2TAL
011E 400A                JC      LD2EXT
0120 B87802              CJNE    R0,#IRAML,LDRCV4
0123 787F                MOV     R0,#IRAMH       ;AJUST FOR BOT -½ TOP
0125           LDRCV4:
0125 18                  DEC     R0              ;BUFFER FULL, RETREAT
0126 D200                SETB    BF$FULL
0128 D206                SETB    RC$FULL
012A           LD2EXT:
012A 22                  RET
               ;
012B           CPTAIL  EQU     $       ;COMPARE DPTR WITH QTAIL, CLEAR C IF EQUAL
012B C3                  CLR     C       ;ready for calculation
012C E512                MOV     A,QTAILH        ;QTAILH - Qheadh
012E 9A                  SUBB    A,R2
012F 5003                JNC     CPT$NXT         ;QTAIL ½= QHEAD
0131 2540                ADD     A,QLENH         ;else add length
0133 C3                  CLR     C
0134           CPT$NXT:
0134 7008                JNZ     CPT$NX2         ;if equal ?
0136 EB                  MOV     A,R3            ;compare lower byte
0137 B51302              CJNE    A,QTAILL,CPT$NX1
013A C3                  CLR     C               ;equal, indicate overflow
013B 22                  RET
013C           CPT$NX1:
013C E540                MOV     A,QLENH         ;restore avail
```

```
013E            CPT$NX2:
013E  9402              SUBB    A,#QMARR            ;compare with rcv margin
0140  5002              JNC     CPT$NX3             ;Avail ½= Qmarr
0142  D206              SETB    RC$FULL             ;reveive buffer almost full
0144            CPT$NX3:
0144  D3                SETB    C                   ;indicate data may be accepted.
0145  22                RET
                ;
0146            CP2TAL:
0146  C3                CLR     C
0147  E510              MOV     A,ITAIL
0149  98                SUBB    A,R0
014A  5003              JNC     CP2TNT
014C  2407              ADD     A,#(IRAMH-IRAML)
014E  C3                CLR     C
014F            CP2TNT:
014F  9404              SUBB    A,#$04              ;FOR NO$RAM MARGIN = 04
0151  B3                CPL     C
0152  22                RET
                ;
                ;       SIO$INT SIO RECEIVE OR TRANSMIT INTERRUPT HANDLER
                ;
0153            SIO$INT:
0153  209852            JB      RI,RCV$INT          ;IF RCV INTERRUPT ON, PROCESS IT
0156  209901            JB      TI,XMT$INT          ;IF TRANSMIT INT ON, PROCESS IT
0159  32                RETI
                ;
                ;       XMT$INT     -  TRANSMIT INTERRUPT ROUTINE
                ;       BF$EMTY TRANSMIT BUFFER EMPTY INDICATOR, TO BE CLEARED
                ;       BY BUFFER INPUT ROUTINE (RCV$INT) WITH XM$REQ SET.
                ;       XM$REQ SET TI IN THE MAIN LOOP TO START XMT AGAIN.
                ;
015A            XMT$INT EQU     $                   ;XMT INTERRUPT HANDLER
015A  202803            JB      NO$RAM,XMI$A        ;IF NO$RAM, XMT ALWAYS
015D  202A25            JB      X$STOP,XMI$WT       ;IF STOP XMT THEN WAIT
0160            XMI$A:
0160  30B322            JNB     XMT$RDY,XMI$WT      ;REMOTE NOT READY, WAITE
0163  C0E0              PUSH    ACC       ;SAVE REGS
0165  C0D0              PUSH    PSW
0167  C082              PUSH    DPL
0169  C083              PUSH    DPH
016B  1130              CALL    CKXMT               ;CHECK XMT BUFFER EMPTY
016D  4006              JC      XMTI$OK             ;NOT EMPTY
016F  C299              CLR     TI                  ;YES, CLEAR XMT INTERRUPT
0171  D202              SETB    BF$EMTY             ;SET XMT BUFFER EMPTY FLAG
0173  800D              SJMP    XMI$RET             ;EXIT
0175            XMTI$OK:
0175  C299              CLR     TI                  ;ACK INTRRUPT
0177  1149              CALL    LDXMT               ;LOAD DATA FROM BUFFER TO A
0179  12018A            CALL    PARITY              ;SET PARITY BIT
017C  F599              MOV     SBUF,A              ;TO SIO
017E  1177              CALL    ADXMT               ;ADVANCE TO NEXT POINTER
0180  C201              CLR     BF$WAIT             ;new data xmted, don't wait
                        CALL    POXMT               ;do post xmt process
0182            XMI$RET:
0182  0201D3            JMP     INT$RET             ;process interrupt return
0185            XMI$WT:
0185  C299              CLR     TI                  ;CLEAR TI INT, TO CHECK AGAIN
0187  D203              SETB    XM$REQ              ;INDICATE TO LOOP, WAIT FOR XMT$RDY
0189  32                RETI
                ;
018A            PARITY:
018A  204A02            JB      SIO$B8,PAR1         ;IF 8 BITS DATA
                ;       JNB     SIO$PAR,PAR5        ;7 BIT DATA, IF PARITY IGNORED
018D  C2E7              CLR     ACC.7               ;PREPARE FOR 7 BIT WITH PARITY
018F  304808    PAR1:   JNB     SIO$PAR,PAR2        ;8 BIT DATA, NO PARITY ? (MARK)
0192  A2D0              MOV     C,P                 ;GET PARITY BIT (8/7)
0194  304908            JNB     SIO$ODD,PAR3        ;EVEN PARITY ?
0197  B3                CPL     C                   ;ODD PARITY
```

```
0198 8005              SJMP    PAR3
019A D3        PAR2:   SETB    C               ;8 BIT NO PARITY (MARK)
019B 204901            JB      SIO$ODD,PAR3    ;if no-parity, odd then force par to mark
019E B3                CPL     C               ;else force to space 0
019F 204A03    PAR3:   JB      SIO$B8,PAR4     ;8 BIT, PARITY GOTO TB8
01A2 92E7              MOV     ACC.7,C         ;7 BIT, ADD PARITY
01A4 22                RET
01A5 929B      PAR4:   MOV     TB8,C
01A7 22        PAR5:   RET
               ;
               ;       RCVINT  RECEIVE INTERRUPT
               ;       RC$OVER RCV OVERRUN INDICATOR, IF SET , TO BE HANDLED BY
               ;       MAIN LOOP, IE. REPORT ERROR AND CLEAR RI
               ;       IF BF$WAIT SET THEN CLEAR CTS, STOP DATA RECEPTION
               ;
01A8           RCV$INT EQU     $               ;RECEIVE INTERRUPT
01A8 C0E0              PUSH    ACC
01AA C0D0              PUSH    PSW
01AC C082              PUSH    DPL
01AE C083              PUSH    DPH
01B0 11BF              CALL    CKRCV           ;LOAD BUFFER POINTER
01B2 300007            JNB     BF$FULL,RCVI$1
01B5 200117            JB      BF$WAIT,RCV$OVER
01B8 1186              CALL    AD$TOP
01BA C200              CLR     BF$FULL
01BC           RCVI$1:
01BC C298              CLR     RI
01BE E599              MOV     A,SBUF
01C0 11C9              CALL    LDRCV           ;LOAD DATA TO BUFFER AND ADV POINTER
01C2 500F              JNC     RCI$EXT         ;BUFFER FULL
01C4 C204              CLR     RC$OVER         ;CLEAR RC OVERRUN
01C6 30020A            JNB     BF$EMTY,RCI$EXT ;IF BF$EMTY SET THEN REACTIVIATE TI
01C9 D203              SETB    XM$REQ          ;INDICATE TI TO BE SET BY MAIN LOOP
01CB C202              CLR     BF$EMTY         ;POINTER ADVANCED, BUFFER NOT EMPTY
01CD 8004              SJMP    RCI$EXT
01CF           RCV$OVER:
01CF C298              CLR     RI              ;clear ri so that next char can int
01D1 D204              SETB    RC$OVER
01D3           RCI$EXT:
01D3           INT$RET:                        ;standard interrupt return
01D3           SIO2RET:                        ;SIO2 interrupt return here as well
01D3 D083              POP     DPH
01D5 D082              POP     DPL
01D7 D0D0              POP     PSW
01D9 D0E0              POP     ACC
01DB 32                RETI
               ;
01DC           INISIO:
01DC E528              MOV     A,SW1
01DE 301501            JNB     PIO$IN,INIS2    ;if input is PIO, use xmt baudrate
01E1 C4                SWAP    A               ;by swapping ACC
01E2           INIS2:
01E2 540F              ANL     A,#$0F          ;READ SIO BAUD RATE SW
01E4 9001ED            MOV     DPTR,#BAUDTB1   ;TI RI BAUD RATE TABLE
01E7 93                MOVC    A,@A+DPTR
01E8 F4                CPL     A               ;COMPLEMENT BAUD RATE VALUE
01E9 04                INC     A               ;ADJUST 1 FOR BINARY COMP
01EA F537              MOV     BAUD1,A
01EC 22                RET
               ;
01ED           BAUDTB1:                        ;SIO BAUDRATE TABLE
                                               ASSUME 7.3728 MHZ
               ;
01ED 00                DB      0               ;NO SELECTION (OR 50 BAUD)
01EE FF                DB      255             ;BAUD RATE = 75
01EF AF                DB      175             ;=110   VALUE =
01F0 80                DB      128             ;=150   INT(7.3728X1000000/(
01F1 40                DB      64              ;=300    12X32XBAUDRATE))
01F2 20                DB      32              ;=600
01F3 10                DB      16              ;=1200 WHERE 7.3728X1000000 IS CRYSTAL
```

```
01F4 OB            DB      11            ;=1800 ACTUAL=10.6666      FREQ
01F5 08            DB      8             ;=2400
01F6 04            DB      4             ;=4800 BAUD
01F7 02            DB      2             ;=9600 BAUD
01F8 01            DB      1             ;=19200 BAUD
01F9 02            DB      2             ;selection 'C' - parallel, default to 960
01FA 02            DB      2             ;selection 'D' - same
01FB 8E            DB      142           ;'E' for special baudrate 135 baud
01FC 02            DB      2
                   ;
01FD       SETSIO:
01FD 31DC          CALL    INISIO        ;initiate SIO
01FF 53981F        ANL     SCON,#$1F     ;SET UP SMX
0202 439840        ORL     SCON,#$40
0205 304A02        JNB     SIO$B8,SETS1
0208 D29F          SETB    SM0           ;SET TO 9 BIT DATA
020A 53890F  SETS1: ANL    TMOD,#$0F     ;SET TIMER 1 MOD
020D 438920        ORL     TMOD,#$20     ;AUTO-RELOAD
0210 5320E0        ANL     B$FLAG,#$E0   ;CLEAR SOFTWARE FLAG
0213 85378D        MOV     TH1,BAUD1     ;LOAD BAUD RATE CLOCK
0216 D28E          SETB    TR1           ;START RUNNING
0218 22            RET
                   ;
0219       SETXMT:
0219 200802        JB      SIO$IN,SETX2  ;IF SIO RCV THEN SKIP DOUBLE SIOSET
021C 31FD          CALL    SETSIO
021E       SETX2:
021E D2B3          SETB    XMT$RDY       ;SET XMT$RDY TO INPUT
0220 D299          SETB    TI            ;ENABLE TI XMT CLOCK
0222 D2AC          SETB    ES            ;ENABLE INTERRUPT
0224 D209          SETB    SIO$OUT       ;output selects SIO
0226 22            RET
                   ;
0227       SETRCV:
0227 31FD          CALL    SETSIO
0229 D29C          SETB    REN           ;ENABLE RCV INTERRUPT
022B D2B4          SETB    RCV$RDY       ;INDICATE RCV READY
022D D2AC          SETB    ES            ;ENABLE INTERRUPT
022F D208          SETB    SIO$IN        ;input select SIO
0231 22            RET
                   ;
0232       TABLE:
0232 0000          DW      $0000
0234 FFFF          DW      $FFFF
                   ;
0236       LOADBUF:
0236 900232        MOV     DPTR,#TABLE       ;LOAD SIOSET TABLE
0239 7A04          MOV     R2,#4             ;USE R2 AS COUNTER
023B 7830          MOV     R0,#BOTH          ;R0 AS DEST POINTER
023D       BUF1:
023D E4            CLR     A                 ;CLEAR OFFSET
023E 93            MOVC    A,@A+DPTR         ;LOAD FROM TABLE
023F F6            MOV     @R0,A             ;TO DEST
0240 A3            INC     DPTR              ;INC POINTERS
0241 08            INC     R0
0242 DAF9          DJNZ    R2,BUF1
0244 22            RET
                   ;
0245       SIO$END:
                   ;
                   END
                   INCLUD A:SIO2.ASM
                   ;   SIO2    SECONDARY SIO FOR 8051
000B               ORG     ETO$VEC
000B       ETO$INT EQU     $             ;(2) 2 CYCLES FOR INTERRUPT
000B 020245        JMP     SIO2INT       ;(2)
                   ;
0245               ORG     SIO$END
                   ;
```

```
0245            SIO2INT:          ;SECONDARY SIO INTERRUPT HANDLER
0245 C0E0               PUSH      ACC             ;(2)
0247 C0D0               PUSH      PSW             ;(2)
0249 C082               PUSH      DPL             ;(2)
024B C083               PUSH      DPH             ;(2)
024D 900256             MOV       DPTR,#XM2TBL    ;(2) LOAD INT JMP TABLE
0250 E535               MOV       A,SIO2JMP       ;(1) GET SIO2 JMP STAGE
0252 23                 RL        A               ;(1) TIMES 2, TABLES ARE TWO BYTES
0253 73                 JMP       @A+DPTR         ;(2) JMP TO SERVICE ROUTINES
0254 21D3               JMP       SIO2RET
                ;SIO2RET:                         ;SIO2RET transfer to SIO module
0256                                              ;to save code
                ;
0256            XM2TBL:                           ;XMT INTERRUPT TABLE
0256 415E               AJMP      XM2STR          ;HANDLE START BIT INT
0258 41C1               AJMP      XM2DAT          ;7/8 BITS DATA
025A 41D2               AJMP      XM2PAR          ;ADD PARITY
025C 41DE               AJMP      XM2STP          ;STOP BIT
                ;
025E            XM2STR:
025E 202803             JB        NO$RAM,XM2A     ;IF NO$RAM, XMT ALWAYS
0261 202A2E             JB        X$STOP,XM2WT    ;ELSE CHECK XMT STOP
0264            XM2A:
0264 30B32B             JNB       XMT$RDY,XM2WT           ;CHECK IF REMOTE READY
0267 1130               CALL      CKXMT           ;CHECK IF BUFFER EMPTY
0269 4006               JC        XM2OK           ;BUFFER OK
026B C2A9               CLR       ET0             ;EMPTY, DISABLE XMT CLOCK, TIMER 0
026D D202               SETB      BF$EMTY         ;INDICATE BUFFER EMPTY
026F 21D3               JMP       SIO2RET
0271            XM2OK:
0271 C28C               CLR       TR0             ;STOP TIMER 0
0273 1149               CALL      LDXMT           ;LOAD DATA TO A
0275 F534               MOV       SIO2DAT,A       ;SIO2DAT HOLD XMT DATA
0277 1202A0             CALL      PARITY2         ;GET PARITY
027A 1177               CALL      ADXMT           ;INC BUFFER POINTER
027C C201               CLR       BF$WAIT         ;data xmted, waiting is over
                ;       CALL      POXMT           ;do post xmt processing
027E E539               MOV       A,BAUD2L        ;ADJUST FOR INT LATENCY TIME
0280 2416               ADD       A,#22           ;22 CYCLES BEFORE SWITCH SIO2XMT
                                                   ADD ALL ( ) UP TO BE EXACT
                ;
0282 F58A               MOV       TL0,A
0284 E538               MOV       A,BAUD2H
0286 3400               ADDC      A,#0
0288 F58C               MOV       TH0,A
                ;
028A C2B1               CLR       SIO2XMT         ;SET XMT PORT TO 0, START BIT
028C D28C               SETB      TR0             ;ENABLE TIMER
028E 0535               INC       SIO2JMP         ;MOVE TO NEXT STAGE INTERRUPT
0290 21D3               JMP       SIO2RET
                ;
0292            XM2WT:
0292 D2B1               SETB      SIO2XMT         ;MAKE SURE PORT IN HIGH (MARK)
0294 C28C               CLR       TR0             ;STOP TIMER 0
0296 758C10             MOV       TH0,#$10        ;WAIT 16*256 CYCLES TO CHECK AGAIN
0299 758A00             MOV       TL0,#0          ;PRELOAD TIMER 0 WITH LONGEST INTERVAL
029C D28C               SETB      TR0             ;NOW RUN IT
029E 21D3               JMP       SIO2RET
                ;
02A0            PARITY2:
02A0 204A05             JB        SIO$B8,PAR21
02A3 30480E             JNB       SIO$PAR,PAR23
02A6 C2E7               CLR       ACC.7
02A8            PAR21:
02A8 304808             JNB       SIO$PAR,PAR22
02AB A2D0               MOV       C,P
02AD 304904             JNB       SIO$ODD,PAR23
02B0 B3                 CPL       C
02B1 8001               SJMP      PAR23
02B3 D3        PAR22:   SETB      C
```

```
02B4            PAR23:
02B4 920C               MOV     SIO2PAR,C
02B6 753608             MOV     SIO2CNT,#8      ;ASSUME 8 BIT DATA
02B9 204A02             JB      SIO$B8,PAR25
02BC 1536               DEC     SIO2CNT         ;DEC TO 7 BITS
02BE            PAR25:
02BE D20F               SETB    XMT2STP         ;forced 2 stop bits, aug 5, 1983
                ;       MOV     C,SIO2STP       ;RESET STOP BITS
                ;       MOV     XMT2STP,C
02C0 22                 RET
                ;
02C1            XM2DAT:
02C1 E534               MOV     A,SIO2DAT       ;(1) SIO2DAT HOLD DATA
02C3 13                 RRC     A               ;(1)
02C4 92B1               MOV     SIO2XMT,C       ;(2) SEND THE BIT OUT
02C6 F534               MOV     SIO2DAT,A
02C8 1202EE             CALL    CLOCK0          ;AJUST TIMER 0 VALUE FOR LATENCY
02CB D53602             DJNZ    SIO2CNT,XM23
02CE 0535               INC     SIO2JMP         ;ALL DATA BIT SENT, NEXT STAGE
02D0            XM23:
02D0 21D3               JMP     SIO2RET
                ;
02D2            XM2PAR:
02D2 00                 NOP                     ;(1) FILL UP 1 CYCLE TIME
02D3 A20C               MOV     C,SIO2PAR       ;(1) GET PARITY BIT
02D5 92B1               MOV     SIO2XMT,C       ;(2) CLOCK IT OUT
02D7 1202EE             CALL    CLOCK0          ;ADJUST TIMER 0 FOR INT LATENCY
02DA 0535               INC     SIO2JMP         ;NEXT STAGE
02DC 21D3               JMP     SIO2RET
                ;
02DE            XM2STP:
02DE 00                 NOP                     ;(1) FILL UP 3 CYCLE TIME
02DF 00                 NOP                     ;(1)
02E0 00                 NOP                     ;(1)
02E1 D2B1               SETB    SIO2XMT         ;(1) STOP BIT IS HIGH
02E3 1202EE             CALL    CLOCK0
02E6 100F03             JBC     XMT2STP,XM24    ;IF 2 STP BITS WAIT ONE MORE
02E9 753500             MOV     SIO2JMP,#$0     ;ELSE BYTE XMTED, RESTART JMP CYCLE
02EC            XM24:
02EC 21D3               JMP     SIO2RET
                ;
02EE            CLOCK0:
02EE C2AF               CLR     EA              ;MAKE SURE NOTHING INTERRUPT
02F0 C28C               CLR     TR0             ;STOP TIMER
02F2 E53B               MOV     A,BAUD3L        ;GET ADJUSTED TIMER0 VALUE
02F4 258A               ADD     A,TL0           ;BAUD3 HOLD BAUD VALUE PLUS 7 CYCLES
02F6 F58A               MOV     TL0,A           ;FOR TIME LATENCY IN THIS SUBROUTINES
02F8 E53A               MOV     A,BAUD3H
02FA 358C               ADDC    A,TH0
02FC F58C               MOV     TH0,A
02FE D28C               SETB    TR0             ;DONE CALCULATION, RESTART TIMER
0300 D2AF               SETB    EA              ;ENABLE INT
0302 22                 RET
                ;
                ;
0303            SETSIO2:
0303 E528               MOV     A,SW1           ;GET BAUD RATE SW
0305 C4                 SWAP    A               ;1111 0000
0306 540F               ANL     A,#$0F          ;UPPER 4 BITS EFFECTIVE
0308 900341             MOV     DPTR,#BAUDTB2
                ;
030B C3                 CLR     C
030C 33                 RLC     A               ;TIMES 2 FOR TWO BYTES TABLE
030D C0E0               PUSH    ACC             ;SAVE BAUD SELECTION
030F 04                 INC     A               ;GET NEXT VALUE
0310 93                 MOVC    A,@A+DPTR
0311 F539               MOV     BAUD2L,A        ;MOVE TO LOW VALUE
0313 D0E0               POP     ACC             ;GET HIGH VALUE
0315 93                 MOVC    A,@A+DPTR
```

```
0316 F538              MOV     BAUD2H,A
                  ;
0318 E539              MOV     A,BAUD2L       ;CALCULATE BAUD3=BAUD2+7
031A 2407              ADD     A,#7
031C F53B              MOV     BAUD3L,A
031E E538              MOV     A,BAUD2H
0320 3400              ADDC    A,#0
0322 F53A              MOV     BAUD3H,A
                  ;
0324         SETSS:
0324 85398A            MOV     TL0,BAUD2L
0327 85388C            MOV     TH0,BAUD2H
032A 5389F0            ANL     TMOD,#$F0      ;SET TIMER 0 TO MODE 1, 16 BITS
032D 438901            ORL     TMOD,#$01
0330 753500            MOV     SIO2JMP,#$0
0333 22                RET
                  ;
0334         SET2XM:
0334 7103              CALL    SETSIO2
0336         SET2XT:
0336 D2B3              SETB    XMT$RDY
0338 D2B9              SETB    PT0            ;timer highest level interrupt
033A D28C              SETB    TR0
033C D2A9              SETB    ET0            ;ENABLE TIMER 0 INT
033E D20A              SETB    SIO2OUT        ;SIO2 selected as output
0340 22                RET
                  ;
0341         BAUDTB2:
                  ;                    ASSUME 7.3728 MHZ
0341 0000              DW      0              ;NO SELECTION, OR RESERVED FOR AUTO BAUD
0343 DFFF              DW      -8193          ;1 - 75 BAUD
0345 EA2E              DW      -5586          ;2 - 110 BAUD
0347 EFFF              DW      -4097          ;3 - 150
0349 F7FF              DW      -2049          ;4 - 300
034B FBFF              DW      -1025          ;5 - 600
034D FDFF              DW      -513           ;6 - 1200
034F FEAA              DW      -342           ;7 - 1800
0351 FEFF              DW      -257           ;8 - 2400
0353 FF7F              DW      -129           ;9 - 4800
0355 F7FF              DW      -2049          ;A - 9600 to high, default to 300 baud
0357 F7FF              DW      -2049          ;B - 19200 same
0359 F7FF              DW      -2049          ;C - parallel with ACK
035B F7FF              DW      -2049          ;D - parallel with busy
035D E311              DW      -7407          ;E - 135 baud special baudrate
035F B1DF              DW      -20001         ;F - 50 baud
                  ;
                  ;    DW      -65            ;A - 9600
                  ;    DW      -33            ;B - 19200
                  ;    DW      -17            ;C - 38400      TO HIGH, CPU CAN'T HANDLE
                  ;    DW      -9             ;D - VALUE = -INT((1000000/BAUD)+1)
                  ;    DW      -0             ;E -
                  ;    DW      -0             ;F -
                  ;
0361         SIO2END:
                       END
                       INCLUD  A:PIO.ASM
                  ;    INTEL 8051 PIO INTERRUPT ROUTINES
                  ;    ANGEL V5.6    April 27, 1983 fix parallel rec hang on 64K
                  ;    PIO$XMT TO CENTRONICS INTERFACE, CONNECT -ACK OR BUSY
                  ;            TO P3.3 INT1, -STB TO P3.1
                  ;    PIO$RCV RECV FROM PARALLEL INPUT WITH STROBE, CONNECT
                  ;            -STB TO P3.2 INT0, BUSY OR -ACK TO P3.4
                  ;
0361         PIO$ORG EQU   $
                  ;
0013                   ORG     EXI$VEC
0013         EXI$INT EQU   $              ;EXTERNAL ACK INTERRUPT
0013 D212              SETB    XMT$ACK    ;PIO TRANSMITTER ACK OR NOT BUSY INT
0015 32                RETI
```

```
                    ;
0003                        ORG     EX0$VEC
                    ;
                    ;       PIO$INT PIO RECEIVER INTERRUPT
                    ;
0003            PIO$INT:
0003  D214              SETB    PR$DATA ;indicate data received to processor
0005  301002            JNB     PR$BUSY,PIO$EXT ;if busy used, set busy.
0008  C2B4              CLR     RC$NBUS ;set receiver busy
000A            PIO$EXT:
000A  32                RETI            ;exit from interrupt
0361                    ORG     PIO$ORG
                    ;
                    ;       PIO$XMT PIO TRANSMITTER ROUTINE
                    ;       BF$EMTY TRANSMIT BUFFER EMPTY INDICATOR, TO BE CLEARED
                    ;       BY BUFFER INPUT ROUTINE (RCV$INT) WITH XM$REQ SET.
                    ;       XM$REQ FORCE PIO$XMT IN THE MAIN LOOP TO START XMT AGAIN
                    ;
0361            PIO$XMT EQU     $       ;XMT HANDLER
0361  202803            JB      NO$RAM,PXM$A    ;IF NO$RAM, XMT ALWAYS
0364  202A38            JB      X$STOP,PXM$WT   ;ELSE STOP XMT IF X$STOP
0367            PXM$A:
0367  301105            JNB     PX$BUSY,PXM$1   ;IF USE ACK, CHECK ACK
036A  20B305            JB      XMT$RDY,PXM$OK  ;P3.3 NOT BUSY, OR ACKING
036D  8030              SJMP    PXM$WT          ;P3.3 BUSY
036F            PXM$1:
036F  30122D            JNB     XMT$ACK,PXM$WT  ;BUSY AND NOT ACKED, WAITE
0372            PXM$OK:
0372  C0E0              PUSH    ACC             ;SAVE REGS
0374  C0D0              PUSH    PSW
0376  C082              PUSH    DPL
0378  C083              PUSH    DPH
037A  1130              CALL    CKXMT           ;CHECK IF XMT BUFFER EMPTY
037C  4004              JC      PXM$OK2         ;NOT EMPTY
037E  D202              SETB    BF$EMTY         ;SET XMT BUFFER EMPTY P$FLAG
0380  8015              SJMP    PXM$RET         ;EXIT
0382            PXM$OK2:
0382  C212              CLR     XMT$ACK         ;CLEAR PREVIOUS ACK
0384  1149              CALL    LDXMT           ;LOAD DATA TO A
0386  F590              MOV     P1,A            ;TO PIO
0388  C2AF              CLR     EA              ;disable interrupt avoid refrsh
038A  F590              MOV     P1,A            ;in case first one missed
038C  C2B1              CLR     XM$NSTB         ;MOVE STROBE LOW
038E  00                NOP                     ;MINIMUM 1 US
038F  D2B1              SETB    XM$NSTB         ;move strobe high again
0391  D2AF              SETB    EA              ;enable interrupt
0393  1177              CALL    ADXMT           ;ADVANCE TO NEXT LOC
0395  C201              CLR     BF$WAIT         ;data xmted, waiting over
                        CALL    POXMT           ;do post xmt proc
0397            PXM$RET:
0397  D083              POP     DPH
0399  D082              POP     DPL
039B  D0D0              POP     PSW             ;RESTORE REGS
039D  D0E0              POP     ACC
039F            PXM$WT:
039F  22                RET
                    ;
                    ;
                    ;       PIO$REC PIO receiver
                    ;       Process data interrupted by PR$DATA
                    ;
                    ;       RC$OVER RCV OVERRUN INDICATOR, IF SET , TO BE HANDLED BY
                    ;       MAIN LOOP, IE. REPORT ERROR AND CLEAR RC$NBUS
                    ;       IF BF$WAIT SET THEN CLEAR RC$NBUS, STOP DATA RECEPTION
                    ;
                    ;       THIS RCV WORK WELL WITH BUSY SIGNAL BUT NOT ACK, SINCE
                    ;       AT BUFFER FULL THE ACK WILL BE LOW UNTIL BUFF AVAIL AGAIN
                    ;
03A0            PIO$REC EQU     $       ;data received processor
03A0  200603            JB      RC$FULL,PRC$RET ;if buffer wait, wait
```

```
03A3 201401              JB     PR$DATA,PRC$0    ;if data in, process it
03A6           PRC$RET:
03A6 22                  RET
                ;
03A7           PRC$0:
03A7 C0E0                PUSH   ACC
03A9 C0D0                PUSH   PSW
03AB C082                PUSH   DPL
03AD C083                PUSH   DPH
03AF 11BF                CALL   CKRCV
03B1 300004              JNB    BF$FULL,PRC$2
03B4 1186                CALL   AD$TOP
03B6 C200                CLR    BF$FULL
03B8           PRC$2:
03B8 201002              JB     PR$BUSY,PRC$3    ;if ACK used, ACK low
03BB C2B4                CLR    RC$NBUS          ;SEND ACK AND ENABLE INPUT
03BD           PRC$3:
03BD C2AF                CLR    EA               ;disable interrupt
03BF 4390FF              ORL    P1,#$FF          ;SET P1 TO INPUT
03C2 C2B0                CLR    P3.0             ;enable pio input
03C4 E590                MOV    A,P1             ;READ DATA PORT
03C6 D2B0                SETB   P3.0             ;disable pio input
03C8 C214                CLR    PR$DATA          ;data is taken
03CA D2AF                SETB   EA               ;enable interrupt
03CC 11C9                CALL   LDRCV
03CE 200009              JB     BF$FULL,PRC$EXT  ;if buffer full ?
03D1 D2B4                SETB   RC$NBUS          ;no, set receiver ready
03D3 300204              JNB    BF$EMTY,PRC$EXT  ;IF BF$EMTY SET THEN REACTIVIATE XMT
03D6 D203                SETB   XM$REQ           ;INDICATE TI TO BE SET BY MAIN LOOP
03D8 C202                CLR    BF$EMTY          ;POINTER ADVANCED, BUFFER NOT EMPTY
03DA           PRC$EXT:
03DA D083                POP    DPH
03DC D082                POP    DPL
03DE D0D0                POP    PSW
03E0 D0E0                POP    ACC
03E2 22                  RET
                ;
03E3           SETPRC:
03E3 D215                SETB   PIO$IN           ;input uses PIO
03E5 D2B0                SETB   P3.0             ;use P3.0 to controll pio input enable
03E7 D2B4                SETB   RC$NBUS
03E9 D288                SETB   IT0              ;EXTERNAL 0 SET TO EDGE TRIGGER
03EB D2A8                SETB   EX0
03ED C214                CLR    PR$DATA          ;no data yet
03EF D2B8                SETB   PX0              ;set EX0 rec intr to highest prio
03F1 22                  RET
                ;
03F2           SETPXM:
03F2 D216                SETB   PIO$OUT          ;output uses PIO
03F4 201108              JB     PX$BUSY,SETP     ;CHECK IF BUSY LINE IS USED
03F7 D28A                SETB   IT1              ;NO, ASSUME ACK
03F9 D2AA                SETB   EX1
03FB D2BA                SETB   PX1              ;set EX1 ACK int to highest prio.
03FD D212                SETB   XMT$ACK          ;no strobe outstanding
03FF           SETP:
03FF D2B1                SETB   XM$NSTB
0401 D2B3                SETB   XMT$RDY
0403 22                  RET
                ;
0404           PIO$END:
                         END
                         INCLUD A:SET.ASM
                ;
0404           SETUP:
0404 E4                  CLR    A                ;clear all flags
0405 F520                MOV    B$FLAG,A
0407 F522                MOV    P$FLAG,A
0409 F521                MOV    S$FLAG,A
040B F598                MOV    SCON,A
040D F588                MOV    TCON,A
```

```
040F F589              MOV    TMOD,A
                ;      ANL    IE,#$E0
                ;      ANL    IP,#$E0
0411 74FF              MOV    A,#$FF       ;setup 8th bit mask
0413 A24B              MOV    C,SIO$Z8     ;get 8th bit mask
0415 92E7              MOV    ACC.7,C      ;put into ACC.7
0417 F52D              MOV    MASKZ8,A     ;store at maskz8      aug 5, 83
                ;
0419            SETUP2:
0419 12041F            CALL   SETRC        ;setup receiver
041C 020433            JMP    SETXM        ;setup transmitter
                ;
                ;      SETRC               set up receiver
                ;
041F            SETRC:
041F E528              MOV    A,SW1        ;get switch setting
0421 540F              ANL    A,#$0F       ;check input baudrate
0423 B40D04            CJNE   A,#$0D,SETR1
0426 D210              SETB   PR$BUSY      ;yes, with BUSY
0428 80B9              JMP    SETPRC       ;set PIO input
042A            SETR1:
042A B40C04            CJNE   A,#$0C,SETR2
042D C210              CLR    PR$BUSY      ;PIO uses ACK, not BUSY
042F 80B2              JMP    SETPRC       ;set PIO input
0431            SETR2:
0431 4127              JMP    SETRCV       ;set to SIO input
                ;
                ;
                ;      SETXM               set up transmitter
                ;
0433            SETXM:
0433 E528              MOV    A,SW1        ;transmitter uses upper nibble
0435 54F0              ANL    A,#$F0
0437 B4D004            CJNE   A,#$D0,SETX1
043A D211              SETB   PX$BUSY      ;PIO uses BUSY
043C 80B4              JMP    SETPXM       ;set XMT to PIO
043E            SETX1:
043E B40C04            CJNE   A,#$0C,SETX5
0441 C211              CLR    PX$BUSY      ;PIO uses ACK, not BUSY
0443 80AD              JMP    SETPXM       ;PIO as output
0445            SETX5:
0445 201507            JB     PIO$IN,SETX3
0448 E528              MOV    A,SW1        ;if PIO input then always default output
044A C4                SWAP   A            ;to SIO
044B 6528              XRL    A,SW1        ;else check if input/output same baudrate
044D 7002              JNZ    SETX6        ;no, then uses SIO2 as output
044F            SETX3:
044F 4119              JMP    SETXMT       ;yes, uses SIO XMT as output
0451            SETX6:
0451 6134              JMP    SET2XM
                ;
                       END
                       INCLUD A:UTIL.ASM
                ;      UTIL.ASM     SYSTEM UTILITY PROGRAM
                ;
0453            DLED:                      ;LED DRIVER, IMAGE OF LED
0453 E527              MOV    A,LED        ;move LED to A
0455 6487              XRL    A,#$87       ;Led are inverted, 0 - no light, 1 - light
0457 4478              ORL    A,#$78       ;only bit 7 and bit 0 - 2
                ;
0459 C2B5              CLR    ENSW         ;ENABLE SWITH READING
045B F590              MOV    P1,A         ;display on LED
045D C293              CLR    P1.3         ;FORCE P1.3 LOW TO HIGH
045F 00                NOP
0460 00                NOP
0461 D293              SETB   P1.3         ;TO LATCH DATA
0463 D2B5              SETB   ENSW         ;DISABLE SW READING
                ;
0465 202B0F            JB     R$STOP,SLED$X ;if hold, delay receiving
```

```
0468 61A0               JMP     PIO$REC  ;in case PIO rec data
                   ;
046A       SLED0:               ;reverse LED seq 3 2 1 0
                   ;            to be added Aug 26,1983
046A       SLED:                ;display A on LED, low nibble first
046A 540F            ANL   A,#$0F        ;mask lower 4 bits
046C 03              RR    A             ;shift right for LED.7
046D 532778          ANL   LED,#$78      ;mask LED
0470 4227            ORL   LED,A
0472 9153            CALL  DLED          ;display it
0474 12049B          CALL  READKY        ;check input
0477       SLED$X:
0477 22              RET
                   ;
                   ;
                   ;            READSW READ JUMPER SETTING
                   ;            JUMPER ON --½ 0
                   ;            JUMPER OFF--½ 1
                   ;
0478       READSW:               ;READ JUMPER SWITCHES SETTING
0478 7808            MOV   R0,#$08       ;READ 8 BITS
047A 7590F8          MOV   P1,#$0F8      ;MASK LOWER 3 BITS
                   ;
047D C2B5            CLR   ENSW          ;ENABLE SW READING
047F 8002            SJMP  RSW2
0481       RSW1:
0481 0590            INC   P1            ;GET NEXT ADDRESS
0483       RSW2:
0483 E529            MOV   A,SW2         ;READ SW2
0485 A294            MOV   C,P1.4        ;GET SW2 BIT VALUE
0487 13              RRC   A
0488 F529            MOV   SW2,A         ;SAVE SW2
                   ;
048A E528            MOV   A,SW1
048C A295            MOV   C,P1.5
048E 13              RRC   A
048F F528            MOV   SW1,A
                   ;
0491 D8EE            DJNZ  R0,RSW1
0493 D2B5            SETB  ENSW          ;DISABLE SW READING
0495 E528            MOV   A,SW1         ;swap SW1 input/ouput baudrate
0497 C4              SWAP  A
0498 F528            MOV   SW1,A
049A 22              RET
                   ;
049B       READKY:               ;READ ACTIVE KEYS
049B 7808            MOV   R0,#$08 ;CLOCK 8 BITS
049D 7577F8          MOV   COUNT,#$0F8
04A0 8002            SJMP  RKEY2
04A2       RKEY1:
04A2 0577            INC   COUNT         ;NEXT ADDRESS
04A4       RKEY2:
                   ;            *** CRITICAL TIME ***
04A4 308C06          JNB   TR0,RKEY3     ;IF TIMER 0 RUNING
04A7 E58A            MOV   A,TL0         ;(1) READ TIMER
04A9 240B            ADD   A,#$0B        ;(1) IF 11 CYCLES BEFORE TIMEOUT
04AB 40F7            JC    RKEY2         ;(2) YES, WAIT AFTER TIMEOUT
04AD       RKEY3:
04AD C2AF            CLR   EA            ;(1) DISABLE ALL INT
04AF 857790          MOV   P1,COUNT      ;(2) MOVE ADDRESS TO P1
04B2 C2B5            CLR   ENSW          ;(1) ENABLE SW READING
04B4 A296            MOV   C,P1.6        ;(1) GET BIT DATA
04B6 D2B5            SETB  ENSW          ;(1) READY TO BE INT
04B8 D2AF            SETB  EA            ;(1) ENABLE ALL INT
                   ;            *** END OF CRITICAL TIME ***
04BA E526            MOV   A,KEY
04BC 13              RRC   A
04BD F526            MOV   KEY,A
04BF D8E1            DJNZ  R0,RKEY1
```

```
04C1 6326FF          XRL     KEY,#$FF          ;REVERSE ON/OFF
                ;
04C4 E526            MOV     A,KEY             ;ver 4.0 change sw pos.
04C6 6013            JZ      RKEY4             ;if no keys
04C8 23              RL      A                 ;pass copy
04C9 33              RLC     A                 ;get reprint
04CA 9235            MOV     K$REPR,C
04CC 33              RLC     A                 ;get sec. func
04CD 9233            MOV     K$SFUN,C
04CF 33              RLC     A                 ;get clear
04D0 9236            MOV     K$CLEAR,C
04D2 33              RLC     A                 ;get skip
04D3 9234            MOV     K$SKIP,C
                ;
04D5 B4F003          CJNE    A,#$F0,RKEY4      ;check if pause/hold/func/copy
04D8 020BAF          JMP     START             ;yes, restart
04DB         RKEY4:
04DB 22              RET
                ;
                ;   SAMEKEY CHECK IF KEY.0 - KEY.5 CHANGED FROM PREVIOUS ONE
                ;   RETURN Z IF NO CHANGE
                ;
04DC         SAMEKEY:
04DC C026            PUSH    KEY
04DE 919B            CALL    READKY
04E0 D0E0            POP     ACC
04E2 6526            XRL     A,KEY
04E4 22              RET
                ;
                ;        CKRAM, CHECK AVAILABLE RAM
                ;        SAVE TO BOT - TOP, AND UPDATE QTAIL, QHEAD
                ;        SET NO$RAM IF EMPTY EXTERNAL RAM
                ;
04E5         CKRAM:
04E5 853083          MOV     DPH,BOTH
04E8 853182          MOV     DPL,BOTL
04EB 120558          CALL    CPTOP             ;COMPARE WITH TOP
04EE 504A            JNC     NORAM             ;IF EQUAL THEN EMPTY RAM
04F0 8006            SJMP    CKR1
04F2         CKR0:
04F2 120558          CALL    CPTOP             ;SEE IF TOP RAM REACHED
04F5 5043            JNC     NORAM
04F7 A3              INC     DPTR              ;ADVANCE POINTER
04F8         CKR1:
04F8 120566          CALL    TXRAM             ;TEST IF RAM
04FB B574F4          CJNE    A,RAM,CKR0        ;IF NOT, CONTINUE SEARCHING
04FE 858330          MOV     BOTH,DPH          ;YES, FIRST RAM LOC
0501 858231          MOV     BOTL,DPL          ;SAVE TO BOT
0504         CKR2:
0504 120558          CALL    CPTOP             ;COMPARE WITH TOP
0507 5018            JNC     CKR6              ;TOP REACHED, MUST BE TRUE TOP
0509 A3              INC     DPTR
050A         CKR3:
050A 120566          CALL    TXRAM             ;TEST RAM
050D B57402          CJNE    A,RAM,CKR4        ;IF NOT RAM, EXIT
0510 80F2            SJMP    CKR2              ;IF RAM, CHECK NEXT
0512         CKR4:
0512 1582            DEC     DPL               ;GET THE LAST RAM AVAIL.
0514 E582            MOV     A,DPL
0516 B4FF02          CJNE    A,#$0FF,CKR5      ;ADJUST POINTER
0519 1583            DEC     DPH
051B         CKR5:
051B 858233          MOV     TOPL,DPL          ;SET TOP
051E 858332          MOV     TOPH,DPH
0521         CKR6:
                ;
0521 C3              CLR     C                 ;MAKE SURE BUFFER SIZE ½ MARGIN
0522 E533            MOV     A,TOPL            ;QLEN = TOP - BOT
0524 9531            SUBB    A,BOTL
0526 F541            MOV     QLENL,A
```

```
0528 E532              MOV     A,TOPH
052A 9530              SUBB    A,BOTH
052C F540              MOV     QLENH,A
052E 400A              JC      NORAM           ;IF TOP ¼ BOT THEN NO RAM
                   ;                           check enough memory for margins
0530 E540              MOV     A,QLENH
0532 9404              SUBB    A,#QMARX
0534 4004              JC      NORAM           ;IF LEN ¼ MAR THEN NO RAM
                   ;
0536 C228              CLR     NO$RAM          ;CLEAR NO$RAM INDICATOR
0538 800B              SJMP    CKR8
053A          NORAM:
053A D228              SETB    NO$RAM          ;SET NO$RAM INDICATOR
053C 203006            JB      K$PAUSE,CKR8    ;if pause on power-up,don't clear
053F 853133            MOV     TOPL,BOTL       ;Clear buffer size
0542 853032            MOV     TOPH,BOTH
0545          CKR8:
0545 751078            MOV     ITAIL,#IRAML    ;SET HEAD AND TAIL FOR INTERNAL RAM
0548 750878            MOV     IHEAD,#IRAML    ;BUFFER
054B 85310B            MOV     QHEADL,BOTL     ;set qhead
054E 85300A            MOV     QHEADH,BOTH
0551 853113   CKR9:    MOV     QTAILL,BOTL     ;SET QTAIL
0554 853012            MOV     QTAILH,BOTH
0557 22                RET
                   ;
0558          CPTOP:
0558 E582              MOV     A,DPL
055A B53307            CJNE    A,TOPL,CPT$EXT
055D E583              MOV     A,DPH
055F B53202            CJNE    A,TOPH,CPT$EXT
0562 C3               CLR     C
0563 22                RET
0564          CPT$EXT:
0564 D3                SETB    C
0565 22                RET
                   ;
0566          TXRAM:                            ;TEST RAM
0566 C2B5              CLR     REFRSH          ;STOP REFRESH ENABLLE READING OF RAM
0568 E0                MOVX    A,@DPTR
0569 F574              MOV     RA.1,.
056B F4                CPL     A
056C F0                MOVX    @DPTR,A
056D E0                MOVX    A,@DPTR
056E F4                CPL     A
056F F0                MOVX    @DPTR,A
0570 D2B5              SETB    REFRSH
0572 22                RET
                   ;
0573          FILRAM:                           ;FILL UP RAM WITH FILCH PATTERN
0573 851F74            MOV     RAM,FILCH       ;use fil char $00
0576          RAMFIL:
0576 853182            MOV     DPL,BOTL
0579 853083            MOV     DPH,BOTH
057C E574              MOV     A,RAM
057E 120593            CALL    MWRITE          ;write to memory
0581          FIL$2:
0581 B158              CALL    CPTOP           ;check if top reached
0583 502C              JNC     S$SET2          ;yes, exit
                   ;
0585 A3                INC     DPTR
0586 E574              MOV     A,RAM
0588 120593            CALL    MWRITE
058B 80F4              JMP     FIL$2
                   ;
                   ;
058D          MREAD:                            ;memory read
058D C2B5              CLR     REFRSH          ;disable refresh, enable read/write
058F E0                MOVX    A,@DPTR         ;read from DPTR
0590 D2B5              SETB    REFRSH          ;enable refresh, disable read/write
```

```
0592 22                  RET
0593          MWRITE:
0593 C2B5                CLR     REFRSH
0595 F0                  MOVX    @DPTR,A         ;write to loc DPTR
0596 D2B5                SETB    REFRSH
0598 22                  RET
              ;
              ;          S$SET   SET SW2 SELECTION FROM KEY SWITCHES
              ;
0599          S$SET:
0599 120E10              CALL    AUTO            ;use auto routine
059C 85763F              MOV     LPP,REPL        ;move lower byte as lines per page
059F C21A                CLR     V$FF            ;assume no FF char
05A1 E575                MOV     A,REPH          ;move upper byte as FF char
05A3 600C                JZ      S$SET2          ;if zero then no change
05A5 C219                CLR     V$ESC           ;assume no ESC prefix for FF
05A7 D21A                SETB    V$FF            ;use FF char
05A9 30E705              JNB     ACC.7,S$SET2    ;if ACC.7 on then ESC required
05AC D219                SETB    V$ESC
05AE 75461B              MOV     FFESC,#ESC      ;assume standard ESC char
05B1          S$SET2:
05B1 22                  RET
              ;
              ;          S$DEV   TRANSFER DEVICE FF TABLE TO IRAM, BASE ON SW2.4-.7
              ;
05B2          S$DEV:
05B2 75461B              MOV     FFESC,#ESC      ;FFESC default to #ESC
05B5 E529                MOV     A,SW2           ;GET DEVICE SELECTION
05B7 C4                  SWAP    A               ;GET UPPER NIBBLE
05B8 540F                ANL     A,#$0F          ;ONLY 4 BITS COUNT
05BA 23                  RL      A               ;TABLE X 4
05BB 23                  RL      A               ;use **** 0000 on SW2
05BC 900F83              MOV     DPTR,#S$TABL    ;LOAD SELECTION TABLE
05BF F8                  MOV     R0,A            ;SAVE OFFSET
05C0 7A02                MOV     R2,#2           ;2 BYTES TRANSFER
05C2 7942                MOV     R1,#FFTBL       ;DESTINATION
05C4 93                  MOVC    A,@A+DPTR       ;GET FIRST ENTRY OF TABLE
05C5 F523                MOV     V$FLAG,A        ;IT IS A V$FLAG
05C7 08                  INC     R0              ;GET NEXT ENTRY
05C8 E8                  MOV     A,R0
05C9 93                  MOVC    A,@A+DPTR       ;2ND BYTE OF TABLE
05CA F53F                MOV     LPP,A           ;IT IS A LINE PER PAGE
05CC 08                  INC     R0              ;NEXT ONE
05CD          S$DEV2:
05CD DA01                DJNZ    R2,S$DEV3       ;READ NEXT 6 BYTES
05CF 22                  RET
05D0          S$DEV3:
05D0 E8                  MOV     A,R0
05D1 93                  MOVC    A,@A+DPTR
05D2 F7                  MOV     @R1,A           ;TRANSFER TO FFTBL
05D3 09                  INC     R1
05D4 08                  INC     R0
05D5 80F6                JMP     S$DEV2          ;LOOP
              ;
              ;
              ;          S$LOAD  LOAD DEVICE FF TABLE FROM RECEIVER
              ;
              ;          USING FORMAT :
              ;          ESC;V$FLAG(LOWER 4 BITS);LPP;FFESC(7 BITS);
              ;          FFCHAR,FFCHAR,FFCHAR,FFCHAR....
              ;          FFCHAR MAY BE A FF CHAR OR ESC + CHAR
              ;          LOADING START WITH RECEIVING OF A ESC, STOP AFTER 4 FFCHAR OR
              ;          SWITCHES CHANGE TO OTHER THAN K$DIAG/K$RCV/K$CHAR
              ;
05D7          S$LOAD:
05D7 D22A                SETB    X$STOP          ;STOP XMT
05D9 C22B                CLR     R$STOP          ;ENABLE RCV
05DB 432707              ORL     LED,#$07        ;ALL LEDS ON
05DE 9153                CALL    DLED
05E0          S$L1:
```

```
05E0 120639          CALL    S$INCH          ;LOAD A CHAR
05E3 4051            JC      S$LEXT          ;EXIT COND.
05E5 E53E            MOV     A,IOCHAR        ;GET THE CHAR
05E7 B41BF6          CJNE    A,#ESC,S$L1     ;LOOKING FOR ESC
05EA 120639          CALL    S$INCH          ;GET NEXT CHAR
05ED 4047            JC      S$LEXT          ;EXIT COND.
05EF E53E            MOV     A,IOCHAR
05F1 547F            ANL     A,#$7F          ;ONLY LOWER 7 BITS GOES TO V$FLAG
05F3 F523            MOV     V$FLAG,A
05F5 120648          CALL    S$INCH7
05F8 403C            JC      S$LEXT
05FA 853E3F          MOV     LPP,IOCHAR      ;MOVE 7 BITS IOCHAR TO LPP
05FD C238            CLR     LED.0           ;DONE STAGE 1
05FF 9153            CALL    DLED
0601 120648          CALL    S$INCH7         ;GET NEXT ASCII 7 BITS CHAR
0604 4030            JC      S$LEXT
0606 853E46          MOV     FFESC,IOCHAR    ;GOT TO BE FFESC
0609 7A04            MOV     R2,#4           ;NEXT 4 FF CHAR STRING
060B 7942            MOV     R1,#FFTBL       ;DESTINATION FFTBL
060D 7700            MOV     @R1,#$0         ;CLEAR BEFORE WRITTEN
060F C239            CLR     LED.1
0611 9153            CALL    DLED            ;DONE STAGE 2
0613        S$L3:
0613 DA19            DJNZ    R2,S$L8         ;READ UNTIL 4 FFCHAR
0615        S$L4:
0615 120648          CALL    S$INCH7         ;READ A CHAR
0618 401C            JC      S$LEXT
061A E53E            MOV     A,IOCHAR
061C B54606          CJNE    A,FFESC,S$L5    ;IS IT ESC?
061F E7              MOV     A,@R1           ;YES, SET BIT 7
0620 4480            ORL     A,#$80
0622 F7              MOV     @R1,A
0623 80F0            JMP     S$L4
0625        S$L5:
0625 E7              MOV     A,@R1           ;COMBINE BIT 7 AND CHAR
0626 453E            ORL     A,IOCHAR
0628 F7              MOV     @R1,A
0629 09              INC     R1              ;READY FOR NEXT FFCHAR
062A 7700            MOV     @R1,#$0
062C 80E5            JMP     S$L3
062E        S$L8:
062E C23A            CLR     LED.2           ;DONE LAST STAGE
0630 9153            CALL    DLED
0632        S$L9:
0632 91DC            CALL    SAMEKEY
0634 60FC            JZ      S$L9            ;WAIT TILL SWITCHES CHANGE
0636        S$LEXT:
0636 C22A            CLR     X$STOP
0638 22              RET
            ;
0639        S$INCH:                          ;RECEIVE A CHAR
0639 120719          CALL    INCHAR
063C 200202          JB      BF$EMTY,S$IN2   ;NO, BUFFER EMPTY
063F C3              CLR     C               ;GOOD CHAR
0640 22              RET                     ;EXIT
0641        S$IN2:
0641 919B            CALL    READKY          ;CHECK KEYS
0643 3033F3          JNB     K$SFUN,S$INCH   ;keys are O.K.
0646 D3              SETB    C
0647 22              RET                     ;CHANGED, EXIT
            ;
0648        S$INCH7:
0648 120719          CALL    INCHAR
064B 200208          JB      BF$EMTY,S$IN4
064E E53E            MOV     A,IOCHAR
0650 C2E7            CLR     ACC.7           ;DROP 7-TH BIT
0652 F53E            MOV     IOCHAR,A
0654 C3              CLR     C
0655 22              RET
```

```
0656            S$IN4:
0656 919B               CALL    READKY
0658 3033ED             JNB     K$SFUN,S$INCH7
065B D3                 SETB    C
065C 22                 RET
                ;
                ;       MLEDS   LED messages
                ;
065D            MLED5:                          ;enter func reset
065D 12067F             CALL    MLED1
0660            MLED0:                          ;main entrance
0660            MLED2:                          ;enable/disable mode
0660 120D2B             CALL    J$MFUN          ;get mode
0663            TLEDX4:
0663 757708             MOV     COUNT,#$08      ;count 8 times
0666            TLEDX:
0666 9153               CALL    DLED            ;@ @ @ @
0668 1206A0             CALL    DELAY5          ;delay 1/5 sec
066B 120698             CALL    D$LEDX          ;reverse
066E 1206B1             CALL    DELAY3          ;delay 40 m sec
0671 D577F2             DJNZ    COUNT,TLEDX     ;count out ?
0674 22                 RET
                ;
0675            MLED4:                          ;error message
0675 74AA               MOV     A,#$AA          ;* o * o
0677 020681             JMP     TLEDC
067A            MLED3:                          ;util entrance
067A 7444               MOV     A,#$44          ;@ @ @ 0
067C 020681             JMP     TLEDC
067F            MLED1:                          ;function exit
067F 7480               MOV     A,#$80          ;circular @ o o o
0681            TLEDC:
0681 C027               PUSH    LED
0683 757708             MOV     COUNT,#$08      ;rotate 8 times
0686 F527               MOV     LED,A           ;get initial data
0688            TLEDC1:
0688 9153               CALL    DLED            ;@ @ @ @
068A 1206A0             CALL    DELAY5          ;delay 120 ms
068D E527               MOV     A,LED
068F 23                 RL      A               ;circular
0690 F527               MOV     LED,A
0692 D577F3             DJNZ    COUNT,TLEDC1    ;count out ?
0695 D027               POP     LED
0697 22                 RET
                ;
0698            D$LEDX:                         ;INVERT LEDS
0698 E527               MOV     A,LED
069A 6487               XRL     A,#$87          ;ONLY LED.0 - LED.2
069C F527               MOV     LED,A
069E 8153               JMP     DLED
                ;
06A0            DELAY5:                         ;DELAY 1/5 SEC
06A0 752A03             MOV     PARAM,#3        ;3 X 40 MS = 120 MS
06A3 1206AA             CALL    DELAY4
06A6 22                 RET
                ;
06A7            DELAY1:                         ;DELAY FOR 1 SEC
06A7 752A19             MOV     PARAM,#25       ;25 X 40MS = 1 SEC
06AA            DELAY4:
06AA 1206B1             CALL    DEL40
06AD D52AFA             DJNZ    PARAM,DELAY4
06B0 22                 RET
                ;
06B1            DELAY3:
06B1            DEL40:                          ;DELAY 40 MS
06B1 C02A               PUSH    PARAM
06B3 752A30             MOV     PARAM,#$30      ;AT 7.3728 MHZ 1 CYCLE = 1.6276 US
06B6            DELAY0:
06B6 D9FE               DJNZ    R1,DELAY0       ;HERE DELAY 256X(1.6276X2)=833.33 US
06B8 D52AFB             DJNZ    PARAM,DELAY0    ;833.33 X 48 = 40 000 US
```

```
06BB D02A              POP     PARAM
06BD 22                RET                     ;OR 40 MS
                   ;
06BE           D$DIAG:                         ;diagnostic
06BE D160              CALL    MLED2           ;test LED
06C0 1206F1            CALL    TKEY            ;check membrane switch
06C3 D160              CALL    MLED2           ;OK to proceed
06C5 9178      D$DIA2: CALL    READSW          ;real-time switch checking
06C7 E529              MOV     A,SW2           ;check first sw
06C9 303201            JNB     K$FUNC,D$DIA3   ;if FUNC swap
06CC C4                SWAP    A
06CD 916A      D$DIA3: CALL    SLED0           ;display lower 4 nibble
06CF 3033F3            JNB     K$SFUN,D$DIA2   ;if second func, exit
06D2 D160              CALL    MLED2           ;OK to next
06D4           D$DIA4:
06D4 9178              CALL    READSW
06D6 E528              MOV     A,SW1
06D8 203201            JB      K$FUNC,D$DIA5   ;check second sw
06DB C4                SWAP    A
06DC 916A      D$DIA5: CALL    SLED0
06DE 3033F3            JNB     K$SFUN,D$DIA4
06E1 D160              CALL    MLED2
06E3           D$DIA6:
06E3 120709            CALL    CKSUM           ;check checksum
06E6 E9                MOV     A,R1
06E7 303201            JNB     K$FUNC,D$DIA7
06EA C4                SWAP    A
06EB 916A      D$DIA7: CALL    SLED
06ED 3033F3            JNB     K$SFUN,D$DIA6
06F0 22                RET
               ;
               ;       TKEY    TEST KEY
               ;
06F1           TKEY:
06F1 7A08              MOV     R2,#8           ;8 KEYS
06F3 7901              MOV     R1,#$01         ;START FROM KEY 1
06F5           TKEY1:
06F5 EA                MOV     A,R2
06F6 14                DEC     A
06F7 5327F8            ANL     LED,#$F8
06FA 4227              ORL     LED,A
06FC 9153              CALL    DLED
06FE           TKEY2:
06FE 919B              CALL    READKY
0700 E9                MOV     A,R1            ;MATCH R1
0701 B526FA            CJNE    A,KEY,TKEY2     ;LOOP UNTIL MATCHED
0704 23                RL      A               ;SHIFT 1 BIT LEFT
0705 F9                MOV     R1,A
0706 DAED              DJNZ    R2,TKEY1        ;ALL 8 KEYS TESTED ?
0708 22                RET                     ;YES
               ;
0709           CKSUM:                  ;get checksum on ROM
0709 900000            MOV     DPTR,#$0000     ;start from program address 0
070C 7900              MOV     R1,#$0           ;R1 initiated to 0
070E           CKS1:
070E E4                CLR     A               ;displacement 0
070F 93                MOVC    A,@A+DPTR       ;get program code
0710 69                XRL     A,R1            ;excl or
0711 F9                MOV     R1,A            ;save on R1
0712 A3                INC     DPTR            ;increment address
0713 7410              MOV     A,#$10
0715 B583F6            CJNE    A,DPH,CKS1      ;check if end of address, ie hex 1000
0718 22                RET                     ;no, loop back
                                               ;yes, exit
               ;
               ;
                       END
                       INCLUD A:DIAG.ASM
               ;       8031    DEBUG FUNCTIONS
               ;
```

```
0719            INCHAR:           ;INPUT CHAR TO IOCHAR
0719 C0D0                PUSH   PSW
071B C082                PUSH   DPL
071D C083                PUSH   DPH
071F C0E0                PUSH   ACC             ;save all regs
0721 1130                CALL   CKXMT           ;CHECK IF XMT BUFFER EMPTY
0723 4004                JC     IN$OK2          ;NOT EMPTY
0725 D202                SETB   BF$EMTY         ;SET XMT BUFFER EMPTY P$FLAG
0727 8008                SJMP   IN$RET          ;EXIT
0729            IN$OK2:
0729 1149                CALL   LDXMT           ;LOAD DATA TO A
072B F53E                MOV    IOCHAR,A        ;MOVE CHAR TO IOCHAR
072D 1177                CALL   ADXMT           ;ADVANCE TO NEXT LOC
072F C201                CLR    BF$WAIT         ;CLEAR XMT WAITE P$FLAG
0731            IN$RET:
0731 D0E0                POP    ACC             ;restore all regs
0733 020751              JMP    OUT$EXT
                ;
0736            OUTCHAR:                  ;OUTPUT CHAR FROM IOCHAR
0736 C0D0                PUSH   PSW
0738 C082                PUSH   DPL
073A C083                PUSH   DPH
073C 11BF                CALL   CKRCV
073E D22C                SETB   OUT$NAC         ;OUT CHAR NOT ACCEPTED
0740 E53E                MOV    A,IOCHAR        ;MOVE CHAR TO A
0742 11C9                CALL   LDRCV
0744 4002                JC     OUT$OK
0746 8009                SJMP   OUT$EXT
0748            OUT$OK:
0748 300204              JNB    BF$EMTY,OUT$NXT ;IF BF$EMTY SET THEN REACTIVIATE XMT
074B D203                SETB   XM$REQ          ;INDICATE TI TO BE SET BY MAIN LOOP
074D C202                CLR    BF$EMTY         ;POINTER ADVANCED, BUFFER NOT EMPTY
074F            OUT$NXT:
074F C22C                CLR    OUT$NAC
0751            OUT$EXT:
0751 D083                POP    DPH
0753 D082                POP    DPL
0755 D0D0                POP    PSW
0757 22                  RET
                ;
                ;
0758            ACTXMT:           ;activiate xmt and process receiving data
0758 300605              JNB    RC$FULL,ACTX0   ;IF RCV BUFFER FULL, STOP RECEIVING
075B 201502              JB     PIO$IN,ACTX0    ;IF PIO INPUT , RCV$RDY ALREADY OFF
075E C2B4                CLR    RCV$RDY         ;FOR SIO, STOP RECEIVING
0760            ACTX0:
0760 120766              CALL   ACTXM
0763 020790              JMP    ACTRC
                ;
0766            ACTXM:            ;ACTIVIATE XMT
0766 300321              JNB    XM$REQ,ACTX1
0769 30090B              JNB    SIO$OUT,ACTX2   ;if SIO XMT
076C 30B320              JNB    XMT$RDY,ACT$EXT ;XMT READY
076F C203                CLR    XM$REQ
0771 20991B              JB     TI,ACT$EXT
0774 D299                SETB   TI
0776 22                  RET
0777            ACTX2:
0777 300A0C              JNB    SIO2OUT,ACTX3   ;if SIO2 XMt
077A 30B312              JNB    XMT$RDY,ACT$EXT
077D C203                CLR    XM$REQ
077F 20A90D              JB     ET0,ACT$EXT     ;if sio2xmt active, exit
0782 7124                CALL   SETSS           ;set baud rate
0784 6136                JMP    SET2XT          ;YES, REACTIVIATE SIO2 XMT
0786            ACTX3:
0786 C203                CLR    XM$REQ
0788 D212                SETB   XMT$ACK         ;must be PIO, assume ACKed
078A            ACTX1:
078A 301602              JNB    PIO$OUT,ACT$EXT ;if PIO output, process output
078D 7161                CALL   PIO$XMT         ;MUST BE PIO XMT
```

```
078F              ACT$EXT:
078F 22                   RET
                  ;
0790              ACTRC:
                  ;
0790 202B0A               JB      R$STOP,ACTR6    ;if hold , don't activiate rec
0793 201508               JB      PIO$IN,ACTR4    ;if PIO input, check PIO
0796 300504               JNB     RC$REQ,ACTR6    ;no, assume sio
0799 D2B4                 SETB    RCV$RDY         ;translate RC$REQ to RCV$RDY
079B C205                 CLR     RC$REQ
079D              ACTR6:
079D 22                   RET
                  ;
079E              ACTR4:
079E 300507               JNB     RC$REQ,ACTR5    ;RC$REQ ?
07A1 201404               JB      PR$DATA,ACTR5   ;if data received, wait till processed
07A4 D2B4                 SETB    RCV$RDY         ;set receiver ready
07A6 C205                 CLR     RC$REQ
07A8              ACTR5:
07A8 61A0                 JMP     PIO$REC         ;check receiver
                  ;
07AA              OUTCH:                          ;FORCE OUTPUT A CHAR
07AA F53E                 MOV     IOCHAR,A
07AC              OUTCH1:
07AC F136                 CALL    OUTCHAR
07AE 302C04               JNB     OUT$NAC,OUTCH3
07B1 F166                 CALL    ACTXM
07B3 80F7                 SJMP    OUTCH1
07B5              OUTCH3:
07B5 22                   RET
                  ;
07B6              OUTHEX:                         ;OUTPUT A HEX CHAR
07B6 C0E0                 PUSH    ACC
07B8 C4                   SWAP    A
07B9 1207BE               CALL    OUTH
07BC D0E0                 POP     ACC
07BE              OUTH:
07BE 1207C3               CALL    CONHEX
07C1 80E7                 SJMP    OUTCH
                  ;
07C3              CONHEX:                         ;CONVERT A TO HEX
07C3 540F                 ANL     A,#$0F
07C5 2490                 ADD     A,#$90
07C7 D4                   DA      A
07C8 3440                 ADDC    A,#$40
07CA D4                   DA      A
07CB 22                   RET
                  ;
07CC              OUTHEXS:                        ;OUTPUT HEX IN A AND A SPACE
07CC F1B6                 CALL    OUTHEX
07CE 7420                 MOV     A,#' '
07D0 F1AA                 CALL    OUTCH
07D2 22                   RET
                  ;
07D3              DISPADD:                        ;DISPLAY LF AND ADDRESS
07D3 E582                 MOV     A,DPL
07D5 540F                 ANL     A,#$0F
07D7 7012                 JNZ     DISPA1
07D9              DISPAD1:
07D9 1207EC               CALL    CRLF
07DC              DISPAD2:
07DC E583                 MOV     A,DPH
07DE F1B6                 CALL    OUTHEX
07E0 E582                 MOV     A,DPL
07E2 F1B6                 CALL    OUTHEX
07E4 ED                   MOV     A,R5
07E5 F1AA                 CALL    OUTCH
07E7 7420                 MOV     A,#' '
07E9 F1AA                 CALL    OUTCH
07EB              DISPA1:
```

```
07EB 22                 RET
                    ;
07EC            CRLF:
07EC 740D           MOV     A,#CR       ;SEND A CR
07EE F1AA           CALL    OUTCH
07F0 740A           MOV     A,#LF       ;SEND A LF
07F2 80B6           JMP     OUTCH
                    ;
07F4            DISPASC:                ;DISPLAY ASCII CHAR
07F4 C2E7           CLR     ACC.7       ;STRIP OFF 7-TH BIT
07F6 F53E           MOV     IOCHAR,A
07F8 54E0           ANL     A,#$E0      ;CHECK IF UNDER $20
07FA 7003           JNZ     DISPAC2     ;NO
07FC 753E2E         MOV     IOCHAR,#'.'     ;YES, REPLACED BY '.'
07FF            DISPAC2:
07FF E53E           MOV     A,IOCHAR
0801 B47F02         CJNE    A,#$7F,DISPAC3
0804 742E           MOV     A,#'.'      ;IF RUB, REPLACED BY '.'
0806            DISPAC3:
0806 80A2           JMP     OUTCH

;DISPLAY:    ;DISPLAY MEMORY CONTENT
                ;       MOV     R5,#':'
                ;       CALL    DISPADD ;DISPLAY ADDRESS IF XXX0
                ;       CLR     REFRSH
                ;       MOVX    A,@DPTR
                ;       SETB    REFRSH
                ;       CALL    OUTHEXS
                ;       INC     DPTR
                ;       RET
                ;
0808            DISPREG:                ;DISPLAY INTERNAL MEMORY OR REGS
0808 758300         MOV     DPH,#$0     ;ALL REGS ARE AT 0 PAGE
080B 7D2E           MOV     R5,#'.'
080D 1207D3         CALL    DISPADD
0810 A982           MOV     R1,DPL
0812 E7             MOV     A,@R1
0813 1207CC         CALL    OUTHEXS
0816 A3             INC     DPTR
0817 B97F03         CJNE    R1,#$7F,DISPR1
081A 758200         MOV     DPL,#$00
081D            DISPR1:
081D 22             RET
                ;
                ;.      Display buffer information
                ;
081E            D$MESS:
081E 22             RET             ;disable D$MESS to save spaces
                ;       CALL    CRLF
                ;       MOV     DPTR,#MESS  ;get message
                ;DISPBUF:            ;DISPLAY BUFFER LOC
                ;       CLR     A           ;get table
                ;       MOVC    A,@A+DPTR   ;read first entry
                ;       JZ      CRLF        ;if $00, exit
                ;       MOV     R5,A        ;else fill char
                ;       CLR     A
                ;       INC     DPTR
                ;       MOVC    A,@A+DPTR   ;get next entry
                ;       MOV     R1,A        ;as pointer
                ;       PUSH    DPH
                ;       PUSH    DPL
                ;       MOV     DPH,@R1     ;get register content
                ;       INC     R1
                ;       MOV     DPL,@R1
                ;       CALL    DISPAD2     ;display them
                ;       POP     DPL
                ;       POP     DPH
                ;       INC     DPTR
                ;       JMP     DISPBUF
```

```
              ;MESS:                          ;message pointer
              ;         DB      '-',BOTH
              ;         DB      ' ',TOPH
              ;         DB      ' ',QTAILH
              ;         DB      '.',XPAGE
              ;         DB      '-',QHEADH
              ;         DB      $00,$00
              ;
              ;
081F          MTEST:
081F  7D2A             MOV     R5,#'*'
0821  1207D3           CALL    DISPADD
0824  120566           CALL    TXRAM
0827  6574             XRL     A,RAM
0829  1207CC           CALL    OUTHEXS
082C  A3               INC     DPTR
082D  22               RET ;         D$COPY  FUNCTION: COPY FROM QTAIL TO QHEAD
              ;         F$CONT SET - CONTINUE COPY UNTIL KEY CHANGED AT END OF BUFFER
              ;         F$CONT CLEAR - ONE COPY TILL KEY CHANGED OR END OF BUFFER
              ;
082E          D$COPY:
082E  202603           JB      F$BACK,D$C00       ;check if pointer been reset
0831  120AD4           CALL    F$SETB             ;no, set to beginning
0834          D$C00:
0834  8B82             MOV     DPL,R3             ;transfer new pointer
0836  8A83             MOV     DPH,R2
0838  751E00           MOV     YSAVE,#$00         ;zero decomp char
              ;
083B          D$C01:
083B  E583             MOV     A,DPH
083D  B5A0F            CJNE    A,QHEADH,D$C02     ;COMPARE WITH QHEAD
0840  E582             MOV     A,DPL
0842  B5B0A            CJNE    A,QHEADL,D$C02
0845  302D06           JNB     F$CONT,D$C06       ;END OF BUFFER, CHECK IF CONTINUING
0848  12049B           CALL    READKY             ;check if sec func to stop
084B  3033E0           JNB     K$SFUN,D$COPY      ;no, continue next copy
084E          D$C06:
084E  22               RET                        ;COPY, IF NOT EXIT
084F          D$C02:
084F  301D1B           JNB     F$COMP,D$C03       ;if compression mode
0852  E51E             MOV     A,YSAVE            ;get comp char
0854  700E             JNZ     D$C07              ;nothing outstanding
0856  12058D           CALL    MREAD              ;get next char
0859  30E714           JNB     ACC.7,D$C09        ;normal char
085C  04               INC     A                  ;decrement one space
085D  F51E             MOV     YSAVE,A             ;compr char
085F  7420             MOV     A,#SPACE
0861  020870           JMP     D$C09
0864          D$C07:
0864  7420             MOV     A,#SPACE           ;space char
0866  1207AA           CALL    OUTCH              ;output
0869  051E             INC     YSAVE              ;decriment count
086B  80E2             JMP     D$C02              ;continue
086D  12058D   D$C03:  CALL    MREAD              ;read memory
0870  1207AA   D$C09:  CALL    OUTCH              ;SEND CHAR TO XMT LINE
0873  A3               INC     DPTR               ;ADVANCE POINTER
0874  E582             MOV     A,DPL              ;CHECK TOP
0876  B5330B           CJNE    A,TOPL,D$C04
0879  E583             MOV     A,DPH
087B  B53206           CJNE    A,TOPH,D$C04
087E  853182           MOV     DPL,BOTL           ;YES, LOOP BACK TO BOTTOM
0881  853083           MOV     DPH,BOTH
0884          D$C04:
0884  202DB4           JB      F$CONT,D$C01       ;IF CONTINUE, CHECK KEY AT END OF
0887          D$C05:
0887  12049B           CALL    READKY             ;else check sec func to stop
088A  3033AE           JNB     K$SFUN,D$C01
088D  22               RET                        ;YES, EXIT
```

```
;       D$FULL  FUNCTION: SET MAXIMUM BUFFER OR BUFFER FULL
;       BACKWARD XMT POINTER QTAIL AS FAR BACK AS DATA IS VALID OR
;       NEXT TO QHEAD. DATA CONSIDERED AS BLANK IF CONSECUTIVE 256
;       BYTES OF FILCH IS DETECTED.
;
088E            D$FULL:
088E 202603             JB      F$BACK,D$FU1    ;GET BACKWARD LIMIT
0891 120AD4             CALL    F$SETB
0894            D$FU1:
0894 8B13               MOV     QTAILL,R3       ;MOVE BACKWARD LIMIT TO QTAIL
0896 8A12               MOV     QTAILH,R2
0898 7400               MOV     A,#$0
089A F50F               MOV     RLINE,A         ;CLEAR PAGE INFO.
089C F517               MOV     XLINE,A
089E F50E               MOV     RPAGE,A
08A0 F516               MOV     XPAGE,A
08A2 8B15               MOV     PTAILL,R3
08A4 8B0D               MOV     PHEADL,R3
08A6 8A14               MOV     PTAILH,R2
08A8 8A0C               MOV     PHEADH,R2
08AA            D$FU2:
08AA C221               CLR     F$STEP
08AC 120B45             CALL    F$RCV           ;FORWARD SCAN TILL RCV PAGE BUFFER
08AF 3020F8             JNB     F$STOP,D$FU2    ;CATCH-UP
08B2 22                 RET

;       D$HEX   FUNCTION: DISPLAY MEMORY IN HEX TILL KEY CHANGED
;
;D$HEX:
;               CALL    DISPLAY
;               CALL    READKY          ;check sec func key to stop
;               JNB     K$SFUN,D$HEX    ;if not pressed, continue
;               JMP     CRLF
;
;       D$BUFF  FUNCTION: DISPLAY BUFFER IN HEX
;
08B3            D$BUFF:
08B3 202603             JB      F$BACK,D$BU     ;if pointer reset
08B6 120AD4             CALL    F$SETB          ;no, set to beginning
08B9            D$BU:
08B9 7D3A               MOV     R5,#':'
08BB 8A1A               MOV     SAVEH,R2
08BD 8B1B               MOV     SAVEL,R3
08BF C22E               CLR     Y$LOOP          ;INDICATE FIRST LOOP
08C1 8B82               MOV     DPL,R3          ;LOAD BUFFER START POINTER
08C3 8A83               MOV     DPH,R2
08C5            D$BU0:
08C5 E582               MOV     A,DPL           ;COMPARE POINTER TO TOP
08C7 B5330B             CJNE    A,TOPL,D$BU1
08CA E583               MOV     A,DPH
08CC B53206             CJNE    A,TOPH,D$BU1
08CF 853182             MOV     DPL,BOTL        ;CIRCULAR TO BOTTOM.
08D2 853083             MOV     DPH,BOTH
08D5            D$BU1:
08D5 E582               MOV     A,DPL           ;COMPARE TO QHEAD, END O' BUFFER
08D7 B50B0B             CJNE    A,QHEADL,D$BU3
08DA E583               MOV     A,DPH
08DC B50A06             CJNE    A,QHEADH,D$BU3
08DF 302E0C             JNB     Y$LOOP,D$BU4    ;IF FIRST LOOP THEN LOOP TEXT
08E2 0207EC             JMP     CRLF            ;ELSE CRLF
08E5            D$BU3:
08E5 202E19             JB      Y$LOOP,D$BUA    ;IF SECOND LOOP
08E8 E582               MOV     A,DPL           ;CHECK DLP
08EA 540F               ANL     A,#$0F          ;CRLF TIME ?
08EC 7023               JNZ     D$BU6           ;NO, CONTINUE
08EE            D$BU4:
08EE C082               PUSH    DPL             ;SAVE DPL , RESTART POINT
08F0 851B82             MOV     DPL,SAVEL       ;SECOND LOOP
```

```
08F3 851A83            MOV    DPH,SAVEH       ;START FROM LINE BEGINNING
08F6 D01B              POP    SAVEL           ;SAVE DPL TO BE CHECKED BY 2ND
08F8 D22E              SETB   Y$LOOP          ;INDICATES SECOND LOOP
08FA 7420              MOV    A,#' '          ;APPEND A SPACE
08FC 1207AA            CALL   OUTCH
08FF 80C4              JMP    D$BU0
0901         D$BUA:
0901 E582              MOV    A,DPL           ;CHECK IF SAVEL REACHED ?
0903 B51B0B            CJNE   A,SAVEL,D$BU6   ;NO, CONTINUE
0906         D$BU5:
0906 85821B            MOV    SAVEL,DPL       ;SAVE LINE BEGINNING
0909 85831A            MOV    SAVEH,DPH
090C 1207D9            CALL   DISPADI         ;CRLF AND ADDRESS
090F C22E              CLR    Y$LOOP          ;INDICATES FIRST LOOP
0911         D$BU6:
0911 12058D            CALL   MREAD           ;read memory
0914 302E06            JNB    Y$LOOP,D$BU7    ;IF FIRST LOOP
0917 1207F4            CALL   DISPASC         ;SECOND LOOP, ASCII TEXT
091A 020925            JMP    D$BU9
091D         D$BU7:
091D 304A02            JNB    SIO$B8,D$BU8    ;IF 7 BITS
0920 C2E7              CLR    ACC.7           ;YES, STRIP OFF 7-TH
0922         D$BU8:
0922 1207CC            CALL   OUTHEXS
0925         D$BU9:
0925 A3                INC    DPTR            ;ADVANCE POINTER
0926 12049B            CALL   READKY
0929 303399            JNB    K$SFUN,D$BU0    ;check if Sec Func depressed
092C 0207EC            JMP    CRLF
             ;
             ;   D$EMTY  FUNCTION: MOVE QTAIL TO QHEAD, BUFFER EMPTY
             ;
092F         D$EMTY:
092F 850B13            MOV    QTAILL,QHEADL   ;MOV QHEAD TO QTAIL
0932 850A12            MOV    QTAILH,QHEADH
0935 301B08            JNB    F$PAGE,D$EM4    ;IF PAGE MODE ?
0938 C221              CLR    F$STEP          ;YES, SET FAST SCAN
093A         D$EM2:
093A 120B45            CALL   F$RCV           ;RCV PAGE SCAN
093D 3020FA            JNB    F$STOP,D$EM2    ;CATCH-UP
0940         D$EM4:
0940 850D15            MOV    PTAILL,PHEADL   ;UPDATE PAGE INFO.
0943 850C14            MOV    PTAILH,PHEADH
0946 850E16            MOV    XPAGE,RPAGE
0949 850F17            MOV    XLINE,RLINE
094C 22                RET
             ;
             ;   D$IRAM  FUNCTION: DISPLAY INTERNAL RAM
             ;
094D         D$IRAM:
094D 1108              CALL   DISPREG
094F 12049B            CALL   READKY          ;check if sec func pressed
0952 3033F9            JNB    K$SFUN,D$IRAM   ;no, continue
0955 0207EC            JMP    CRLF
             ;
             ;   D$MEM   FUNCTION: DISPLAY MEMORY TEST RESULT
             ;
0958         D$MEM:
0958 851983            MOV    DPH,SAVEM       ;get last DPH loc
095B 758200            MOV    DPL,#$0         ;start from XX00
095E         D$MEM2:
095E 111F              CALL   MTEST
0960 12049B            CALL   READKY          ;check if sec func pressed
0963 3033F8            JNB    K$SFUN,D$MEM2
0966 858319            MOV    SAVEM,DPH
0969 0207EC            JMP    CRLF
             ;
             ;   D$ADV   FUNCTION: DISPLAY ADVERTISEMENT LOGO
             ;
```

```
096C            D$ADV:
096C 900FC3             MOV     DPTR,#LOGO              ;LOGO POSITION
096F            D$ADV2:
096F E4                 CLR     A
0970 93                 MOVC    A,@A+DPTR               ;LOAD CODE
0971            D$ADV4:
0971 6006               JZ      D$ADV8                  ;IF DATA = 0, END OF MESSAGE
0973 1207AA             CALL    OUTCH
0976 A3                 INC     DPTR                    ;ADVANCE TO NEXT
0977 80F6               JMP     D$ADV2
0979            D$ADV8:
                ;
0979 C3                 CLR     C                       ;calculate bytes in buffer
097A E532               MOV     A,TOPH
097C 9530               SUBB    A,BOTH
097E 2401               ADD     A,#1                    ;add one accounts for FF diff.
0980 13                 RRC     A                       ;divide by 4
0981 03                 RR      A
0982 75F00A             MOV     B,#10                   ;convert to decimal
0985 84                 DIV     AB                      ;divide by ten
0986 4430               ORL     A,#$30                  ;convert tenth to ASCII
0988 1207AA             CALL    OUTCH                   ;send it out
098B C5F0               XCH     A,B                     ;get units
098D 4430               ORL     A,#$30                  ;convert to ASCII
098F 1207AA             CALL    OUTCH                   ;send it out
0992 744B               MOV     A,#'K'
0994 1207AA             CALL    OUTCH
0997 7420               MOV     A,#' '
0999 1207AA             CALL    OUTCH
099C 120709             CALL    CKSUM                   ;append checksum
099F E9                 MOV     A,R1
09A0 1207B6             CALL    OUTHEX
09A3 0207EC             JMP     CRLF
                ;
                        END
                        INCLUD A:SCAN.ASM
                ;       SCAN    PAGE SCAN UTILITIES
                ;
                ;       F$SCAN  FORWARD SCAN ROUTINE
                ;
                ;       V$FF SET IF FF(FORM FEED/CLEAR CRT) CHAR AVAILABLE
                ;       F$ESC SET IIF PREVIOUS CHAR = ESC
                ;       V$ESC SET IF SOME FF CHAR PRFIXED BY ESC
                ;       V$ALF SET IF AUTO-LF ON CR
                ;
09A6            F$SCAN:
09A6            F$SC0:
09A6 120A8D             CALL    F$READ                  ;FORWARD READ ONE CHAR
09A9 202064             JB      F$STOP,F$SCA            ;IF PAGE POINTER=BUFFER POINTER, EXIT
09AC 301D0B             JNB     F$COMP,F$SCB            ;if space compression
09AF 30E708             JNB     ACC.7,F$SCB             ;and comp char
09B2 751C20             MOV     SCAN,#SPACE             ;save it at scan
09B5 C223               CLR     F$ESC                   ;it is not a ESC
09B7 020A07             JMP     F$SC9                   ;exit
09BA            F$SCB:
09BA 547F               ANL     A,#$7F                  ;ONLY 7 BITS ASCII
09BC F51C               MOV     SCAN,A                  ;SAVE CHAR AT SCAN
09BE 301A27             JNB     V$FF,F$SC5              ;IF FF AVAIL FOR CHECKING
09C1 7942               MOV     R1,#FFTBL               ;YES, LOAD FF TABLE
09C3 302310             JNB     F$ESC,F$NORM            ;IF NOT PREFIXED BY ESC, NORMAL FF
09C6            F$SC1:
09C6 E7                 MOV     A,@R1                   ;GET FF CHAR
09C7 30E731             JNB     ACC.7,F$SC8             ;ACC.7 SET IF ESC PREFIX REQUIRED
09CA C2E7               CLR     ACC.7                   ;SKIP ESC PREFIX
09CC B51C03             CJNE    A,SCAN,F$SC2            ;SCAN = FF ?
09CF 020A1F             JMP     F$PAGE                  ;YES, PAGE ADVANCE
09D2            F$SC2:
09D2 09                 INC     R1                      ;NO, GET NEXT FF
09D3 80F1               JMP     F$SC1
09D5            F$SC3:
```

```
09D5 09              INC    R1                    ;GET NEXT FF CHAR
09D6         F$NORM:
09D6 E7              MOV    A,@R1                 ;NORMAL FF CHAR
09D7 600F            JZ     F$SC5                 ;END OF FF TABLE
09D9 B54603          CJNE   A,FFESC,F$SC4         ;COMPARE TABLE WITH FF ESC CHAR
09DC 0209E8          JMP    F$SC5                 ;SAME, MUST BE END OF TABLE
09DF         F$SC4:
09DF 20E7F3          JB     ACC.7,F$SC3           ;BYPASS CHAR PREFIXED BY ESC
09E2 B51CF0          CJNE   A,SCAN,F$SC3          ;SCAN = FF? NO
09E5 020A1F          JMP    F8PAGE                ;YES, PAGE ADVANCE
09E8         F$SC5:
09E8 301808          JNB    V$ALF,F$SC6           ;DEVICE AUTO-LF ?
09EB 740D            MOV    A,#CR                 ;YES, CHECK CR
09ED B51C03          CJNE   A,SCAN,F$SC6          ;SCAN = CR ? NO
09F0 020A11          JMP    F$LINE                ;YES, ADVANCE ONE LINE
09F3         F$SC6:
09F3 740A            MOV    A,#LF                 ;CHECK IF LF ?
09F5 B51C03          CJNE   A,SCAN,F$SC8          ;NO
09F8 020A11          JMP    F$LINE                ;YES, ADVANCE LINE
09FB         F$SC8:
09FB C223            CLR    F$ESC                 ;CLEAR ESC INDICATOR
09FD 301907          JNB    V$ESC,F$SC9           ;DEVICE FF PREFIXED BY ESC ?
0A00 E546            MOV    A,FFESC               ;YES, CHECK IF SCAN = ESC
0A02 B51C02          CJNE   A,SCAN,F$SC9          ;NO
0A05 D223            SETB   F$ESC                 ;YES, SET PREVIOUS ESC IND.
0A07         F$SC9:
0A07 120AA1          CALL   F$ADV                 ;ADVANCE TO NEXT POSITION
0A0A 202103          JB     F$STEP,F$SCA          ;IF STEP, ADVANCE ONE A TIME
0A0D 202296          JB     F$FACC,F$SC0          ;ELSE, CHECK FAST ACCESS REQ.
0A10         F$SCA:
0A10 22              RET
             ;
0A11         F$LINE:                              ;ADVANCE A LINE
0A11 0F              INC    R7                    ;INC LINE COUNTER
0A12 E53F            MOV    A,LPP                 ;CHECK LINE PER PAGE
0A14 60E5            JZ     F$SC8                 ;IF LPP=0 THEN FF ONLY
0A16 C3              CLR    C                     ;clear c for calculation
0A17 EF              MOV    A,R7                  ;SEE IF MAX LINE REACHED ?
0A18 953F            SUBB   A,LPP                 ;current - lpp
0A1A 40DF            JC     F$SC8                 ;if C, ie current < LPP
0A1C 020A1F          JMP    F8PAGE                ;no, >= LPP, page boundary
             ;
0A1F         F8PAGE:                              ;ADVANCE PAGE
0A1F 0E              INC    R6                    ;INC PAGE COUNTER
0A20 7F00            MOV    R7,#0                 ;ZERO LINE COUNTER
0A22 D224            SETB   F$PNEW                ;indicate new page
0A24 80D5            JMP    F$SC8                 ;CONTINUE
             ;
             ;       B$SCAN BACKWARD PAGE SCAN
             ;
0A26         B$SCAN:
0A26 120AB3          CALL   B$READ                ;READ CHAR BACKWARD
0A29 301D09          JNB    F$COMP,B$SCB          ;if space compression
0A2C 30E706          JNB    ACC.7,B$SCB           ;if comp char
0A2F 751C20          MOV    SCAN,#SPACE           ;space char
0A32 020A7B          JMP    B$SC8                 ;exit
0A35         B$SCB:
0A35 547F            ANL    A,#$7F                ;ONLY 7 BITS ASCII
0A37 F51C            MOV    SCAN,A                ;SAVE AT SCAN
0A39 301A2C          JNB    V$FF,B$SC5            ;IF DEVICE REQ. FF
0A3C 7942            MOV    R1,#FFTBL             ;GET FF TABLE
0A3E 301915          JNB    V$ESC,B$NORM          ;IF FF PREFIXED BY ESC
0A41 E546            MOV    A,FFESC               ;CHECK ESC
0A43 B51C10          CJNE   A,SCAN,B$NORM         ;CURRENT CHAR NOT ESC
0A46         B$SC1:
0A46 E7              MOV    A,@R1                 ;CHECK NEXT CHAR = FF ?
0A47 30E731          JNB    ACC.7,B$SC8           ;FF REQ ESC ? NO, END OF ESC TABLE
0A4A C2E7            CLR    ACC.7                 ;FORGET ABOUT ESC
0A4C B54703          CJNE   A,B$SAVE,B$SC2        ;IF NEXT CHAR = FF ? NO
0A4F 020A87          JMP    B$PAGE                ;YES, BACKWARD A PAGE
```

```
0A52            B$SC2:
0A52 09                 INC     R1                      ;GET NEXT ENTRY OF FF TABLE
0A53 80F1               JMP     B$SC1
                ;
0A55            B$SC3:
0A55 09                 INC     R1                      ;GET NEXT ENTRY
0A56            B$NORM:
0A56 E7                 MOV     A,@R1                   ;NORMAL FF CHAR
0A57 600F               JZ      B$SC5                   ;ZERO, END OF TABLE
0A59 B54603             CJNE    A,FFESC,B$SC4           ;IF ENTRY = FFESC , END OF TABLE
0A5C 020A68             JMP     B$SC5
0A5F            B$SC4:
0A5F 20E7F3             JB      ACC.7,B$SC3             ;SKIP ESC FF
0A62 B51CF0             CJNE    A,SCAN,B$SC3            ;IF SCAN = FF ? NO
0A65 020A87             JMP     B$PAGE                  ;YES, BACK PAGE
0A68            B$SC5:
0A68 301808             JNB     V$ALF,B$SC6             ;IF DEVICE AUTO-LF
0A6B 740D               MOV     A,#CR                   ;YES, CHECK CR
0A6D B51C03             CJNE    A,SCAN,B$SC6            ;NOT A CR
0A70 020A7F             JMP     B$LINE                  ;YES, BACK A LINE
0A73            B$SC6:
0A73 740A               MOV     A,#LF                   ;CHECK LF
0A75 B51C03             CJNE    A,SCAN,B$SC8            ;NO
0A78 020A7F             JMP     B$LINE                  ;YES, BACK A LINE
0A7B            B$SC8:
0A7B 851C47             MOV     B$SAVE,SCAN             ;SAVE SCAN AS NEXT CHAR
0A7E 22                 RET
                ;
0A7F            B$LINE:
0A7F E53F               MOV     A,LPP                   ;check line per page
0A81 60F8               JZ      B$SC8                   ;if 0, no line counting
0A83 EF                 MOV     A,R7                    ;get current line #
0A84 1F                 DEC     R7                      ;reduce one line
0A85 70F4               JNZ     B$SC8                   ;if current line ½ 0, reduce line
                                                        ;else, reduce page
                ;
                ;
0A87            B$PAGE:
0A87 1E                 DEC     R6                      ;DEC PAGE COUNTER
0A88 AF3F               MOV     R7,LPP                  ;START FROM BOTTOM LINE #
0A8A 1F                 DEC     R7                      ;deduct one line
0A8B 80EE               JMP     B$SC8
                ;
                ;       F$READ  FORWARD READ A CHAR FOR PAGE SCAN
                ;
0A8D            F$READ:
0A8D EC                 MOV     A,R4                    ;COMPARE QTAIL AND PTAIL (OR HEAD)
0A8E 6A                 XRL     A,R2
0A8F 7009               JNZ     F$ACC                   ;A PAGE DIFF, TRY FAST ACCESS
0A91 C222               CLR     F$FACC                  ;ELSE DO IT LEISURELY
0A93 ED                 MOV     A,R5                    ;COMPARE LOWER BYTE
0A94 6B                 XRL     A,R3
0A95 7005               JNZ     F$OK                    ;NOT EQUAL YET,
0A97 D220               SETB    F$STOP                  ;EQUAL, STOP SCANNING
0A99 22                 RET
0A9A            F$ACC:
0A9A D222               SETB    F$FACC                  ;INDICATE FAST ACCESS
0A9C            F$OK:
0A9C C220               CLR     F$STOP                  ;NOT STOPPED
0A9E 020AC4             JMP     X$READ                  ;READ EXTERNAL RAM
                ;
0AA1            F$ADV:                                  ;FORWARD ADVANCE
0AA1 0D                 INC     R5                      ;GET NEXT CHAR
0AA2 ED                 MOV     A,R5                    ;IF LOWER BYTE NOT ZERO
0AA3 7001               JNZ     F$ADV2                  ;YES
0AA5 0C                 INC     R4                      ;NO, INC HIGHER BYTE
0AA6            F$ADV2:
0AA6 ED                 MOV     A,R5                    ;CHECK IF TOP
0AA7 B53308             CJNE    A,TOPL,F$ADV3
0AAA EC                 MOV     A,R4
```

```
0AAB B53204           CJNE    A,TOPH,F$ADV3
0AAE AD31             MOV     R5,BOTL         ;YES, TOP CIRCULAR TO BOTTOM
0AB0 AC30             MOV     R4,BOTH
0AB2        F$ADV3:
0AB2 22               RET
            ;
            ;         B$READ  BACKREAD A CHAR
            ;
0AB3        B$READ:
0AB3 ED               MOV     A,R5            ;COMPARE WITH BOTTOM
0AB4 B53108           CJNE    A,BOTL,B$R2     ;NO
0AB7 EC               MOV     A,R4
0AB8 B53004           CJNE    A,BOTH,B$R2
0ABB AD33             MOV     R5,TOPL         ;YES, BOTTOM CIRCULAR TO TOP
0ABD AC32             MOV     R4,TOPH
0ABF        B$R2:
0ABF ED               MOV     A,R5            ;DECREMENT POINTER
0AC0 7001             JNZ     B$R3
0AC2 1C               DEC     R4              ;DEC HIGH BYTE
0AC3        B$R3:
0AC3 1D               DEC     R5              ;DEC LOW BYTE
0AC4        X$READ:
0AC4 C082             PUSH    DPL             ;SAVE REGS
0AC6 C083             PUSH    DPH
0AC8 8D82             MOV     DPL,R5
0ACA 8C83             MOV     DPH,R4
0ACC 12058D           CALL    MREAD           ;read external memory
0ACF D083             POP     DPH             ;RESTORE REGS
0AD1 D082             POP     DPL
0AD3 22               RET
            ;
            ;         F$SETB        SET BACKWARD SCAN LIMIT
            ;
0AD4        F$SETB:
0AD4 AB13             MOV     R3,QTAILL       ;ASSUME LIMIT AT QTAIL
0AD6 AA12             MOV     R2,QTAILH
0AD8        F$SET0:
0AD8 7880             MOV     R0,#$80         ;**DEBUG BLANK IF CONSECUTIVE 255 FILCH
0ADA        F$SET1:
0ADA EB               MOV     A,R3            ;CIRCULAR BOTTOM TO TOP
0ADB B53108           CJNE    A,BOTL,F$S2
0ADE EA               MOV     A,R2
0ADF B53004           CJNE    A,BOTH,F$S2
0AE2 AB33             MOV     R3,TOPL
0AE4 AA32             MOV     R2,TOPH
0AE6        F$S2:
0AE6 EB               MOV     A,R3            ;DECREMENT POINTER
0AE7 7001             JNZ     F$S3
0AE9 1A               DEC     R2              ;DEC HIGH BYTE
0AEA        F$S3:
0AEA 1B               DEC     R3              ;DEC LOW BYTE
0AEB        F$SET2:
0AEB EA               MOV     A,R2
0AEC 6E               XRL     A,R6            ;WHERE R6,R7 = ORIGINAL QHEAD
0AED 7018             JNZ     F$SET5          ;R2,R3 ½ R6,R7
0AEF EB               MOV     A,R3
0AF0 6F               XRL     A,R7
0AF1 7014             JNZ     F$SET5
0AF3        F$SET3:
0AF3 0B               INC     R3              ;IF R2,R3 = R6,R7
0AF4 EB               MOV     A,R3            ;THEN FORWARD R2,R3 SO THAT
0AF5 7001             JNZ     F$S4            ;BUFFER IS FULL, NOT EMPTY
0AF7 0A               INC     R2
0AF8        F$S4:
0AF8 EB               MOV     A,R3            ;IF R2,R3 = TOP THEN CIRCULAR BACK
0AF9 B53308           CJNE    A,TOPL,F$SET4
0AFC EA               MOV     A,R2
0AFD B53204           CJNE    A,TOPH,F$SET4
0B00 AB31             MOV     R3,BOTL
```

```
0B02 AA30              MOV     R2,BOTH
0B04           F$SET4:
0B04 D226              SETB    F$BACK          ;INDICATES BACKWARD LIMIT IS SET
0B06 22                RET
                       ;
0B07           F$SET5:
0B07 8B82              MOV     DPL,R3          ;READ EXT RAM
0B09 8A83              MOV     DPH,R2
0B0B 12058D            CALL    MREAD           ;read memory
0B0E B51FC7            CJNE    A,FILCH,F$SET0  ;CHECK IF RAM = FILCH I.E. BLANK
0B11           F$SETA:
0B11 E582              MOV     A,DPL           ;CIRCULAR DPTR
0B13 B5310B            CJNE    A,BOTL,F$S6
0B16 E583              MOV     A,DPH
0B18 B53006            CJNE    A,BOTH,F$S6
0B1B 853382            MOV     DPL,TOPL
0B1E 853283            MOV     DPH,TOPH
0B21           F$S6:
0B21 E582              MOV     A,DPL           ;DECREMENT POINTER
0B23 7002              JNZ     F$SET6
0B25 1583              DEC     DPH
0B27           F$SET6:
0B27 1582              DEC     DPL
0B29 D802              DJNZ    R0,F$SET7       ;IF 256 FILCH ?
0B2B 80C6              JMP     F$SET3          ;YES, RESTORE R2,R3 LIMIT AND EXIT
0B2D           F$SET7:
0B2D E583              MOV     A,DPH           ;IF DPTR = ORIGINAL QHEAD
0B2F 6E                XRL     A,R6
0B30 7005              JNZ     F$SET8
0B32 E582              MOV     A,DPL
0B34 6F                XRL     A,R7
0B35 60BC              JZ      F$SET3          ;IF DPTR = QHEAD THEN EXIT
0B37           -F$SET8:
0B37 12058D            CALL    MREAD           ;read ext RAM
0B3A B51F02            CJNE    A,FILCH,F$SET9  ;IF NOT FILCH, RESTART SERACHING
0B3D 80D2              JMP     F$SETA          ;IF = FILCH, CONTINUE COUNTING
0B3F           F$SET9:
0B3F AA83              MOV     R2,DPH
0B41 AB82              MOV     R3,DPL
0B43 8093              JMP     F$SET0
                       ;
0B45           F$RCV:                          ;FORWARD SCAN OF RCV BUFFER
0B45 D2D3              SETB    RS0
0B47 31A6              CALL    F$SCAN
0B49 C2D3              CLR     RS0
0B4B 22                RET
                       ;
0B4C           F$XMT:                          ;FORWARD SCAN OF XMT BUFFER
0B4C D2D4              SETB    RS1
0B4E 31A6              CALL    F$SCAN
0B50 C2D4              CLR     RS1
0B52 22                RET
                       ;
                       ;       F$XFOR  FUNCTION XMT BUFFER PAGE FORWARD
                       ;
0B53           F$XFOR:
0B53 AD13              MOV     R5,QTAILL       ;SAVE QTAIL
0B55 AC12              MOV     R4,QTAILH
0B57 850B13            MOV     QTAILL,QHEADL   ;PTAIL ADVANCE TOWARD QHEAD
0B5A 850A12            MOV     QTAILH,QHEADH
0B5D D221              SETB    F$STEP          ;DO IT ONE POSITION AT A TIME
0B5F 85161D            MOV     PSAVE,XPAGE     ;SAVE PAGE #
0B62           F$XF2:
0B62 714C              CALL    F$XMT           ;ADVANCE XMT BUFFER
0B64 E516              MOV     A,XPAGE         ;CHECK PAGE
0B66 B51D03            CJNE    A,PSAVE,F$XF8   ;PAGE DIFFERENT ?
0B69 3020F6            JNB     F$STOP,F$XF2    ;STOP REACHED ? NO, LOOP BACK
0B6C           F$XF8:
0B6C C221              CLR     F$STEP          ;CLEAR STEP SCAN MODE
0B6E 020B9F            JMP     F$XB3           ;SAVE NEW XMT POINTER
```

```
;
;         F$XBAK  FUNCTION: XMT BUFFER PAGE BACKWARD
;
0B71            F$XBAK:
0B71 202602             JB      F$BACK,F$XB1    ;IF BACKWARD LIMIT CHECKED ?
0B74 51D4               CALL    F$SETB          ;NO, CHECK IT
0B76            F$XB1:
0B76 120B92             CALL    F$XBS           ;back scan one char
0B79 202023             JB      F$STOP,F$XB3    ;if end reached, exit
0B7C 85161D             MOV     PSAVE,XPAGE     ;save current page no. for comp
0B7F            F$XB2:
0B7F 120B92             CALL    F$XBS           ;back scan next
0B82 20201A             JB      F$STOP,F$XB3    ;if end, exit
0B85 E516               MOV     A,XPAGE         ;check if page # changed
0B87 B51D02             CJNE    A,PSAVE,F$XB5   ;yes, advance one and exit
0B8A 80F3               JMP     F$XB2           ;no, keep looping
0B8C            F$XB5:
0B8C D221               SETB    F$STEP          ;on step mode
0B8E 714C               CALL    F$XMT           ;advance pass page boundary.
0B90 80DA               JMP     F$XF8           ;exit
                ;
0B92            F$XBS:
0B92 E514               MOV     A,PTAILH        ;COMPARE PTAIL AND BACKWARD LIMIT
0B94 6A                 XRL     A,R2
0B95 700F               JNZ     F$XB4
0B97 E515               MOV     A,PTAILL
0B99 6B                 XRL     A,R3
0B9A 700A               JNZ     F$XB4
0B9C D220               SETB    F$STOP          ;indicate stop scanning
0B9E 22                 RET
0B9F            F$XB3:
0B9F 851513             MOV     QTAILL,PTAILL   ;BACKWARD LIMIT REACHED
0BA2 851412             MOV     QTAILH,PTAILH   ;RESET BUFFER POINTER TO LIMIT
0BA5 22                 RET
0BA6            F$XB4:
0BA6 D2D4               SETB    RS1             ;SCAN XMT BUFFER
0BA8 5126               CALL    B$SCAN          ;BACKWARD SCAN
0BAA C2D4               CLR     RS1
0BAC C220               CLR     F$STOP          ;Scan O.K, end not reached.
0BAE 22                 RET
                ;
                        END
                ;
                ;
0BAF            MAINLOC EQU     $
                ;
                ;       MAIN PROGRAM
                ;
0000                    ORG     BASE0
0000 020BAF             JMP     START
                ;
0BAF                    ORG     MAINLOC
                ;
0BAF            START:
0BAF C2D3               CLR     RS0
0BB1 C2D4               CLR     RS1
0BB3 7801               MOV     R0,#$01         ;CLEAR INTERNAL RAM 01 - 7F
0BB5            LOP0:
0BB5 7600               MOV     @R0,#$00
0BB7 08                 INC     R0
0BB8 B880FA             CJNE    R0,#$80,LOP0
                ;
0BBB            F$RES:
0BBB 758148             MOV     SP,#STACK       ;SET STACK POINTER
0BBE 120493             CALL    READKY
0BC1 85261D             MOV     PSAVE,KEY              ;GET KEY STATUS AT POWER UP
0BC4 202703             JB      F$RESET,GPARAM  ;IF FUNC RESET SKIP BUFFER CHECKING
0BC7 120236             CALL    LOADBUF
                ;
```

```
0BCA         GPARAM:                              ;GET PARAMETERS
0BCA 120478           CALL    READSW              ;READ IO SWITCHES
0BCD 1205B2           CALL    S$DEV               ;LOAD FF TABLE
0BD0 202721           JB      F$RESET,F$RES2      ;IF FUNC RESET, SKIP RAM TEST
0BD3 751FFF           MOV     FILCH,#$FF          ;FILCH default to FF
0BD6 301D03           JNB     F$COMP,LOP6         ;if compression, FILCH defaut to 00
0BD9 751F00           MOV     FILCH,#$00
0BDC         LOP6:
0BDC 120573           CALL    FILRAM              ;PREFILL RAM WITH FILCH
0BDF 1204E5           CALL    CKRAM               ;CHECK VALID RAM RANGE
0BE2 E540             MOV     A,QLENH             ;check if 64K
             ;
0BE4 03               RR      A                   ;display 64 K at LEDS
0BE5 C4               SWAP    A
0BE6 F527             MOV     LED,A
             ;
0BE8 F4               CPL     A                   ;if $FF cpl to $00
0BE9 6009             JZ      F$RES2              ;if 64K then continue
0BEB 120663           CALL    TLEDX4              ;flash 3 times if not 64K
0BEE 120236           CALL    LOADBUF             ;else check again
0BF1 1204E5           CALL    CKRAM
0BF4         F$RES2:
0BF4 E523             MOV     A,SW1               ;check if burn-in or memory test
0BF6 B4FF05           CJNE    A,#$FF,LOP1         ;if SW1 set to $FF, syncho test
0BF9 120F0D           CALL    M$BURN
0BFC 80CC             JMP     GPARAM
0BFE         LOP1:
0BFE B4FE05           CJNE    A,#$FE,LOP2         ;if memory test
0C01 120EE7           CALL    MSTEST              ;yes, do memory test
0C04 80C4             JMP     GPARAM
0C06         LOP2:
0C06 120404           CALL    SETUP               ;SET IO PORT
0C09 C227             CLR     F$RESET             ;FUNC RESET DONE
             ;        MOV     DPTR,#0             ;DPTR RESET TO 0
             ;
0C0B 851D26           MOV     KEY,PSAVE                   ;GET POWER-UP KEY VALUE
0C0E E526             MOV     A,KEY               ;check power-on function
0C10 540F             ANL     A,#$0F              ;only action keys effective
0C12 7003             JNZ     LOP3                ;if no action keys
0C14 120DDB           CALL    J$EXC0              ;execute power-on function
0C17         LOP3:
0C17 120663           CALL    TLEDX4
0C1A 752600           MOV     KEY,#$0             ;clear power-on keys
             ;        JMP     MAIN
             ;
0C1D         MAIN:                                ;MAIN LOOP
0C1D C22F             CLR     Y$ERR               ;clear all error indicator
0C1F 120CE2           CALL    SETLED              ;set default LED display
0C22 85261D           MOV     PSAVE,KEY           ;save previous key
0C25 12049B           CALL    READKY              ;read input from keyboard
0C28 E526             MOV     A,KEY               ;check any key depressed ?
0C2A 6057             JZ      M40                 ;no, complete the loop
0C2C 120E52           CALL    SUREKEY             ;kick out debouncing
0C2F 651D             XRL     A,PSAVE             ;same key on
0C31 5403             ANL     A,#$03              ;pause and hold ?
0C33 6019             JZ      M20                 ;if pause or hold
0C35 30E00A           JNB     ACC.0,M10           ;if pause key not changed, check hold
0C38 303007           JNB     K$PAUSE,M10         ;if pause key not on, check hold
0C3B C0E0             PUSH    ACC                 ;save ACC
0C3D 120C9F           CALL    PAUSE               ;swap pause mode
0C40 D0E0             POP     ACC                 ;restore ACC
0C42         M10:
0C42 30E106           JNB     ACC.1,M15           ;if hold key not changed
0C45 303103           JNB     K$HOLD,M15          ;if Hold key not on
0C48 120CA8           CALL    HOLD                ;if changed to on, execute hold
0C4B         M15:
0C4B 020C83           JMP     M40
             ;
0C4E         M20:
0C4E E526             MOV     A,KEY               ;check action keys
```

```
0C50 54F0              ANL     A,#$F0              ;mask key value
0C52 7013              JNZ     M30                 ;yes, try to take action
0C54 E526              MOV     A,KEY               ;no, check functions
0C56 540C              ANL     A,#(H$FUNC OR H$SFUN)
0C58 03                RR      A                   ;shift right for table jump
0C59 03                RR      A
0C5A 900C64            MOV     DPTR,#J$FUN         ;function jump table
0C5D 120DC9            CALL    LTABLE              ;execute function
0C60 020C83            JMP     M40                 ;continue main loop
0C63           M25:
0C63 22                RET                         ;a dummy subroutine
               ;
0C64           J$FUN:                              ;function jump table
0C64 0C63              DW      M25                 ;dummy
0C66 0D00              DW      J$FUNC              ;function, display xmt page no.
0C68 0D05              DW      J$SFUN              ;second func, display buffer size
0C6A 0D2B              DW      J$HFUN              ;both funcs, display current mode
               ;
0C6C           M30:
0C6C 202A06            JB      X$STOP,M35          ;if paused, allow all functions
0C6F E526              MOV     A,KEY               ;else check multi-keys
0C71 540C              ANL     A,#$0C              ;is it multi-keys ?
0C73 7002              JNZ     M38                 ;yes, ignore it
0C75           M35:
0C75 120DE0            CALL    J$EXC               ;execute actions
0C78 202F05            JB      X$ERR,M38           ;if error, report to led
0C7B 12067F            CALL    MLED1               ;exit action message
0C7E 8003              SJMP    M40
0C80           M38:
0C80 120675            CALL    MLED4               ;error message
0C83           M40:
0C83 120453            CALL    DLED                ;direct led display
0C86 301B0C            JNB     F$PAGE,M50          ;if page mode, catch up page pointer
0C89 714C              CALL    F$XMT               ;only XMT pointer matters
0C8B 302407            JNB     F$PNEW,M50          ;if not new page continue
0C8E 301C04            JNB     F$PAUSE,M50         ;if not page pause, continue
0C91 D22A              SETB    X$STOP              ;try to page pause
0C93 C224              CLR     F$PNEW              ;boundary processed
0C95           M50:
0C95 1200A4            CALL    POXMT2              ;post transmitter clean-up
0C98 120758            CALL    ACTXMT              ;activate xmt or rec
0C9B 1574              DEC     COUNT1              ;an aux counter
0C9D           M80:
0C9D 811D             JMP     MAIN                 ;complete main loop
               ;
0C9F           PAUSE:                              ;Pause function
0C9F 202A03            JB      X$STOP,UPAUSE       ;if already in pause, unpause it
0CA2 D22A              SETB    X$STOP              ;else set x$stop to force pause
0CA4 22                RET
0CA5           UPAUSE:
0CA5 C22A              CLR     X$STOP              ;clear pause indicator
0CA7 22                RET
               ;
0CA8           HOLD:                               ;hold function
0CA8 202B05            JB      R$STOP,UHOLD        ;if already in hold, unhold it
0CAB C234              CLR     RCV$RDY             ;else set receiver not ready
0CAD D22B              SETB    R$STOP              ;try to stop receiver
0CAF 22                RET
0CB0           UHOLD:
0CB0 D205              SETB    RC$REQ              ;request receiver
0CB2 C22B              CLR     R$STOP              ;indicate no-hold
0CB4 22                RET
               ;
0CB5           J$PAGE:                             ;swap page mode
0CB5 201B05            JB      F$PAGE,UPAGE        ;if page mode on, turn it off
0CB8 D21B              SETB    F$PAGE              ;else turn it on
0CBA 020660            JMP     MLED2               ;action taken
0CBD           UPAGE:
0CBD C21B              CLR     F$PAGE              ;turn page mode on
```

```
OCBF 020660              JMP    MLED2
                ;
OCC2            JSPAUSE:
OCC2 301B0D              JNB    F$PAGE,JSERR   ;if not page mode, can't page pause
OCC5 201C05              JB     F$PAUSE,UPP    ;if already page pause, turn it off
OCC8 D21C                SETB   F$PAUSE        ;turn page pause on
OCCA 020660              JMP    MLED2
OCCD            UPP:
OCCD C21C                CLR    F$PAUSE        ;clear page pause
OCCF 020660              JMP    MLED2
OCD2            JSERR:
OCD2 02067F              JMP    MLED1          ;error !
                ;
OCD5            JSCOMP:                        ;swap compression mode
OCD5 201D05              JB     F$COMP,UCOMP   ;if compression mode on, turn it off
OCD8 D21D                SETB   F$COMP         ;else turn it on
OCDA 020660              JMP    MLED2
OCDD            UCOMP:
OCDD C21D                CLR    F$COMP         ;turn compression off
OCDF 020660              JMP    MLED2
                ;
OCE2            SETLED:                        ;set default LED display
OCE2 E526                MOV    A,KEY          ;check if pause or hold
OCE4 5403                ANL    A,#$03         ;key depressed
OCE6 7043                JNZ    JSMFUN         ;if yes, display mode
OCE8 201B11              JB     F$PAGE,SETLD2  ;if page on, display page
OCEB            SETLD0:
OCEB E50B                MOV    A,QHEADL       ;else set LED to rec pointer
OCED 302B02              JNB    R$STOP,SETLD1  ;if hold, set to
OCF0 E513                MOV    A,QTAILL       ;transmit pointer
OCF2            SETLD1:
OCF2 F527                MOV    LED,A          ;only lower 3 bits effective
OCF4 A223                MOV    C,XMTSRDY      ;move XMTSRDY to LED.7
OCF6 B3                  CPL    C              ;invert XMTSRDY
OCF7 722A                ORL    C,X$STOP       ;display XMT no ready or Pause
OCF9 923F                MOV    LED.7,C
OCFB 22                  RET
OCFC            SETLD2:
                         MOV    A,RPAGE        ;default to rec page no.
                ;        JNB    R$STOP,SETLD1  ;if hold, display xmt page no.
OCFC E516                MOV    A,RPAGE
OCFE 80F2                JMP    SETLD1
OD00            JSFUNC:                        ;Function keys
OD00 301BF9              JNB    F$PAGE,SETLD2  ;if not page mode, display page pointer
OD03 80E6                JMP    SETLD0         ;else display buffer pointer
                ;
OD05            JSMFUN:
OD05 C3                  CLR    C              ;clear c for calculation
OD06 E512                MOV    A,QTAILH       ;Calculate remaining buffer size
OD08 950A                SUBB   A,QHEADH       ;QTAIL - QHEAD
OD0A 5003                JNC    JSSF2          ;if QTAIL ½ QHEAD
OD0C 2540                ADD    A,QLENH        ;IF ½ then adjust
OD0E C3                  CLR    C
OD0F            JSSF2:
OD0F 700E                JNZ    JSSF5          ;if QTAIL ½ QHEAD
OD11 E513                MOV    A,QTAILL       ;if = check QTAILL - QHEADL
OD13 950B                SUBB   A,QHEADL
OD15 5004                JNC    JSSF4          ;QTAILL ½ QHEADL
OD17 740F                MOV    A,#$0F         ;else buffer empty(almost)
OD19 80D7                JMP    SETLD1         ;display it
OD1B            JSSF4:
OD1B 7400                MOV    A,#$00         ;buffer full (almost)
OD1D 80D3                JMP    SETLD1
OD1F            JSSF5:
OD1F 8540F0              MOV    B,QLENH        ;setup for (QTAIL-QHEAD)*8/QLEN
OD22 84                  DIV    AB
OD23 7408                MOV    A,#$08         ;calculate
OD25 A4                  MUL    AB
OD26 E5F0                MOV    A,B
```

```
0D28 F4            CPL     A                   ;invert led display
0D29 80C7          JMP     SETLD1
                ;
0D2B      JSHFUN:                              ;function and second function
0D2B A21D          MOV     C,F$COMP            ;get compression mode to LED.2
0D2D 923A          MOV     LED.2,C
0D2F A21B          MOV     C,F$PAGE            ;get Page mode to LED.1
0D31 9239          MOV     LED.1,C
0D33 A22B          MOV     C,R$STOP            ;HOLD status to LED.0
0D35 301B02        JNB     F$PAGE,JSHF2        ;if page mode LED.0 display page pause
0D38 A21C          MOV     C,F$PAUSE
0D3A      JSHF2:
0D3A 9238          MOV     LED.0,C
0D3C A22A          MOV     C,X$STOP            ;PAUSE indicator to LED.7
0D3E 923F          MOV     LED.7,C
0D40 22            RET
                ;
0D41      UTIL:                                ;utility includes hex dump and copy
0D41 300A0A        JNB     SIO2OUT,UTIL2       ;if sio2
0D44      UTIL0:
0D44 E535          MOV     A,SIO2JMP           ;wait till last char is sent
0D46 6006          JZ      UTIL2               ;yes, o.k. to proceed
0D48 120E5E        CALL    EXTKEY              ;check if forced exit
0D4B 70F7          JNZ     UTIL0               ;no, wait
0D4D 22            RET                         ;else, exit
0D4E      UTIL2:
0D4E C020          PUSH    B$FLAG              ;save buffer status
0D50 C025          PUSH    Y$FLAG              ;save system status
0D52 C2B4          CLR     RCV$RDY             ;stop receiver
0D54 C205          CLR     RC$REQ
0D56 12067A        CALL    MLED3               ;util entry message
0D59 C226          CLR     F$BACK
0D5B D22B          SETB    R$STOP              ;force receiver hold
0D5D AF0B          MOV     R7,QHEADL           ;save buffer pointer
0D5F AE0A          MOV     R6,QHEADH
0D61 D228          SETB    NO$RAM              ;fake a no$ram
0D63 900D8F        MOV     DPTR,#J$UTIL        ;jump to util table
0D66 E51D          MOV     A,PSAVE             ;use psave to pass options
0D68 120DC9        CALL    LTABLE              ;execute it
                ;
0D6B      UTILB:
0D6B 120766        CALL    ACTXM               ;activiate XMT if pio
0D6E 200205        JB      BF$EMTY,UTILA       ;wait till buffer empty
0D71 120E5E        CALL    EXTKEY
0D74 70F5          JNZ     UTILB               ;if not forced exit, wait
0D76      UTILA:
0D76 D025          POP     Y$FLAG              ;restore status
0D78 D020          POP     B$FLAG
0D7A      UTIL3:
0D7A E513          MOV     A,QTAILL            ;check if buffer empty
0D7C B50B09        CJNE    A,QHEADL,UTIL4      ;set indicator accordingly
0D7F E512          MOV     A,QTAILH
0D81 B50A04        CJNE    A,QHEADH,UTIL4
0D84 D202          SETB    BF$EMTY
0D86 8004          SJMP    UTIL5
0D88      UTIL4:
0D88 C202          CLR     BF$EMTY
0D8A D203          SETB    XM$REQ              ;if not empty, try to transmit
0D8C      UTIL5:
0D8C C221          CLR     F$STEP              ;Press HOLD to re-enable reception
0D8E 22            RET
                ;
0D8F      J$UTIL:                              ;utility jump table
0D8F 082E          DW      D$COPY              ;copy
0D91 08B3          DW      D$BUFF              ;hex dump
0D93 0958          DW      D$MEM               ;memory hex dump
0D95 0958          DW      D$MEM               ;memory test
0D97 094D          DW      D$IRAM              ;internal ram
0D99 081E          DW      D$MESS              ;display buffer size
```

```
0D9B 096C             DW       D$ADV           ;display adv logo
0D9D 06BE             DW       D$DIAG          ;self-diagnostics
                      ;
0D9F         FPAGE:                            ;page skip, reprint functions
0D9F A22B             MOV      C,R$STOP        ;save R$STOP
0DA1 9229             MOV      XN$RAM,C
0DA3 C2B4             CLR      RCV$RDY         ;temp stop receiver
0DA5 D22B             SETB     R$STOP
0DA7 C226             CLR      F$BACK
0DA9 AF0B             MOV      R7,QHEADL
0DAB AE0A             MOV      R6,QHEADH
0CAD         FPAG3:
0DAD 714C             CALL     F$XMT           ;catch up XMT page pointer
0DAF 3020FB           JNB      F$STOP,FPAG3
0DB2 900DC5           MOV      DPTR,#J$FPAG    ;page function table
0DB5 E51D             MOV      A,PSAVE         ;psave to pass options
0DB7 120DC9           CALL     LTABLE
0DBA A229             MOV      C,XN$RAM        ;restore R$STOP
0DBC 922B             MOV      R$STOP,C
0DBE 302B02           JNB      R$STOP,FPAG4
0DC1 D2B4             SETB     RCV$RDY
0CC3         FPAG4:
0DC3 80B5             JMP      UTIL3
             ;
0DC5         J$FPAG:
0DC5 0B53             DW       F$XFOR          ;page skip
0DC7 0B71             DW       F$XBAK          ;page reprint
             ;
             ;
             ;        LTABLE   :table look-up
             ;                 table start at location pointed by DPTR
             ;                 option passed by A
             ;                 each jump location occupies two bytes
             ;
0DC9         LTABLE:
0DC9 C3               CLR      C               ;clear C for calculation
0DCA 33               RLC      A               ;multiply A by 2
0DCB 5002             JNC      LOW128          ;in case more than 128 entries
0DCD 0583             INC      DPH
0DCF         LOW128:
0DCF F51D             MOV      PSAVE,A         ;save A at PSAVE
0DD1 04               INC      A               ;read low byte value first
0DD2 93               MOVC     A,@A+DPTR       ;read it
0DD3 C0E0             PUSH     ACC             ;push for faked return
0DD5 E51D             MOV      A,PSAVE         ;read high byte
0CD7 93               MOVC     A,@A+DPTR
0DD8 C0E0             PUSH     ACC             ;push high byte
0DDA 22               RET                      ;faked return for jump
             ;
0DDB         J$EXC0:                           ;power-on jump table
0DDB 900E7B           MOV      DPTR,#J$TAB0    ;use J$TAB0
0DDE 8010             SJMP     J$EXC1
0DE0         J$EXC:                            ;normal function jump table
0DE0 C026             PUSH     KEY             ;save key value
0DE2         J$EXC3:
0DE2 120495           CALL     READKY          ;wait till all keys released
0DE5 E526             MOV      A,KEY           ;check keys
0DE7 70F9             JNZ      J$EXC3          ;wait till all released
0DE9 D026             POP      KEY             ;restore key
0DEB C22D             CLR      F$CONT          ;Assume no continuation
0DED 900F53           MOV      DPTR,#J$TAB     ;use J$TAB
0DF0         J$EXC1:
0DF0 E526             MOV      A,KEY           ;get key input
0DF2 120E02           CALL     CONNIB          ;convert high 4 bit nibble
0DF5 7008             JNZ      J$EXT           ;if no action keys, error!
0DF7 E526             MOV      A,KEY           ;get key again
0DF9 540C             ANL      A,#$0C          ;mask func keys
0DFB 48               ORL      A,R0            ;combine with action keys
0DFC 80CB             JMP      LTABLE          ;execute jump table
```

```
0DFE 22                 RET                             ;safeguard
0DFF            JSERR:
0DFF D22F               SETB    YSERR                   ;indicate error
0E01 22                 RET
                ;
0E02            CONNIB:                                 ;convert KEY higher 4 bit nible
0E02 7804               MOV     R0,#$04                 ;to options in A
0E04 54F0               ANL     A,#$F0                  ;A contains the nibble
0E06 C3                 CLR     C
0E07            CONN0:
0E07 33                 RLC     A                       ;get high bit
0E08 4004               JC      CONN1                   ;if bit = 1
0E0A D8FB               DJNZ    R0,CONN0                ;if count remains
0E0C F4                 CPL     A                       ;set A to no-zero for error !
0E0D 22                 RET
0E0E            CONN1:
0E0E 18                 DEC     R0                      ;R0 store the result
0E0F 22                 RET                             ;if A non-zero then multiple keys
                ;
0E10            AUTO:                                   ;auto increment of repeat no.
0E10 E526               MOV     A,KEY                   ;save entry function
0E12 54F0               ANL     A,#$F0                  ;action keys only
0E14 F51D               MOV     PSAVE,A                 ;save at psave
0E16 757500             MOV     REPH,#$0                ;initiate rep no.
0E19 757600             MOV     REPL,#$0
0E1C            AUTO1:
0E1C E576               MOV     A,REPL                  ;display lower byte no. only
0E1E 91F2               CALL    SETLD1                  ;display 3 bits
0E20 120453             CALL    DLED                    ;display new number
0E23            AUTO3:
0E23 120493             CALL    READKY                  ;wait till all keys are released
0E26 E526               MOV     A,KEY                   ;check any key pressed ?
0E28 70F9               JNZ     AUTO3                   ;yes, wait
0E2A            AUTO2:
0E2A 120E52             CALL    SUREKEY                 ;get sure key press
0E2D 651D               XRL     A,PSAVE                 ;match them
0E2F 54FC               ANL     A,#$FC                  ;ignore pause and hold
0E31 6016               JZ      AUTO4                   ;yes, action key only, exit
0E33 E526               MOV     A,KEY                   ;check func keys
0E35 540C               ANL     A,#$0C                  ;mask func keys
0E37 60F1               JZ      AUTO2                   ;if no func keys, loop back
0E39 900E4E             MOV     DPTR,#ASVAL             ;point to value table
0E3C 03                 RR      A                       ;shift right to get value
0E3D 03                 RR      A
0E3E 93                 MOVC    A,@A+DPTR               ;translate to rep. value
0E3F 2576               ADD     A,REPL                  ;increment to rep.
0E41 F576               MOV     REPL,A
0E43 50D7               JNC     AUTO1                   ;no carry
0E45 0575               INC     REPH                    ;add carry to reph
0E47 80D3               JMP     AUTO1                   ;wait for key released
0E49            AUTO4:
0E49 E576               MOV     A,REPL                  ;if a zero, count = 0
0E4B 4575               ORL     A,REPH                  ;if a non-zero, count O.K.
0E4D 22                 RET                             ;exit
                ;
0E4E            ASVAL:
0E4E 00                 DB      0                       ;dummy value
0E4F 01                 DB      1                       ;increment 1 for func
0E50 0A                 DB      10                      ;increment 10 for sec func
0E51 64                 DB      100                     ;increment 100 for both funcs
                ;
0E52            SUREKEY:                                ;make sure key press, avoid bouncing
0E52 7910               MOV     R1,#$10                 ;repeat 16 times
0E54            SURE0:
0E54 1204DC             CALL    SAMEKEY                 ;is it the same key
0E57 70F9               JNZ     SUREKEY                 ;no, start all over
0E59 D9F9               DJNZ    R1,SURE0                ;yes, check 8 times
0E5B E526               MOV     A,KEY                   ;pass KEY to ACC
0E5D 22                 RET                             ;key is O.K. now
```

```
0E5E            EXTKEY:                             ;check key for forced exit
0E5E C026               PUSH    KEY
0E60 12049B             CALL    READKY
0E63 E526               MOV     A,KEY
0E65 D026               POP     KEY
0E67 640E               XRL     A,#$0E              ;if func/2nd/hold then forced exit
0E69 22                 RET
                ;
0E6A            J$SKIP:
0E6A 751D00             MOV     PSAVE,#$0           ;option 0
0E6D A19F               JMP     FPAGE               ;go execute
                ;
0E6F            J$REPR:
0E6F 751D01             MOV     PSAVE,#$1           ;option 1
0E72 A19F               JMP     FPAGE
                ;
0E74            J$CLEAR:
0E74 120573             CALL    FILRAM              ;fill up ram with filch
0E77 1204E5             CALL    CKRAM               ;check ram again
0E7A C221               CLR     F$STEP
0E7C 7400               MOV     A,#$0               ;clear all page no.
0E7E F516               MOV     XPAGE,A
0E80 F517               MOV     XLINE,A
0E82 E513               MOV     A,QTAILL            ;get beginning address
0E84 F515               MOV     PTAILL,A
0E86 E512               MOV     A,QTAILH
0E88 F514               MOV     PTAILH,A
0E8A 22                 RET 0E8B            J$COPY:
0E8B 751D00             MOV     PSAVE,#$0           ;option 0 of utilities
0E8E A141               JMP     UTIL                ;execute
                ;
0E90            J$AUTO:                             ;handle auto no.
0E90 E526               MOV     A,KEY               ;save original action
0E92 54F0               ANL     A,#$F0              ;action only
0E94 C0E0               PUSH    ACC                 ;save at stack
0E96 D110               CALL    AUTO                ;get auto no.
0E98 6014               JZ      J$AUT3              ;if zero, exit
0E9A            J$AUT2:
0E9A D026               POP     KEY                 ;get original action
0E9C C026               PUSH    KEY
0E9E B1E0               CALL    J$EXC               ;execute
0EA0 20330B             JB      K$SFUN,J$AUT3       ;if sec func key pressed, exit
0EA3 D576F4             DJNZ    REPL,J$AUT2         ;dec count
0EA6 E575               MOV     A,REPH              ;lower count = 0, check higher count
0EA8 6004               JZ      J$AUT3              ;if all zero, exit
0EAA 1575               DEC     REPH                ;else, dec to next
0EAC 80EC               JMP     J$AUT2              ;loop back
0EAE            J$AUT3:
0EAE D0E0               POP     ACC                 ;restore return address
0EB0 22                 RET
                ;
0EB1            J$MCOPY:                            ;continue copy
0EB1 D22D               SETB    F$CONT              ;set continue copy
0EB3 80D6               JMP     J$COPY              ;execute
                ;
0EB5            J$BHEX:                             ;buffer hex dump
0EB5 751D01             MOV     PSAVE,#$1           ;option 1
0EB8 A141               JMP     UTIL
                ;
0EBA            J$RST:                              ;soft reset
0EBA 12065D             CALL    MLED5               ;func reset message
0EBD 120493             CALL    READKY              ;check key input
0EC0 2033F7             JB      K$SFUN,J$RST        ;wait till sec func released
0EC3 D227               SETB    F$RESET             ;set func reset indicator
0EC5 613E               JMP     FSRES               ;execute 0EC7            J$SET:                              ;set FF table from key in value or
```

```
0EC7 20B403              JB      RCV$RDY,J$SET2  ;remote loading
0ECA 020599              JMP     S$SET           ;if HOLD then use key input
0ECD            J$SET2:
0ECD 0205D7              JMP     S$LOAD          ;else remote loading from computer
                ;
0ED0            J$SIZE:                          ;display buffer size or internal ram
0ED0 751D04              MOV     PSAVE,#$04      ;assume internal
0ED3 30B402              JNB     RCV$RDY,J$SI2   ;if hold, internal RAM
0ED6 051D               INC      PSAVE           ;if not HOLD, buffer size
0ED8            J$SI2:
0ED8 A141                JMP     UTIL
                ;
0EDA            J$EXTN:                          ;check if external ROM program avail.
0EDA 901003              MOV     DPTR,#$1003     ;check $1003 location
0EDD 7400                MOV     A,#$0
0EDF 93                  MOVC    A,@A+DPTR       ;check program code
0EE0 B40203              CJNE    A,#$02,J$EXT2   ;is it a LJMP instruction ?
0EE3 7400                MOV     A,#$0           ;yes, jmp to it
0EE5 73                  JMP     @A+DPTR
0EE6            J$EXT2:
0EE6 22                  RET
                ;
0EE7            M$TEST:                          ;memory test
0EE7 E540                MOV     A,QLENH         ;get length of buffer
0EE9 03                  RR      A               ;display only XXX0 0000
0EEA C4                  SWAP    A
0EEB F527                MOV     LED,A
0EED 120453              CALL    DLED            ;display it
0EF0 120478              CALL    READSW          ;check switch setting
0EF3 E528                MOV     A,SW1           ;check SW1
0EF5 B4FE53              CJNE    A,#$FE,M$BEXT   ;if changed, exit
0EF8 1204E5              CALL    CKRAM           ;check RAM range
0EFB E540                MOV     A,QLENH         ;get available buffer
0EFD B4FF08              CJNE    A,#$FF,M$TES2   ;check if 64 K
0F00 757704              MOV     COUNT,#$04      ;if OK, flash twice
0F03 120666              CALL    TLEDX           ;flash
0F06 80DF                JMP     M$TEST          ;continue memory test
0F08            M$TES2:
0F08 120675              CALL    MLED4           ;error message
0F0B 80DA                JMP     M$TEST          ;continue
                ;
0F0D            M$BURN:                          ;memory burn-in syncho test
0F0D 120478              CALL    READSW          ;read SW1
0F10 E528                MOV     A,SW1
0F12 B4FF36              CJNE    A,#$FF,M$BEXT   ;if sw changed, exit
0F15 30B3F5              JNB     XMT$RDY,M$BURN  ;wait till XMT ready or not busy
0F18 0574                INC     RAM             ;next ram fill data pattern
0F1A 120576              CALL    RAMFIL          ;fill up ram with fixed data
0F1D 853182              MOV     DPL,BOTL        ;check ram starting from bottom
0F20 853083              MOV     DPH,BOTH
0F23            M$BN6:
0F23 12058D              CALL    MREAD           ;read ram data
0F26 B57417              CJNE    A,RAM,M$BN7     ;if ram changed ?
0F29 120558              CALL    CPTOP           ;check if end
0F2C A3                  INC     DPTR            ;next pointer loc
0F2D 40F4                JC      M$BN6           ;not end yet
0F2F E583                MOV     A,DPH           ;get high loc of good ram
0F31 03                  RR      A
0F32 C4                  SWAP    A
0F33 F527                MOV     LED,A
0F35 120663              CALL    TLEDX4          ;flash 4 times
0F38 857427              MOV     LED,RAM         ;display pattern
0F3B 120453              CALL    DLED            ;on LED
0F3E 80CD                JMP     M$BURN          ;continue to next pattern
0F40            M$BN7:
0F40 853332              MOV     TOPH,DPH        ;if error ram,reduce size
0F43 858233              MOV     TOPL,DPL        ;for ram checking
0F46 120675              CALL    MLED4           ;error message
0F49 80C2                JMP     M$BURN          ;continue
```

```
0F4B            J$EXT:
0F4B 22                 RET                             ;exit
                ;
0F4C            J$SPEC:
0F4C 751D06             MOV     PSAVE,#$6
0F4F A141               JMP     UTIL
0F51            J$DIAG:
0F51 751D07             MOV     PSAVE,#$7
0F54 A141               JMP     UTIL
0F56            J$MHEX:
0F56 751D03             MOV     PSAVE,#$3
0F59 A141               JMP     UTIL
                ;
0F5B            J$TAB:                                  ;action key jump table
0F5B 0E6A               DW      J$SKIP                  ;skip a page
0F5D 0E6F               DW      J$REPR                  ;reprint last page
0F5F 0E74               DW      J$CLEAR                 ;clear buffer
0F61 0E8B               DW      J$COPY                  ;copy buffer
                ;
0F63 0CC2               DW      J$PAUSE                 ;change page pause mode
0F65 0E90               DW      J$AUTO                  ;reprint auto pages
0F67 0CB5               DW      J$PAGE                  ;swap page mode
0F69 0E90               DW      J$AUTO                  ;copy auto no.

0F6B 092F               DW      D$EMTY                  ;empty buffer
0F6D 080E               DW      D$FULL                  ;restore buffer
0F6F 0CD5               DW      J$COMP                  ;swap compression mode
0F71 0E31               DW      J$NCOPY                 ;continue copy 0F73 0EC7               DW      J$SET                   ;load FF def from keys
0F75 0ED0               DW      J$SIZE                  ;internal RAM and buffer size
0F77 0E3A               DW      J$RST                   ;soft reset
0F79 02E5               DW      J$DUEX                  ;buffer hex dump
                ;
0F7B            J$TAB0:                                 ;power-up functions
0F7B 0F4C               DW      J$SPEC                  ;execute customized rom
0F7D 0EDA               DW      J$EXTN                  ;external ROM program
0F7F 0F51               DW      J$DIAG                  ;diagnostic
0F81 0F56               DW      J$MHEX                  ;memory hex dump
                                                        ; end of table
                ;
                ;       DEVICE TABLE DEFINITION
                ;
                ;       DB      V$FLAG,LPP,FFCHAR,FFCHAR,
                ;
0F83            S$TABL:
0F83 00420000           DB      0,66,0,0                ;0 - 66 lines per page, all mode disabled
0F87 002C0000           DB      0,44,0,0                ;1 - 44 lines per page, all modes disabled
0F8B 00480000           DB      0,72,0,0                ;2 - 72 lines per page, all modes disable
0F8F 04000C00           DB      4,0,$0C,0               ;3 - form feed only, all modes off
0F93 04420C00           DB      4,66,$0C,0              ;4 - 66 lines or FF, all modes off
0F97 24420C00           DB      $24,66,$0C,0            ;5 - 66 lines or FF, space compression
0F9B 01420000           DB      1,66,0,0                ;6 - 66 lines per page, auto lf
0F9F C0181A00           DB      $C0,24,$1A,0            ;7 - (reserved) CRT-ADM 3A, remote enable 0FA3 0C420C00           DB      $0C,66,$0C,0            ;8 - 66 lines per page, FF, page mode
0FA7 0C2C0C00           DB      $0C,44,$0C,0            ;9 - 44 lines or FF, page mode
0FAB 0C580C00           DB      $0C,88,$0C,0            ;10 - 88 lines or FF, page mode
0FAF 1C420C00           DB      $1C,66,$0C,0            ;11 - 66 lines or FF, page mode, page pause
0FB3 08010000           DB      8,1,0,0                 ;12 - line mode
0FB7 2C420C00           DB      $2C,66,$0C,0            ;13 - 66 lines or FF, page mode, space compres
                                                        on
0FBB 0C000C00           DB      $0C,0,$0C,0             ;14 - FF only, page mode
0FBF 0D420C00           DB      $0D,66,$0C,0            ;15 - 66 lines or FF, page mode, auto lf
                ;
                ;       LOGO MESSAGE
                ;
0FC3            LOGO:
0FC3 0D0A               DB      $0D,$0A
```

```
0FC5 41454745        DB      'ANGEL V6.0 Copyright @1983 Ligo'
0FE4 0D0A            DB      $0D,$0A
0FE6 43414E20        DB      'CAN size '    ;Canadian version (Computer Age LTD.)
0FEF 0000            DB      $00,$00
                     ;
                     ;
0000                 END
```

---- SYMBOL TABLE ----

| | | | | | | | |
|---|---|---|---|---|---|---|---|
| A$VAL | 0E4E | BF$EMTY | 0002 | D$BU5 | 0906 | CPH | 0033 |
| ACC | 00E0 | BF$FULL | 0000 | D$BU6 | 0911 | DPL | 0082 |
| ACT$EXT | 078F | BF$WAIT | 0001 | D$BU7 | 091D | EA | 00AF |
| ACTR4 | 079E | BOTH | 0030 | D$BU8 | 0922 | ENS? | 0035 |
| ACTR5 | 07A8 | BOTL | 0031 | D$BU9 | 0925 | ES | 00AC |
| ACTR6 | 079D | BUF1 | 023D | D$BUA | 0901 | ESC | 0013 |
| ACTRC | 0790 | CKR0 | 04F2 | D$BUFF | 08B3 | ET0 | 00A9 |
| ACTX0 | 0760 | CKR1 | 04F8 | D$C00 | 0834 | ET0$INT | 0003 |
| ACTX1 | 078A | CKR2 | 0504 | D$C01 | 083B | ET0$VEC | 0003 |
| ACTX2 | 0777 | CKR3 | 050A | D$C02 | 084F | ET1$VEC | 0013 |
| ACTX3 | 0786 | CKR4 | 0512 | D$C03 | 086D | EX0 | 00A8 |
| ACTXM | 0766 | CKR5 | 051B | D$C04 | 0884 | EX0$VEC | 0003 |
| ACTXNT | 0758 | CKR6 | 0521 | D$C05 | 0887 | EX1 | 00AA |
| AD$TOP | 0086 | CKR8 | 0545 | D$C06 | 084E | EX1$INT | 0013 |
| AD2TOP | 009B | CKR9 | 0551 | D$C07 | 0864 | EX1$VEC | 0013 |
| ADV$EXT | 009A | CKRAM | 04E5 | D$C09 | 0870 | EXTKEY | 0E5E |
| ADV$NXT | 008E | CKRCV | 00BF | D$COPY | 092E | F$ACC | 0A9A |
| ADVTOP | 0089 | CKRCV2 | 00C4 | D$DIA2 | 06C5 | F$ADV | 0AA1 |
| ADXMT | 0077 | CKS1 | 070E | D$DIA3 | 06CD | F$ADV2 | 0AA6 |
| AUTO | 0E10 | CKSUM | 0709 | D$DIA4 | 06D4 | F$ADV3 | 0AB2 |
| AUTO1 | 0E1C | CKXMT | 0030 | D$DIA5 | 06DC | F$BACK | 0026 |
| AUTO2 | 0E2A | CLOCK0 | 02EE | D$DIA6 | 06E3 | F$COMP | 001D |
| AUTO3 | 0E23 | COMHEX | 07C3 | D$DIA7 | 06EB | F$CONT | 002D |
| AUTO4 | 0E49 | COMM0 | 0E07 | D$DIAG | 06BE | F$ESC | 0023 |
| B | 00F0 | COMM1 | 0E0E | D$EM2 | 093A | F$FACC | 0022 |
| B$FLAG | 0020 | COMMIB | 0E02 | D$EM4 | 0940 | F$FLAG | 0024 |
| B$LINE | 0A7F | COUNT | 0077 | D$EMTY | 092F | F$LINE | 0A11 |
| B$NORM | 0A56 | COUNT1 | 0074 | D$FU1 | 0894 | F$NORM | 09D6 |
| B$PAGE | 0A87 | CP$EXT | 0041 | D$FU2 | 08AA | F$OK | 0A9C |
| B$R2 | 0ABF | CP2HED | 0043 | D$FULL | 088E | F$PAGE | 001B |
| B$R3 | 0AC3 | CP2TAL | 0146 | D$IRAM | 094D | F$PAUSE | 001C |
| B$READ | 0AB3 | CP2TNT | 014F | D$LEDX | 0698 | F$PNEW | 0024 |
| B$SAVE | 0047 | CPHEAD | 0037 | D$MEM | 0958 | F$RCV | 0545 |
| B$SC1 | 0A46 | CPT$EXT | 0564 | D$MEM2 | 095E | F$READ | 0A8D |
| B$SC2 | 0A52 | CPT$NX1 | 013C | D$MESS | 081E | F$REMO | 001E |
| B$SC3 | 0A55 | CPT$NX2 | 013E | DEL40 | 06B1 | F$RES | 0BBB |
| B$SC4 | 0A5F | CPT$NX3 | 0144 | DELAY0 | 06B6 | F$RES? | 0BF4 |
| B$SC5 | 0A68 | CPT$NXT | 0134 | DELAY1 | 06A7 | F$RESET | 0027 |
| B$SC6 | 0A73 | CPTAIL | 012B | DELAY3 | 06B1 | F$S2 | 0AE6 |
| B$SC8 | 0A7B | CPTOP | 0558 | DELAY4 | 06AA | F$S3 | 0AEA |
| B$SCAN | 0A26 | CR | 000D | DELAY5 | 06A0 | F$S4 | 0AF8 |
| B$SCB | 0A35 | CRLF | 07EC | DISPA1 | 07EB | F$S6 | 0B21 |
| BASE | 0030 | D$ADV | 096C | DISPAC2 | 07FF | F$SC0 | 09A6 |
| BASE0 | 0000 | D$ADV2 | 096F | DISPAC3 | 0806 | F$SC1 | 09C6 |
| BAUD1 | 0037 | D$ADV4 | 0971 | DISPAD1 | 07D9 | F$SC2 | 09D2 |
| BAUD2H | 0038 | D$ADV8 | 0979 | DISPAD2 | 07DC | F$SC3 | 09D5 |
| BAUD2L | 0039 | D$BU | 08B9 | DISPADD | 07D3 | F$SC4 | 09DF |
| BAUD3H | 003A | D$BU0 | 08C5 | DISPASC | 07F4 | F$SC5 | 09E8 |
| BAUD3L | 003B | D$BU1 | 08D5 | DISPR1 | 081D | F$SC6 | 09F3 |
| BAUDTB1 | 01ED | D$BU3 | 08E5 | DISPREG | 0808 | F$SC8 | 09FB |
| BAUDTB2 | 0341 | D$BU4 | 08EE | DLED | 0453 | F$SC9 | 0A07 |
| F$SCA | 0A10 | INIS2 | 01E2 | K$FUNC | 0032 | MAINLOC | 0EAF |
| F$SCAN | 09A8 | INISIO | 01DC | K$HOLD | 0031 | MASKS | 002D |
| F$SCB | 09DA | INTSRET | 01D3 | K$PAUSE | 0030 | MEM | 0053 |
| F$SET0 | 0AD8 | IOCHAR | 0033 | K$REPR | 0035 | MEMW | 006D |
| F$SET1 | 0ADA | IRAMH | 007F | K$SFUN | 0033 | MLED0 | 0660 |
| F$SET2 | 0AE3 | IRAML | 0078 | K$SKIP | 0034 | MLED1 | 067F |

| Symbol | Addr | Symbol | Addr | Symbol | Addr | Symbol | Addr |
|---|---|---|---|---|---|---|---|
| F$SET3 | 0AF3 | IT0 | 00C8 | KEY | 0026 | MLED2 | 0660 |
| F$SET4 | 0B04 | IT1 | 003A | LD$EXT | 0117 | MLED3 | 067A |
| F$SET5 | 0D07 | ITAIL | 0010 | LD$XC | 005F | MLED4 | 0675 |
| F$SET6 | 0B27 | J$AUT2 | 0E9A | LD$XC2 | 006A | MLED5 | 065D |
| F$SET7 | 0D2D | J$AUT3 | 0EAE | LD$XCT | 006C | MREAD | 058D |
| F$SET8 | 0D37 | J$AUTO | 0E90 | LD2EXT | 012A | MTEST | 051F |
| F$SET9 | 0B3F | J$BHEX | 0EB5 | LDRCV | 00C9 | MWRITE | 0593 |
| F$SETA | 0B11 | J$CLEAR | 0E74 | LDRCV0 | 00FD | NO$RAM | 0028 |
| F$SETB | 0AD4 | J$COMP | 0CD5 | LDRCV1 | 0100 | NORAM | 053A |
| F$STEP | 0D21 | J$COPY | 0E3B | LDRCV2 | 0113 | OUT$EXT | 0751 |
| F$STOP | 0D20 | J$DIAG | 0F51 | LDRCV4 | 0125 | OUT$MAC | 002C |
| F$XB1 | 0B76 | J$ERR | 0CD2 | LDRCV5 | 00EF | OUT$MKT | 074F |
| F$XB2 | 0D7F | J$EXC | 0DE0 | LDRCV6 | 00F5 | OUT$OK | 0748 |
| F$XB3 | 029F | J$EXC0 | 0DDB | LDRCV7 | 00E7 | OUTCH | 07AA |
| F$XB4 | 0DA6 | J$EXC1 | 0DF0 | LDXMT | 0049 | OUTCH1 | 07AC |
| F$XB5 | 0E8C | J$EXC2 | 0DE2 | LDXMT2 | 005D | OUTCH3 | 07D5 |
| F$XBAK | 0B71 | J$EXT | 0DFF | LED | 0027 | OUTCHAR | 0736 |
| F$XDS | 0B92 | J$EXT2 | 0EE6 | LF | 000A | OUTH | 073E |
| F$XF2 | 0D62 | J$EXTH | 0EDA | LOADBUF | 0236 | OUTHEX | 0736 |
| F$XF3 | 0D6C | J$FPAG | 0DC5 | LOGO | 0FC3 | OUTHEX5 | 07CC |
| F$XFOR | 0D53 | J$FUN | 0C64 | LOP0 | 0B35 | P | 00D0 |
| F$XNT | 054C | J$FUNC | 0D00 | LOP1 | 0BFE | P$FLAG | 0022 |
| F$PAGE | 0A1F | J$HCOPY | 0E31 | LOP2 | 0C06 | P1 | 0090 |
| FFESC | 0046 | J$HF2 | 0D3A | LOP6 | 0CDC | P3 | 00B0 |
| FFTBL | 0042 | J$HFUN | 0D2B | LOP8 | 0C17 | PAR1 | 018F |
| FIL$2 | 0581 | J$IHEX | 0F56 | LOW128 | 0DCF | PAR2 | 019A |
| FILCH | 001F | J$PAGE | 0CB5 | LPP | 003F | PAR21 | 02A8 |
| FILRAM | 0573 | J$PAUSE | 0CC2 | LTABLE | 0DC9 | PAR22 | 02B3 |
| FPAG3 | 0DAD | J$REPR | 0E6F | M$BEXT | 0F43 | PAR23 | 0234 |
| FPAG4 | 0DC2 | J$RST | 0EBA | M$BN6 | 0F23 | PAR25 | 02BE |
| FPAGE | 0D9F | J$SET | 0EC7 | M$BN7 | 0F40 | PAR3 | 019F |
| GPARAM | 0BCA | J$SET2 | 0ECD | M$BURN | 0F0D | PAR4 | 01A5 |
| H$CLEAR | 0040 | J$SF2 | 0D0F | M$TES2 | 0F08 | PAR5 | 01A7 |
| H$COPY | 0080 | J$SF4 | 0D13 | M$TEST | 0EE7 | PARAM | 002A |
| H$FUNC | 0004 | J$SF5 | 0D1F | M10 | 0C42 | PARITY | 018A |
| H$HOLD | 0002 | J$SFUN | 0D05 | M15 | 0C4B | PARITY2 | 02A0 |
| H$PAUSE | 0001 | J$SI2 | 0ED8 | M20 | 0C4E | PAUSE | 0C9F |
| H$REPR | 0020 | J$SIZE | 0ED0 | M25 | 0C63 | PHEADH | 000C |
| H$SFUN | 0008 | J$SKIP | 0E6A | M30 | 0C6C | PHEADL | 000D |
| H$SKIP | 0010 | J$SPEC | 0F4C | M35 | 0C75 | PIO$END | 0404 |
| HOLD | 0CA8 | J$TAB | 0F5B | M38 | 0C80 | PIO$EXT | 000A |
| IHEAD | 0008 | J$TAB0 | 0F7B | M40 | 0C83 | PIO$IN | 0015 |
| IN$OK2 | 0729 | J$UTIL | 0D8F | M50 | 0C95 | PIO$INT | 0003 |
| IN$RET | 0731 | K$CLEAR | 0036 | M80 | 0C9D | PIO$ORG | 0361 |
| INCHAR | 0719 | K$COPY | 0037 | MAIN | 0C1D | PIO$OUT | 0016 |
| PIO$REC | 03A0 | RCVI$1 | 01BC | SETP | 03FF | TABLE | 0232 |
| PIO$XMT | 0361 | READKY | 049B | SETPRC | 03E3 | TB8 | 009B |
| PO$EX2 | 00BC | READSW | 0478 | SETPXM | 03F2 | TCON | 0088 |
| PO$EX3 | 00BE | REFRSH | 00B5 | SETR1 | 042A | TH0 | 008C |
| PO$NXT | 00B6 | REN | 009C | SETR2 | 0431 | TH1 | 008D |
| PO$XMT | 00A2 | REPH | 0075 | SETRC | 041F | TI | 0099 |
| PO$XMT2 | 00A4 | REPL | 0076 | SETRCV | 0227 | TKEY | 06F1 |
| PO$XMT3 | 00B3 | RI | 0098 | SETS1 | 020A | TKEY1 | 06F5 |
| PR$BUSY | 0010 | RKEY1 | 04A2 | SETSIO | 01FD | TKEY2 | 06FE |
| PR$DATA | 0014 | RKEY2 | 04A4 | SETSIO2 | 0303 | TL0 | 008A |
| PR$OVER | 0013 | RKEY3 | 04AD | SETSS | 0324 | TLEDC | 0681 |
| PRC$0 | 03A7 | RKEY4 | 04DB | SETUP | 0404 | TLEDC1 | 0688 |
| PRC$2 | 03B8 | RLINE | 000F | SETUP2 | 0419 | TLEDX | 0666 |
| PRC$3 | 03BD | RPAGE | 000E | SETX1 | 043E | TLEDX4 | 0663 |
| PRC$EXT | 03DA | RS0 | 00D3 | SETX2 | 021E | TMOD | 0089 |
| PRC$RET | 03A6 | RS1 | 00D4 | SETX3 | 044F | TOPH | 0032 |
| PSAVE | 001D | RSAVE | 002C | SETX5 | 0445 | TOPL | 0033 |
| PSW | 00D0 | RSW1 | 0481 | SETX6 | 0451 | TR0 | 008C |
| PT0 | 00B9 | RSW2 | 0483 | SETXM | 0433 | TR1 | 008E |
| PTAILH | 0014 | S$DEV | 05B2 | SETXMT | 0219 | TXRAM | 0566 |
| PTAILL | 0015 | S$DEV2 | 05CD | SIO$B8 | 004A | UCOMP | 0CDD |
| PX$BUSY | 0011 | S$DEV3 | 05D0 | SIO$END | 0245 | UHOLD | 0CB0 |
| PX0 | 00B8 | S$FLAG | 0021 | SIO$IN | 0008 | UPAGE | 0CBD |
| PX1 | 00BA | S$IN2 | 0641 | SIO$INT | 0153 | UPAUSE | 0CA5 |

| | | | | | | | |
|---|---|---|---|---|---|---|---|
| PXM$I | 036F | S$IN4 | 0656 | SIO$ODD | 0049 | UPP | 0CCD |
| PXM$A | 0367 | S$INCH | 0639 | SIO$OUT | 0009 | UTIL | 0D41 |
| PXM$OK | 0372 | S$INCH7 | 0648 | SIO$PAR | 0048 | UTIL0 | 0D44 |
| PXM$OK2 | 0382 | S$LI | 05E0 | SIO$VEC | 0023 | UTIL2 | 0D4E |
| PXM$RET | 0397 | S$L3 | 0613 | SIO$Z8 | 004B | UTIL3 | 0D7A |
| PXM$WT | 039F | S$L4 | 0615 | SIO2CNT | 0036 | UTIL4 | 0D88 |
| QHEADH | 000A | S$L5 | 0625 | SIO2DAT | 0034 | UTIL5 | 0D8C |
| QHEADL | 000B | S$L8 | 062E | SIO2END | 0361 | UTILA | 0D76 |
| QLENH | 0040 | S$L9 | 0632 | SIO2INT | 0245 | UTILB | 0D6B |
| QLENL | 0041 | S$LEXT | 0636 | SIO2JMP | 0035 | V$ALF | 0018 |
| QHARR | 0002 | S$LOAD | 05D7 | SIO2OUT | 000A | V$CRT | 001F |
| QHARX | 0004 | S$SET | 0599 | SIO2PAR | 000C | V$ESC | 0019 |
| QTAILH | 0012 | S$SET2 | 05B1 | SIO2RCV | 0096 | V$FF | 001A |
| QTAILL | 0013 | S$TABL | 0F83 | SIO2RET | 01D3 | V$FLAG | 0023 |
| R$STOP | 002B | SAMEKEY | 04DC | SIO2XMT | 00B1 | X$READ | 0AC4 |
| RAM | 0074 | SAVEH | 001A | SLED | 046A | X$STOP | 002A |
| RAMFIL | 0576 | SAVEL | 001B | SLED$X | 0477 | XLINE | 0017 |
| RC$FULL | 0006 | SAVEM | 0019 | SLED0 | 046A | XM$NSTB | 00B1 |
| RC$NBUS | 00B4 | SBUF | 0099 | SMO | 009F | XM$REQ | 0003 |
| RC$NSTB | 00B2 | SCAN | 001C | SP | 0081 | XM23 | 02D0 |
| RC$OVER | 0004 | SCON | 0098 | SPACE | 0020 | XM24 | 02EC |
| RC$REQ | 0005 | SET2XM | 0334 | STACK | 0048 | XM2A | 0264 |
| RCI$EXT | 01D3 | SET2XT | 0336 | START | 0BAF | XM2DAT | 02C1 |
| RCV$INT | 01A8 | SETLD0 | 0CEB | SURE0 | 0E54 | XM2OK | 0271 |
| RCV$OVER | 01CF | SETLD1 | 0CF2 | SUREKEY | 0E52 | XM2PAR | 02D2 |
| RCV$RDY | 00B4 | SETLD2 | 0CFC | SW1 | 0028 | XM2STP | 02DE |
| RCV2ERR | 000E | SETLED | 0CE2 | SW2 | 0029 | XM2STB? | 025E? |
| XM2TBL | 0256 | XMT$ACK | 0012 | XM$RAM | 0029 | Y$LOOP | 002E |
| XM2WT | 0292 | XMT$INT | 015A | XPAGE | 0016 | YSAVE | 001E |
| XM$A | 0160 | XMT$RDY | 00B3 | XSAVE | 002B | | |
| XM$RET | 0182 | XMT2STP | 000F | Y$ERR | 002F | | |
| XM$WT | 0185 | XMTISOK | 0175 | Y$FLAG | 0025 | | |

What is claimed is:

1. A stand-alone file buffer comprising, in combination:
    an import port adapted to receive data from a computer; a user memory adapted to store data received via said input port;
    an output port adapted to supply data stored in said user memory to a utilization device;
    control means for establishing page definition information, said page definition information including an operator selectable line-per-page value; and
    means for scanning the data in said user memory to locate page boundaries within said data in accordance with said page definition information, said means for scanning including means for counting lines of print within said data and means for establishing each of said page boundaries when the lines counted by said counting means equals said line-per-page value.

2. A stand-alone buffer as set forth in claim 1 wherein said means for counting lines of print includes means for detecting linefeed characters in said data.

3. A stand-alone file buffer as set forth in claim 1 wherein said means for counting lines of print includes means for detecting carriage-return characters in said data.

4. A stand-alone buffer as set forth in claim 1 including page control means for terminating the flow of data via said output port and resuming said flow beginning with a selected one of said page boundaries.

5. A stand-alone buffer as set forth in claim 1 wherein said means for scanning includes means for detecting the presence of formfeed characters in said data.

* * * * *